United States Patent
Parulski et al.

(10) Patent No.: US 8,934,043 B2
(45) Date of Patent: *Jan. 13, 2015

(54) REVISED RECAPTURE CAMERA AND METHOD

(75) Inventors: Kenneth A. Parulski, Rochester, NY (US); Stephen G. Malloy Desormeaux, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 20 days.

This patent is subject to a terminal disclaimer.

(21) Appl. No.: 12/507,295

(22) Filed: Jul. 22, 2009

(65) Prior Publication Data

US 2009/0284637 A1 Nov. 19, 2009

Related U.S. Application Data

(63) Continuation of application No. 11/159,811, filed on Jun. 23, 2005, now Pat. No. 7,616,248, which is a continuation of application No. 09/907,044, filed on Jul. 17, 2001, now Pat. No. 6,930,718.

(51) Int. Cl.
*H04N 5/222* (2006.01)
*H04N 5/232* (2006.01)
*H04N 1/00* (2006.01)
(Continued)

(52) U.S. Cl.
CPC ........ *H04N 5/23222* (2013.01); *H04N 1/00183* (2013.01); *H04N 1/6011* (2013.01); *H04N 5/225* (2013.01); *H04N 5/232* (2013.01); *H04N 5/23293* (2013.01)
USPC ..................................... 348/333.11

(58) Field of Classification Search
CPC ............ H04N 1/00183; H04N 1/6011; H04N 5/23293; H04N 5/232; H04N 5/23222; H04N 5/225
USPC ............. 348/333.02, 333.04, 333.05, 333.11, 348/64, 238; 396/374, 243
See application file for complete search history.

(56) References Cited

U.S. PATENT DOCUMENTS

| 4,739,411 A | 4/1988 | Bolton |
| 4,855,780 A | 8/1989 | Hayakawa |
| 4,978,983 A | 12/1990 | St. Alfors |

(Continued)

FOREIGN PATENT DOCUMENTS

| EP | 1 278 099 A1 | 1/2003 |
| EP | 1 278 100 A2 | 1/2003 |

(Continued)

OTHER PUBLICATIONS

U.S. Appl. No. 09/493,442, filed Jan. 28, 2000, entitled Motion Verifying Camera and Motion Verifying Photography Method, H. Ina, H. Hoshikawa and D. Funston.

(Continued)

*Primary Examiner* — Aung S Moe

(57) ABSTRACT

In a camera and method, a scene is captured as an archival image, with the camera set in an initial capture configuration. Then, a plurality of parameters of the scene are evaluated. The parameters are matched to one or more of a plurality of suggested capture configurations to define a suggestion set. User input designating one of the suggested capture configurations of the suggestion set is accepted and the camera is set to the corresponding capture configuration.

19 Claims, 34 Drawing Sheets

(51) Int. Cl.
*H04N 1/60* (2006.01)
*H04N 5/225* (2006.01)

(56) References Cited

U.S. PATENT DOCUMENTS

| | | | |
|---|---|---|---|
| 5,006,878 A | 4/1991 | Cloutier | |
| 5,081,483 A | 1/1992 | Ishimura et al. | |
| 5,164,831 A | 11/1992 | Kuchta et al. | |
| 5,172,151 A | 12/1992 | Yomogizawa et al. | |
| 5,172,234 A | 12/1992 | Arita et al. | |
| 5,266,985 A | 11/1993 | Takagi | |
| 5,440,369 A | 8/1995 | Tabata et al. | |
| 5,486,893 A | 1/1996 | Takagi | |
| 5,493,353 A | 2/1996 | Chen | |
| 5,574,520 A | 11/1996 | Ishihara | |
| 5,640,628 A | 6/1997 | Yoshida | |
| 5,710,954 A | 1/1998 | Inoue | |
| 5,822,625 A | 10/1998 | Leidig et al. | |
| 5,831,670 A | 11/1998 | Suzuki | |
| 5,867,741 A | 2/1999 | Maruyama et al. | |
| 5,903,788 A | 5/1999 | Mukai et al. | |
| 5,926,218 A | 7/1999 | Smith | |
| 5,986,297 A | 11/1999 | Guidash et al. | |
| 6,072,586 A | 6/2000 | Bhargava et al. | |
| 6,101,333 A | 8/2000 | Bullitt et al. | |
| 6,301,440 B1 | 10/2001 | Bolle et al. | |
| 6,486,914 B1 | 11/2002 | Anderson | |
| 6,611,291 B1 | 8/2003 | Dow et al. | |
| 6,636,260 B2 | 10/2003 | Kiyokawa | |
| 6,870,567 B2 | 3/2005 | Funston et al. | |
| 6,903,773 B1 | 6/2005 | Fushimoto | |
| 6,919,927 B1 * | 7/2005 | Hyodo | 348/333.02 |
| 6,940,545 B1 | 9/2005 | Ray et al. | |
| 7,106,376 B1 * | 9/2006 | Anderson | 348/345 |
| 7,616,248 B2 * | 11/2009 | Parulski et al. | 348/333.11 |
| 2002/0008765 A1 * | 1/2002 | Ejima et al. | 348/239 |
| 2002/0036693 A1 * | 3/2002 | Kinjo | 348/218 |
| 2002/0041329 A1 | 4/2002 | Steinberg | |
| 2002/0109783 A1 | 8/2002 | Hayashi et al. | |
| 2004/0032515 A1 | 2/2004 | Sliverbrook | |
| 2004/0201766 A1 * | 10/2004 | Funston et al. | 348/333.02 |
| 2006/0055805 A1 | 3/2006 | Stockton et al. | |

FOREIGN PATENT DOCUMENTS

| | | |
|---|---|---|
| EP | 1 278 373 A2 | 1/2003 |
| EP | 1 280 336 A2 | 1/2003 |
| JP | 07-319034 | 12/1995 |
| JP | 09-269545 | 10/1997 |
| WO | 96/35291 | 11/1996 |

OTHER PUBLICATIONS

European Search Report for European Patent Application 02077640.7, mailed Feb. 4, 2004.
Final Office Action on U.S. Appl. No. 11/159,811, mailed Apr. 13, 2009.
Non-Final Office Action on U.S. Appl. No. 09/907,044, mailed Sep. 22, 2004.
Non-Final Office Action on U.S. Appl. No. 11/159,811, mailed Sep. 17, 2008.
Notice of Allowance for U.S. Appl. No. 09/907,044, mailed Apr. 20, 2005.
Notice of Allowance on U.S. Appl. No. 11/159,811, mailed Jun. 8, 2009.

* cited by examiner

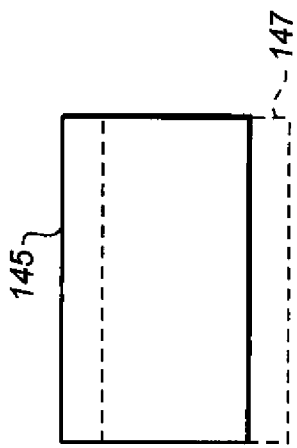
FIG. 14c
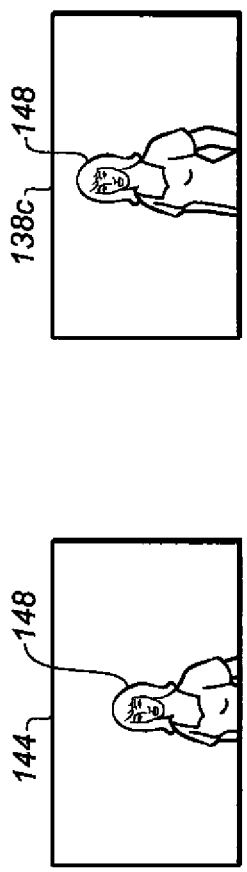
FIG. 14b
FIG. 14a
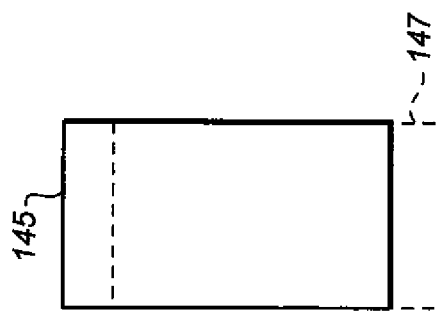
FIG. 15c
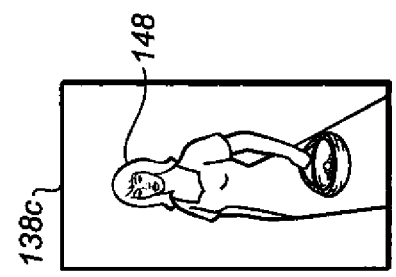
FIG. 15b
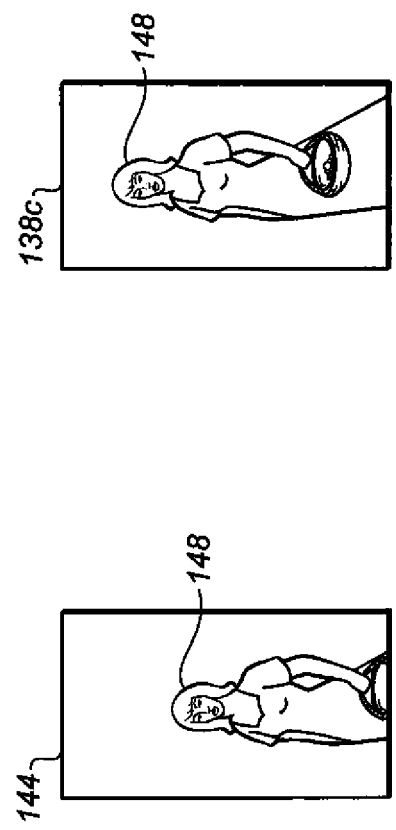
FIG. 15a

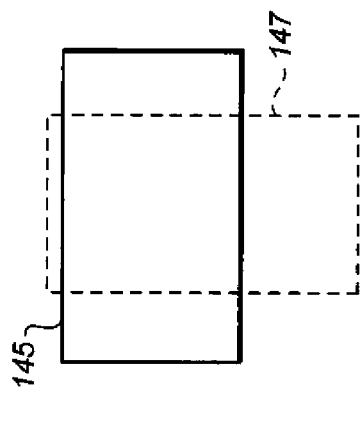
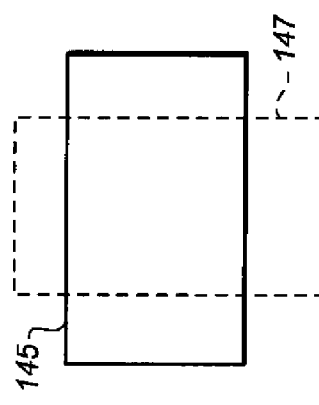
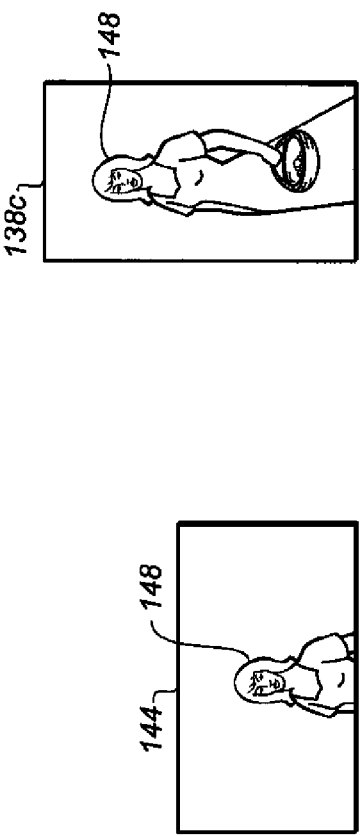
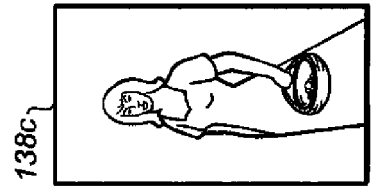

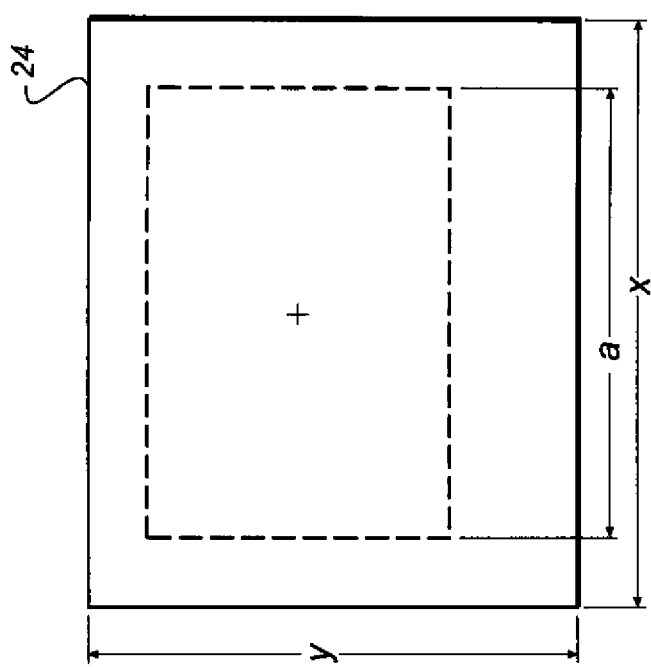

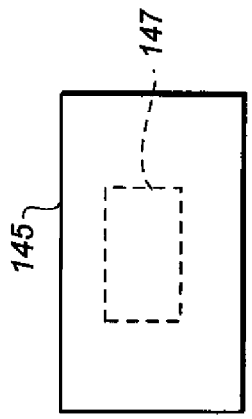
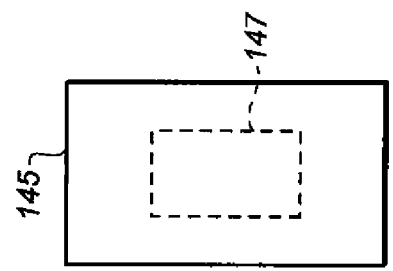
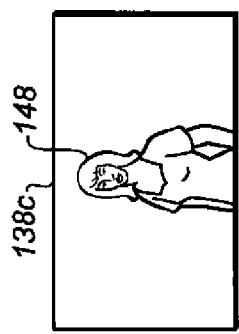
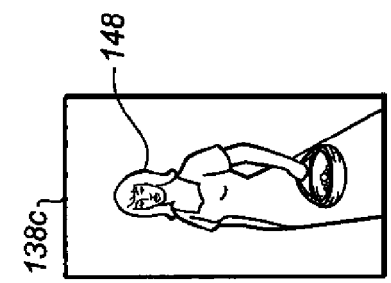
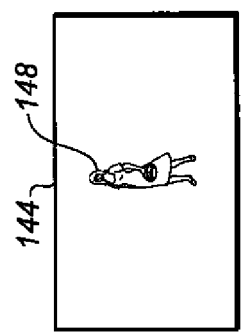
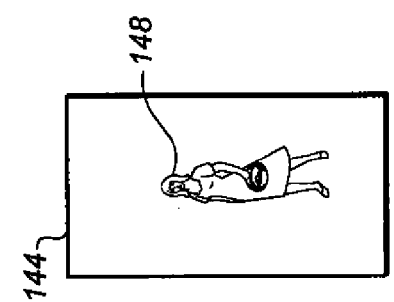

REVISED RECAPTURE CAMERA AND METHOD

CROSS-REFERENCE TO RELATED APPLICATIONS

This is a continuation of application Ser. No. 11/159,811, filed Jun. 23, 2005 now U.S. Pat. No. 7,616,248 entitled REVISED RECAPTURE CAMERA AND METHOD by Kenneth A. Parulski, et al., which is a continuation of application Ser. No. 09/907,044, filed Jul. 17, 2001 now U.S. Pat. No. 6,930,718 entitled REVISED RECAPTURE CAMERA AND METHOD by Kenneth A. Parulski, et al.

FIELD OF THE INVENTION

The invention relates to photography and photographic equipment and more particularly relates to a revised recapture camera and related method.

BACKGROUND OF THE INVENTION

Casual photographers often compose scenes in a manner that is appealing to them when seen through a camera viewfinder, but is later found to be unappealing when seen in a resulting photographic print or other final image. Instruction on how to take better photographs is readily available in books, in classes, and the like; but such modes of instruction are burdensome to access during picture taking and are not much used by casual photographers. This is unfortunate, since the result is that many people repeat the same mistakes over and over, and also miss out on the fun of learning how to take better photographs.

Cameras are known that provide an indicator or lock up the shutter release when a forthcoming shot would be too dark or too close. Verifying cameras provide a verification image to users immediately after capture of a scene on photographic film or other archival media. The verification image is provided on a digital display and portrays the image captured on the archival media. This allows the user to review the verification image and decide if the shot was unsuccessful and should be repeated. Major capture failures, such as a something blocking the lens system, are readily apparent. Other characteristics of the captured image, such as composition, are also shown; but, in view of the small size of the digital display may not be immediately apparent to the user.

Japanese published patent application No. 07-319034 discloses a hybrid camera in which the photographer can change exposure settings to modify a verification image. The photographer then knows whether to repeat the shot with the changed settings.

U.S. Pat. No. 5,640,628 discloses a camera that can change metadata indicating a default number of prints, in response to a determined condition.

Hybrid cameras are known that use an electronic image capture unit having a larger angle of view than a corresponding film image capture unit. U.S. Pat. No. 4,978,983 discloses a camera that uses the larger area of the electronic capture unit to correct for parallax at some focusing distances. A display on the camera shows a digital image that corresponds to the angle of view of the film image capture unit.

Software is widely available that allows for the easy manipulation of digital images. Digital cameras can be used to capture images which are then modified using such software after downloading to a computer. This is a powerful approach, but lacks immediacy, since the images are not manipulated on the camera.

Digital cameras necessarily make some modifications of captured images. Some cameras also allow the user to selectively modify some images. For example, the use of digital zoom is disclosed in U.S. Pat. No. 5,172,234. A problem with these approaches is complexity or lack of immediacy or both. A novice is likely to be confused if he or she attempts to modify images during a picture taking session. Modifying images on a camera after a picture taking session is less confusing, but remains complex unless user choices are strictly limited.

One reason for modifying captured images is correction of mistakes by the user and improvement of photographic technique. The widely available educational materials for this purpose are of little help to a user during a picture taking session.

It would thus be desirable to provide an improved camera and method in which the camera displays one or more different suggestions on how to improve on a just captured archival image in a later recapture and the camera sets up in configuration for that improved recapture when one of the suggestions is selected.

SUMMARY OF THE INVENTION

The invention is defined by the claims. The invention, in its broader aspects, provides a camera and method in which a scene is captured as an archival image, with the camera set in an initial capture configuration. Then, a plurality of parameters of the scene are evaluated. The parameters are matched to one or more of a plurality of suggested capture configurations to define a suggestion set. User input designating one of the suggested capture configurations of the suggestion set is accepted and the camera is set to the corresponding capture configuration.

It is an advantageous effect of the invention that an improved camera and method are provided in which the camera displays one or more different suggestions on how to improve on a just captured archival image in a later recapture and the camera sets up in configuration for that improved recapture when one of the suggestions is selected.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 14a is a diagrammatical view of a verification image showing a person's head centered horizontally and vertically.

FIG. 14b is a diagrammatical view of a revision suggestion image provided by a camera having the features illustrated in FIGS. 1 and 12, following capture of an original electronic image including the verification image of FIG. 14a. In FIG. 14b, the person's head is at the two-thirds point of the vertical dimension of the image.

FIG. 14c is a diagrammatical view that shows the original dimensions of the verification image of FIG. 14a in solid lines and the change proposed by the revision suggestion of re-aiming of FIG. 14b in dashed lines.

FIGS. 15a-15c are the same views as FIGS. 14a-14c, but with the camera held vertically rather than horizontally.

FIG. 16a is the same view as FIG. 14a.

FIG. 16b is a diagrammatical view of another revision suggestion image provided by a camera having the features illustrated in FIGS. 1 and 12.

FIG. 16c is a diagrammatical view that shows the original dimensions of the verification image of FIG. 16a in solid lines and the change proposed by the revision suggestion of rotating 90 degrees of FIG. 16b in dashed lines.

FIGS. 17a-17c are the same views as FIGS. 16a-16c, but the person's head in the derived scene image of FIG. 17a is at one-third of the way down from the top of the image.

FIG. 18 is a diagrammatical view of the angle of view of an imager capable of capturing an original electronic image that can be used for the revision suggestions of FIGS. 14-17 and 19-20. The dashed line indicates the relative position of the verification image.

FIGS. 19a-19c are the same views as FIGS. 16a-16c, but the person is more distant from the camera and the revision suggestion is for zooming in or moving closer.

FIGS. 20a-20c are the same views as FIGS. 16a-16c, but the person is more distant a from the camera and the person's head is at about the center of the derived scene image. The revision suggestion is for both zooming in and re-aiming to move the person's head to the one-third point.

In FIG. 33, the scene was properly captured, with no motion or exposure problems.

FIGS. 31a-31b remain applicable and FIG. 47 replaces FIG. 31c.

DETAILED DESCRIPTION OF THE INVENTION

Figure 1:
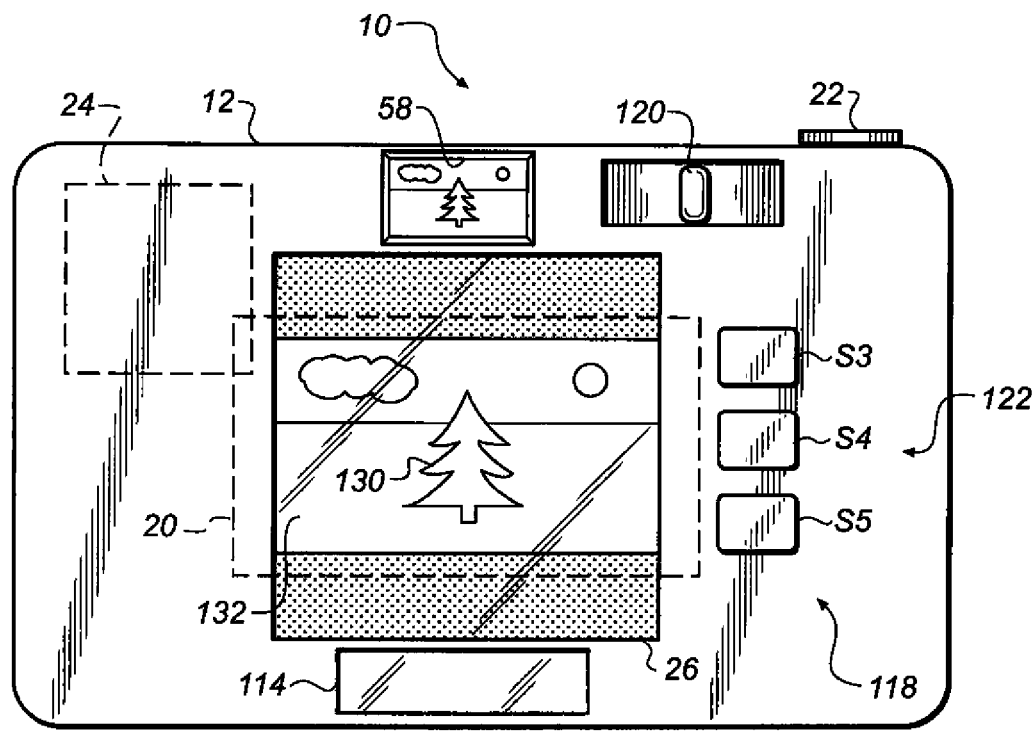
FIG. 1 is a rear view of an embodiment of the camera. The relative locations of film in the exposure frame, the archival image capture unit, and the electronic imager of the electronic image capture unit are indicated by dashed lines.

In the following, feature sets of the several different cameras and methods are discussed in terms of particular embodiments combining all or many of those features. Alternative embodiments combining fewer features and alternative features are also discussed herein. Other alternatives will be apparent to those of skill in the art.

Camera Features

Referring now particularly to FIGS. 1-10, the verifying camera 10 has a body 12 that holds a capture system 14 having an archival image capture unit 16 and a evaluation capture unit 18. The two different capture units 16,18 can take a variety of forms and can be completely separate from each other or can share some or most components. The evaluation capture unit 18 captures a scene image electronically and can also be referred to as an electronic image capture unit. The archival image capture unit 16 can capture images electronically or on film. Cameras 10 are mostly discussed herein in relation to an archival image capture unit 16 that captures latent images using photographic film as the archival media 20. Such an archival image capture unit 16 is also referred to herein as a "film image capture unit".

In an embodiment of the camera 10 having a film image capture unit 20, when the photographer trips a shutter release 22, a subject image (a light image of a scene) is captured as a latent image on a frame of the film 20 and at least one electronic image is captured on an electronic array imager 24 of the evaluation capture unit 18. The electronic image or images are digitally processed and used to provide one or more derived images that can be shown on an image display 26 mounted to the body 12. The electronic images, as captured in analog form and after digitization, but not other modification, are referred to generically herein as "original electronic images". After further modification, the electronic images are referred to generically herein by the term "derived images". Derived images are modified relative to the original images. This can be for calibration to the display or a particular file structure, or matching to output media. These modifications may or may not also include the addition of metadata. A derived image that is matched to the expected product of photofinishing the archival image is also referred to herein as a "verification image". More than one derived image can be made from a single original electronic image. A derived image that differs from the verification image in a predetermined manner, unrelated to expected photofinishing, is referred to herein as an "evaluation image". Modifications matched to expected photofinishing may or may not also be present in an evaluation image.

The camera body 12 provides structural support and protection for the capture units 16,18 and other components. The body 12 of the camera 10 can be varied to meet requirements of a particular use and style considerations. It is convenient, if the body 12 has front and rear covers 28,30 joined together over a chassis 32. Many of the components of the camera 10 can be mounted to the chassis 32. A film door 34 and a flip-up flash unit 36 are pivotably joined to the covers 28,30 and chassis 32.

Figure 7:
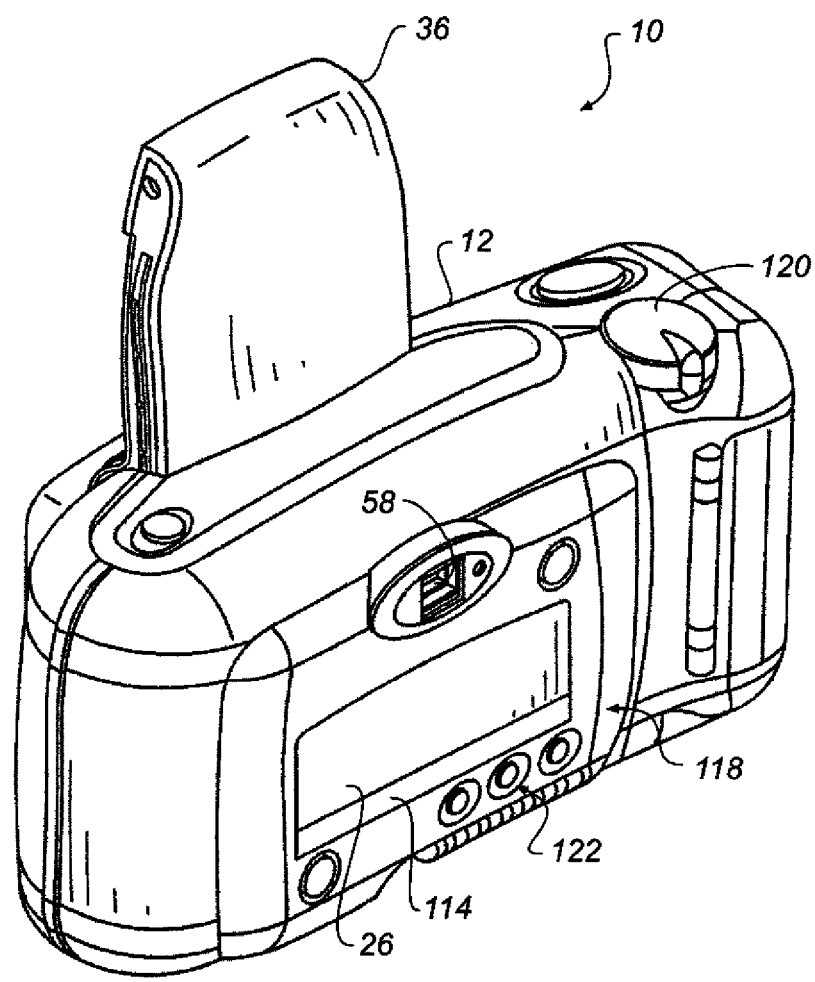
FIG. 7 is a rear perspective view of still another modification of the camera of FIG. 1.
Figure 8:
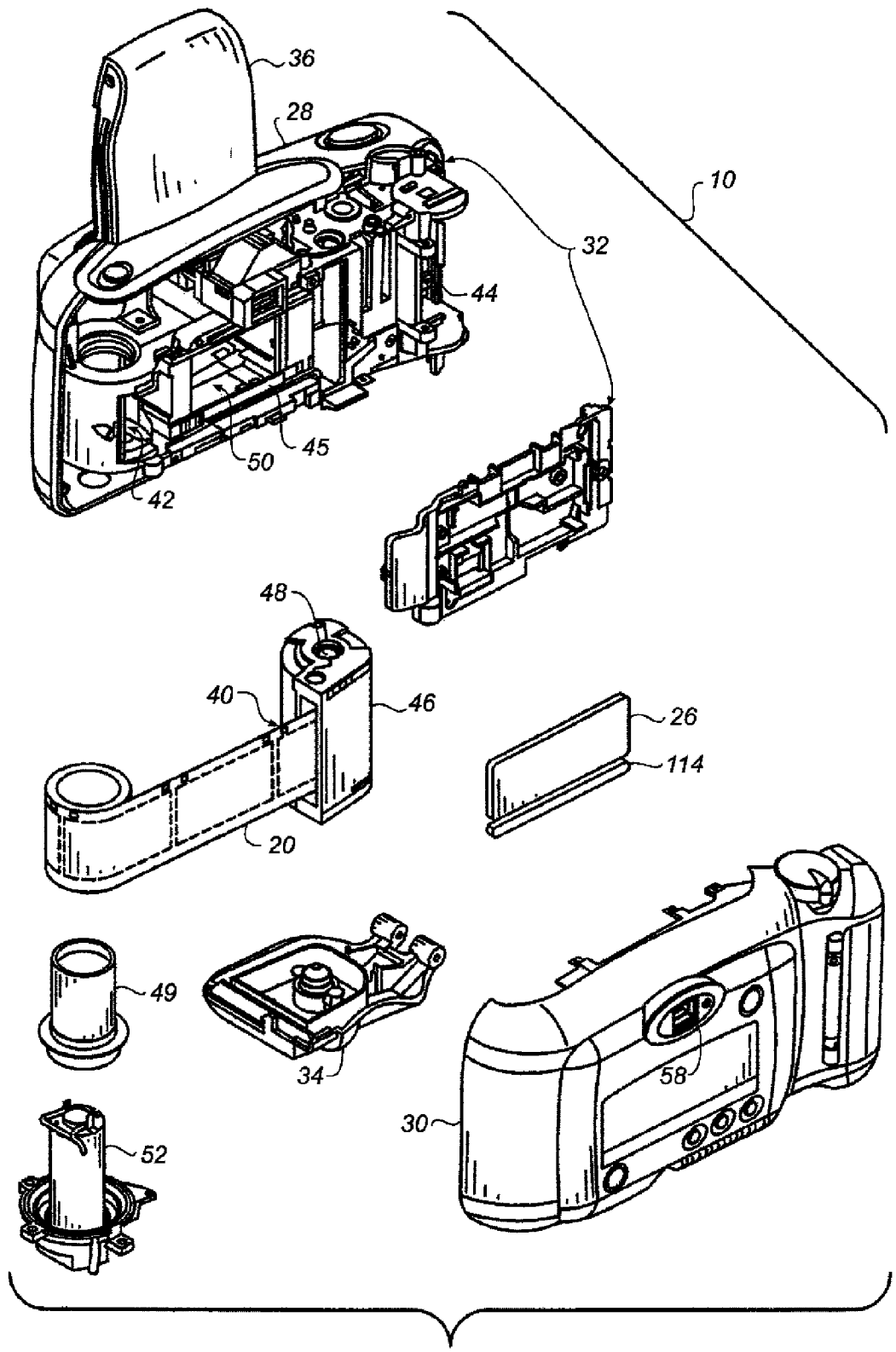
FIG. 8 is an exploded view of the camera of FIG. 7.

The film image capture unit 16 has a film holder 38 that holds a film unit 40 during use. In the camera of FIGS. 7-8, the film holder 38 is part of the chassis 32. (The term "film unit 40" is used to refer to photographic film 20 and any accompanying canister or other support structure or light block, or the like.)

The configuration of the film holder 38 is a function of the type of film unit 40 used. The type of film unit 40 used is not critical. The camera 10 shown in the figures is film reloadable and uses an Advanced Photo System ("APS") film cartridge. Other types of one or two chamber film cartridge could also be used and roll film can also be used. It is currently preferred that the camera 10 is reloadable. The camera 10 can have a IX-DX code reader (not shown) to determine the film type and a data recorder 398 to write data on the film indicating how many prints of each film frame to produce, print format, and the like. This is not limiting. Information including metadata can be read and written by any means well known to those of skill in the art.

The film holder 38 includes a pair of film chambers 42,44 and an exposure frame 45 between the film chambers 42,44. The film unit 40 has a canister 46 disposed in one of the chambers. A filmstrip 20 is wound around a spool 48 held by the canister 46. During use, the filmstrip 20 extends across the exposure frame 45 and is wound into a film roll in the other chamber. The exposure frame 45 has an opening 50 through which a light image exposes a frame of the film 20 at each picture-taking event.

During use, the filmstrip 20 is moved by a film transport 52 out of the canister 46 of the film cartridge 40, is wound into a film roll in the supply chamber 44, and is then returned to the canister 46. The film transport 52, as illustrated, includes an electric motor located within a supply spool 49, but other types of motorized transport mechanisms and manual transports can also be used. Filmstrip exposure can be on film advance or on rewind.

The electronic image capture unit has an electronic array imager 24. The electronic array imager 24 is configured so as to capture, for each picture-taking event, one or more electronic images that correspond to a latent image concurrently captured on the filmstrip 20. The type of imager 24 used may vary, but it is highly preferred that the imager 24 be one of the several solid-state imagers available. One highly popular type of solid-state imager commonly used is the charge-coupled device ("CCD"). Of the several CCD types available, two allow easy electronic shuttering and thereby are preferable in this use. The first of these, the frame transfer CCD, allows charge generation due to photoactivity and then shifts all of the image charge into a light shielded, non-photosensitive area. This area is then clocked out to provide a sampled electronic image. The second type, the interline transfer CCD, also performs shuttering by shifting the charge, but shifts charge to an area above or below each image line so that there are as many storage areas as there are imaging lines. The storage lines are then shifted out in an appropriate manner.

Each of these CCD imagers has both advantages and disadvantages, but all will work in this application. A typical CCD has separate components that act as clock drivers, analog signal processor-analog/digital converter 104 (also referred to as "A/D converter 104"). It is also possible to use an electronic image sensor manufactured with CMOS technology. This type of imager is attractive for use, since it is manufactured easily in a readily available solid-state process and lends itself to use with a single power supply. In addition, the process allows peripheral circuitry to be integrated onto the same semiconductor die. For example, a CMOS sensor can include clock drivers, the A/D converter 104, and other components integrated on a single IC. A third type of sensor which can be used is a charge injection device (CID). This sensor differs from the others mentioned in that the charge is not shifted out of the device to be read. Reading is accomplished by shifting charge within the pixel. This allows a nondestructive read of any pixel in the array. If the device is externally shuttered, the array can be read repeatedly without destroying the image. Shuttering can be accomplished by external shutter or, without an external shutter, by injecting the charge into the substrate for recombination.

The electronic image capture unit captures a three-color image. It is highly preferred that a single imager be used along with a three-color or four color filter, however, multiple monochromatic imagers and filters can be used. Suitable three-color filters are well known to those of skill in the art, and are normally incorporated with the imager to provide an integral component. For convenience, the camera 10 is generally discussed herein in relation to embodiments having a single imager 24 with a three color filter (not separately illustrated). It will be understood that like considerations apply to cameras 10 using more than three colors as well as cameras using multiple monochromatic imagers.

Figure 25:
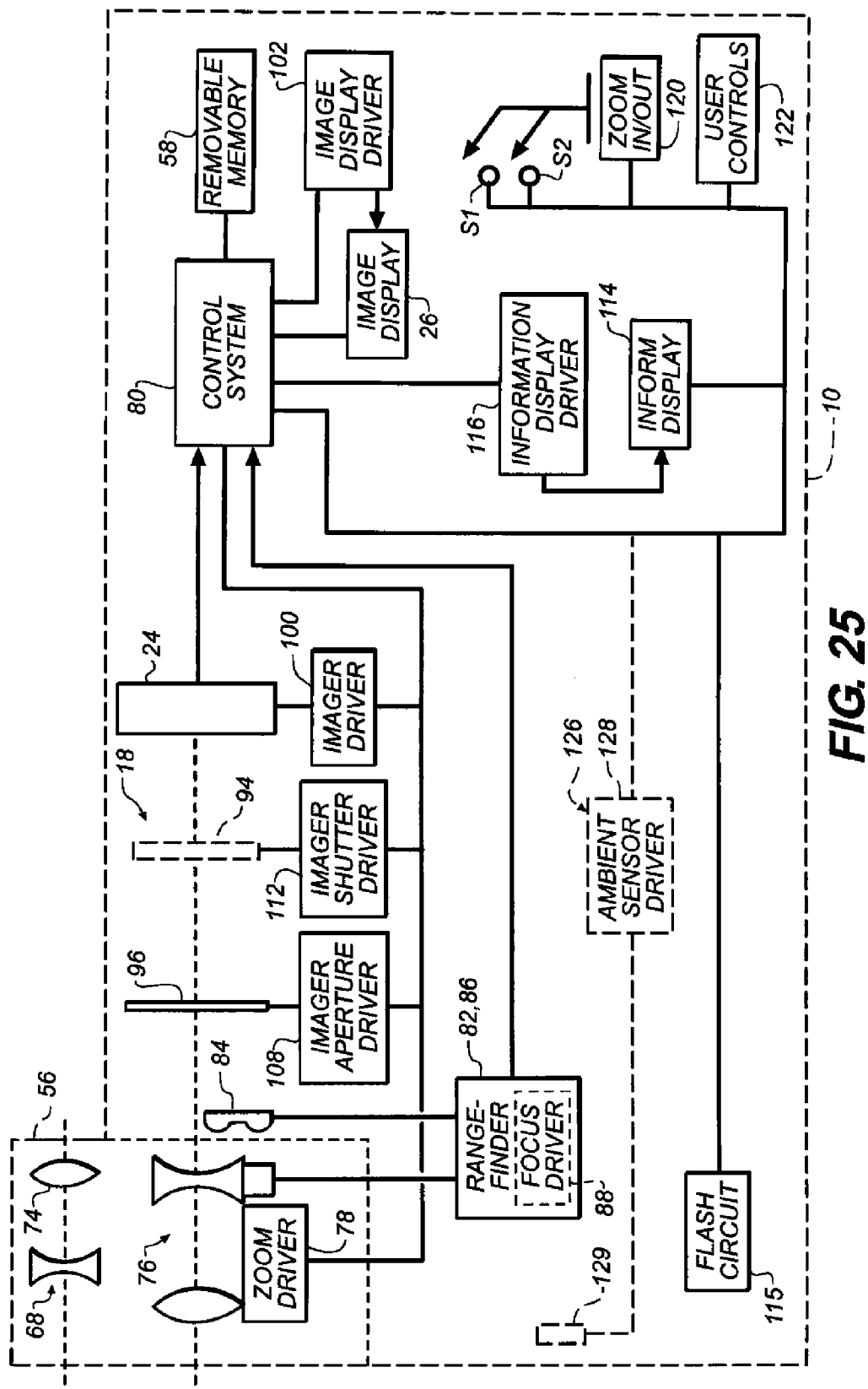
FIG. 25 is a schematic diagram of an electronic camera that is a modification of the camera of FIG. 1.

Referring to FIG. 25, in some embodiments the archival image capture unit 16 also captures the archival image electronically and stores the archival image in digital form. In this latter case, the "capture media" is digital storage media, such as electronic or magnetic memory and the archival images are transferred in digital form for photofinishing. The memory 54 be fixed in the camera 10 or removable. The type of memory 54 used and the manner of information storage, such as optical or magnetic or electronic, is not critical. For example, removable memory can be a floppy disc, a CD, a DVD, a tape cassette, or flash memory card or stick. The transfer of images in digital form can be on physical media or as a transmitted electronic signal.

Two electronic capture units 16,18 can be present in the camera 10, with one used as the evaluation capture unit and the other used as the archival capture unit. An example of a suitable digital camera having two such electronic capture units is described in U.S. Pat. No. 5,926,218, entitled "ELECTRONIC CAMERA WITH DUAL RESOLUTION SENSORS", to Smith; which is hereby incorporated herein by reference. Alternatively, a single electronic capture unit 1618 can be used as both the evaluation capture unit 18 and the archival image capture unit 16. In this case, the archival image is derived from the original electronic image by an archival image definition unit and the scene is defined by the effective field of view resulting from this operation. With a fully electronic camera 10, the derived images can be subsampled from the original electronic image so as to provide lower resolution derived images. The lower resolution derived images can be provided using the method described in commonly assigned U.S. Pat. No. 5,164,831, entitled "ELECTRONIC STILL CAMERA 10 PROVIDING MULTI-FORMAT STORAGE OF FULL AND REDUCED RESOLUTION IMAGES", to Kuchta, et. al; which is hereby incorporated herein by reference.

The camera 10 can alternatively allow use of either a film image capture unit 16 or an electronic capture unit as the archival image capture unit 16, at the selection of the photographer or on the basis of available storage space in one or another capture media or on some other basis. For example, a switch (not separately illustrated) can provide alternative film capture and electronic capture modes. The camera 10 otherwise operates in the same manner as the other described embodiments. For convenience, the camera 10 is generally discussed herein in relation to the embodiment of FIG. 4. Like considerations apply to other embodiments.

Figure 4:
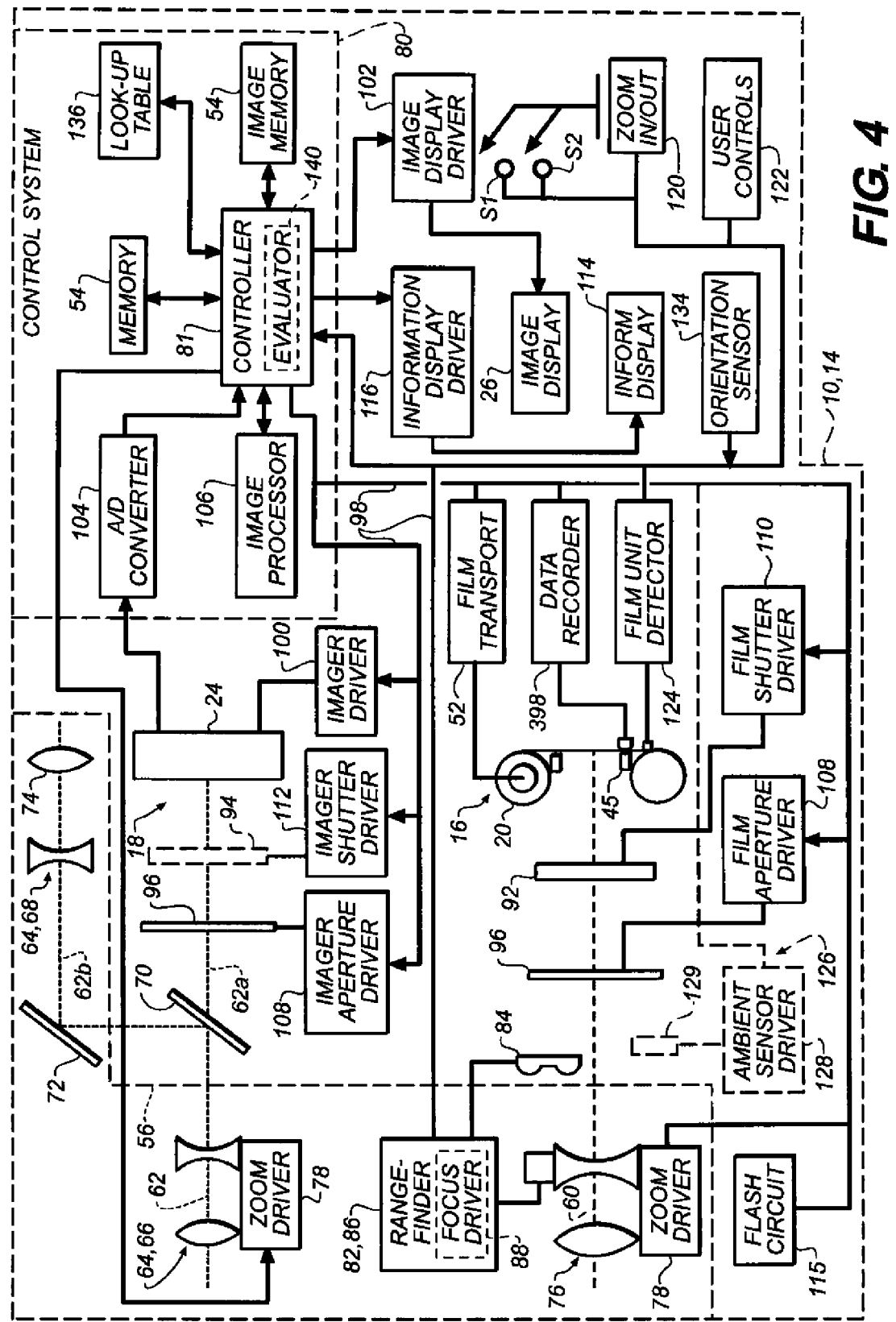
FIG. 4 is a schematic diagram of the camera of FIG. 1.

Referring now primarily to FIG. 4, the camera 10 has an optical system 56 of one or more lenses mounted in the body 12. The optical system 56 is illustrated by a dashed line and several groups of lens elements. It will be understood that this is illustrative, not limiting. The optical system 56 directs light to the exposure frame 45 (if present) and to the electronic array imager 24. The optical system 56 also preferably directs light through an optical viewfinder 58 to the user.

Figure 5:
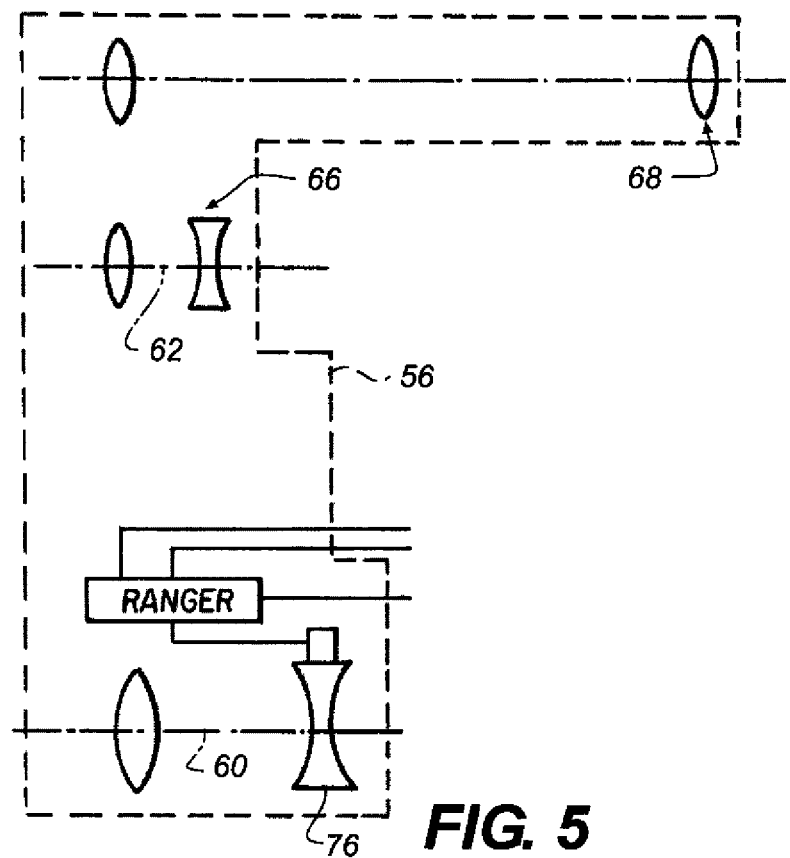
FIG. 5 is a partial schematic diagram of a modification of the camera of FIG. 1.
Figure 6:
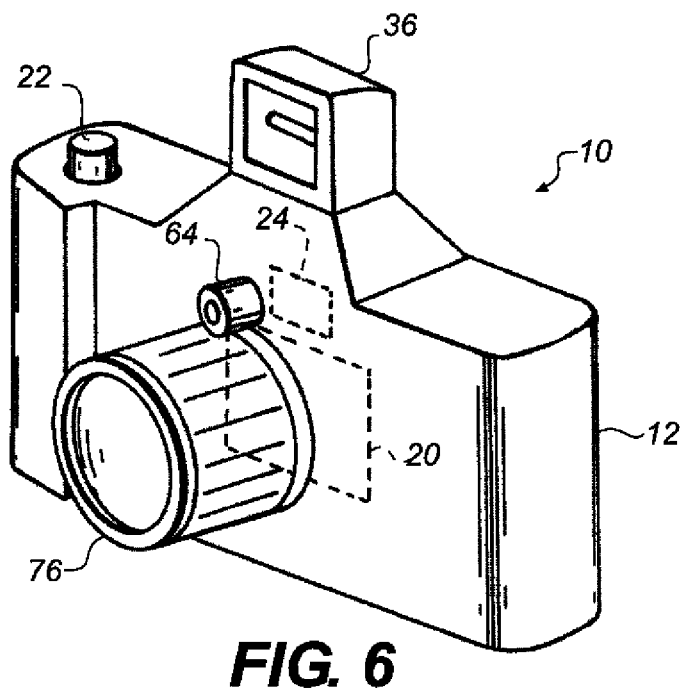
FIG. 6 is a front perspective view of another modification of the camera of FIG. 1.

Referring to FIGS. 4-5, the imager 24 is spaced from the exposure frame 45, thus, the optical system 56 directs light along a first path (indicated by a dotted line 60) to the exposure frame 45 and along a second path (indicated by a dotted line 62) to the electronic array imager 24. Both paths 60,62 converge at a position in front of the camera 10, at the plane of the subject image. In FIG. 4, the optical system 56 has a combined lens unit 64 that includes both an imager lens unit 66 and a viewfinder lens unit 68. The combined lens unit 64 has a partially transmissive mirror 70 that subdivides the second light path 62 between an imager subpath 62a to the imager 24 and a viewfinder subpath 62b that is redirected by a fully reflective mirror 72 and transmitted through an eyepiece 74 to the photographer.

The optical system 56 can be varied. For example, the viewfinder lens unit 68, imager lens unit 66, and a taking lens unit 76 can be fully separate, as shown in FIG. 5, or a combined lens unit can include both a taking lens unit and an imager lens unit (not shown). Other alternative optical systems can also be provided.

In most cameras, there is a variation between the field of view of the viewfinder and the field of view of the archival image capture unit. The scene delineated by the viewfinder is typically 80 to 95 percent of the field of view of the archival image capture unit. The difference ensures that everything the photographer sees will be captured in the archival image, albeit with some additional image content at the edges. Cameras 10 are generally described and illustrated herein in terms of viewfinders 58 that have a 100 percent match to the field of view of the archival image capture unit 16. This is a matter of convenience in describing the invention. The viewfinders 58 of the cameras 10 can be limited to 80 to 95 percent of the field of view of the archival image capture unit 16 without changing the other features described.

Referring again to the embodiment shown in FIG. 4, the taking lens unit 76 is a motorized zoom lens in which a mobile element or elements are driven, relative to a stationary element or elements, by a zoom driver 78. The combined lens unit 64 also has a mobile element or elements, driven, relative to a stationary element or elements, by a zoom driver 78. The different zoom drivers 78 are coupled so as to zoom together, either mechanically (not shown) or by a control system 80 signaling the zoom drivers 78 to move the zoom elements of the units over the same or comparable ranges of focal lengths at the same time. The control system 80, which includes a controller 81, can take the form of an appropriately configured microcomputer, such as an embedded microprocessor having RAM or other memory for data manipulation and general program execution.

The taking lens unit 76 of the embodiment of FIG. 4 is also autofocusing. An autofocusing system 82 has a rangefinder 86 that includes a sensor 84. The rangefinder operates a focus driver 88, directly or through the control system 80, to move one or more focusable elements (not separately illustrated) of the taking lens unit 76. The rangefinder 86 can be passive or active or a combination of the two.

Figure 2:
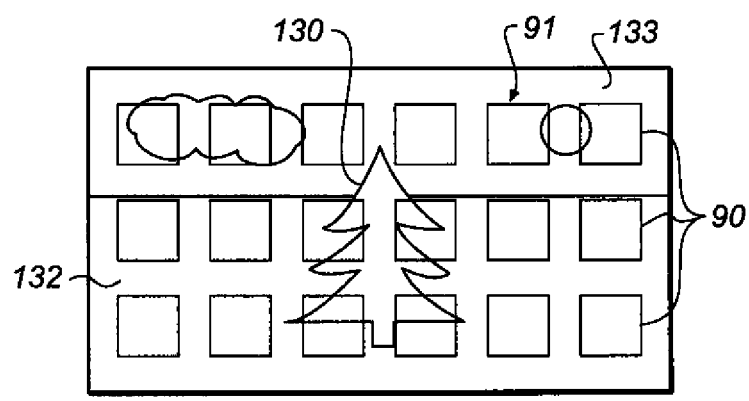
FIG. 2 is a diagram of the grid of regions formed by the sensors of the rangefinder of the camera of FIG. 1 mapped on the same scene as shown by the viewfinder in FIG. 1.

Referring now to FIG. 2, in preferred embodiments, the rangefinder 86 of the camera 10 divides the scene 133 into a grid 91 of regions 90 (illustrated as boxes in FIG. 2) and senses distances, for each region 90, to within the limits of one of several distance ranges. A wide variety of suitable multiple sensor rangefinders are known to those of skill in the art. For example, U.S. Pat. No. 5,440,369 discloses such a rangefinder. The rangefinder 86 then provides the distance range for each region 90 to the control system 80, which then determines a subject-background pattern of the scene, as discussed below.

The taking lens unit 76 can be simple, such as having a single focal length and manual focusing or a fixed focus, but this is not preferred. One or both of the viewfinder lens unit 68 and imager lens unit 66 can have a fixed focal length or one or both can zoom between different focal lengths. Digital zooming (enlargement of a digital image equivalent to optical zooming) can also be used instead of or in combination with optical zooming for the imager 24. The imager 24 and image display 26 can be used as a viewfinder prior to image capture in place of or in combination with the optical viewfinder 58, as is commonly done with digital still cameras 10. This approach is not currently preferred, since battery usage is greatly increased.

Although the camera 10 can be used in other manners, the archival image is intended to provide the basis of the photofinished final image desired by the user. The derived images thus do not have to have the same quality as the archival image. As a result, the imager 24 and the portion of the optical system 56 directing light to the imager 24 can be made smaller, simpler, and lighter. For example, the taking lens unit 76 can be focusable and the imager lens unit 66 can have a fixed focus or can focus over a different range or between a smaller number of focus positions.

A film shutter 92 shutters the light path to the exposure frame 45. An imager shutter 94 shutters the light path to the imager 24. Diaphragms/aperture plates 96 can also be provided in both of the paths. Each of the shutters 92,94 is switchable between an open state and a closed state. The term "shutter" is used in a broad sense to refer to physical and/or logical elements that provide the function of allowing the passage of light along a light path to a filmstrip or imager for image capture and disallowing that passage at other times. "Shutter" is thus inclusive of, but not limited to, mechanical and electromechanical shutters of all types. "Shutter" is not inclusive of film transports and like mechanisms that simply move film or an imager in and out of the light path. "Shutter" is inclusive of computer software and hardware features of electronic array imagers that allow an imaging operation to be started and stopped under control of the camera controller.

In currently preferred embodiments, the film shutter 92 is mechanical or electromechanical and the imager shutter 94 is mechanical or electronic. The imager shutter 94 is illustrated by dashed lines to indicate both the position of a mechanical imager shutter and the function of an electronic shutter. When using a CCD, electronic shuttering of the imager 24 can be provided by shifting the accumulated charge under a light shielded register provided at a non-photosensitive region. This may be a full frame as in a frame transfer device CCD or a horizontal line in an interline transfer device CCD. Suitable devices and procedures are well known to those of skill in the art. When using a CID, the charge on each pixel is injected into a substrate at the beginning of the exposure. At the end of the exposure, the charge in each pixel is read. The difficulty encountered here is that the first pixel read has less exposure time than the last pixel read. The amount of difference is the time required to read the entire array. This may or may not be significant depending upon the total exposure time and the maximum time needed to read the entire array.

CMOS imagers are commonly shuttered by a method called a rolling shutter. CMOS imagers using this method are not preferred, since this shutters each individual line to a common shutter time, but the exposure time for each line begins sequentially. This means that even with a short exposure time, moving objects will be distorted. Given horizontal motion, vertical features will image diagonally due to the temporal differences in the line-by-line exposure. Another method for shuttering CMOS imagers is described in U.S. Pat. No. 5,986,297. In this method, called single frame capture mode, all pixels are allowed to integrate charge during the exposure time. At the end of the exposure time, all pixels are simultaneously transferred to the floating diffusion of the device. At this point sequential read out by lines is possible.

Signal lines 98 electronically connect the imager 24 through the control system 80 to the image display 26. The imager 24 receives a light image and converts the light image to an analog electrical signal, that is, an analog electronic image. (For convenience, electronic images are generally discussed herein in the singular. Like considerations apply to each image of a plurality captured for a particular picture-taking event.)

The electronic imager 24 is driven by the imager driver 100. The image display 26 mounted on the outside of the camera body 12 is driven by an image display driver 102 and produces a light image (also referred to here as a "display image") that is viewed by the user.

The control system 80 controls other components of the camera 10 and performs processing related to the derived image. The control system 80, as earlier discussed, includes the controller 81 and memory 54 and also includes an A/D converter 104 and an image processor 106. Other components can also be provided, as discussed below, in detail. Suitable components for the control system 80 are known to those of skill in the art. Modifications of the control system 80 are practical, such as those described elsewhere herein. The controller 81 can be provided as a single component, such as a microprocessor, or as multiple components of equivalent function in distributed locations. The same considerations apply to the processor 106 and other components. Likewise, components illustrated as separate units herein may be conveniently combined or shared in some embodiments.

"Memory 54" refers to one or more suitably sized logical units of physical memory provided in semiconductor memory or magnetic memory, or the like. For example, the memory 54 can be an internal memory, such as a Flash EPROM memory, or alternately a removable memory, such as a CompactFlash card, or a combination of both. The controller 81 and image processor 106 can be controlled by software stored in the same physical memory that is used for image storage, but it is preferred that the processor 106 and controller 81 are controlled by firmware stored in dedicated memory, for example, in a ROM or EPROM firmware memory. Separate dedicated units of memory can also be provided to support other functions.

The captured analog electronic image is amplified and converted by the analog to digital (A/D) converter-amplifier 104 to a digital electronic image, which is then processed in the image processor 106 and stored in the memory 54. It is currently preferred that the signal lines 98 act as a data bus connecting the imager 24, controller 81, processor 106, the image display 26, and other electronic components.

The controller 81 includes a timing generator (not separately illustrated) that supplies control signals for all electronic components in timing relationship. Calibration values for the individual camera 10 are stored in a calibration memory (not separately illustrated), such as an EEPROM, and supplied to the controller 81. The controller 81 operates the memory or memories 54 and the drivers including the zoom drivers 78, focus driver 88, imager driver 100, image display driver 102, aperture drivers 108, and film and imager shutter drivers 110,112. The controller 81 connects to a flash circuit 115 that mediates flash functions.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared in some embodiments.

The digital electronic image stored in memory 54, is accessed by the processor 106 and is modified so as to provide a required derived image. As a part of showing a derived image on the image display, the camera 10 may modify the derived image for calibration to the particular display. For example, a transform can be provided that modifies each image to accommodate the different capabilities in terms of gray scale, color gamut, and white point of the display and the imager and other components of the electronic capture unit. It is preferred that the display is selected so as to permit all of the verification image to be shown; however, more limited displays can be used. In the latter case, the displaying of the verification image includes calibration that cuts out part of the image, or contrast levels, or some other part of the information in the verification image.

The derived images can also be modified in the same manner that images are enhanced in fully digital cameras. For example, processing can provide interpolation and edge enhancement. A limitation here is that the derived images are intended to correspond to photofinished archival images and, thus, enhancements should limited so as to not render the derived image dissimilar to the corresponding photofinished archival image. If the archival image is an electronic image, then comparable enhancements can be provided for both verification and archival images. Digital processing of an electronic archival image can also include modifications related to file transfer, such as, JPEG compression, and file formatting.

Enhancements can be provided to match the calibrated derived image to output characteristics of a selected photofinishing channel. Photofinishing related adjustments assume foreknowledge of the photofinishing procedures that will be followed for a particular unit of capture media. This foreknowledge can be made available by limiting photofinishing options for a particular capture media unit or by standardizing all available photofinishing or by requiring the user to select a photofinishing choice, for example by entering a character on a control pad or setting a switch. This designation can then direct the usage of particular photofinishing options and can provide for a direct or indirect indication of the effect in a derived image. The application of a designation on a capture media unit could be provided by a number of means known to those in the art, such as application of a magnetic or optical code.

Derived images can be prepared from the electronic image before being needed or as needed, as desired, subject to the limitations of processing speed and available memory. To minimize the size of the memory, an electronic image can be processed and stored as a lower resolution image, before a succeeding image is read out from the imager.

The controller 81 facilitates the transfers of the image, along the signal lines, between the electronic components and provides other control functions, as necessary. The controller 81 includes a timing generation circuit (not separately illustrated) that produces control signals for all electronic components in timing relationship. The controller 81 is illustrated as a single component, but it will be understood that this is a matter of convenience in illustration. The controller 81 can be provided as multiple components of equivalent function in distributed locations. The same considerations apply to the processor 106 and other components. Likewise, components illustrated as separate units herein may be conveniently combined or shared in some embodiments.

Different types of image display 26 can be used. For example, the image display can be a liquid crystal display ("LCD"), a cathode ray tube display, or an organic electroluminescent display ("OELD"; also referred to as an organic light emitting display, "OLED").

The image display 26 is preferably mounted on the back or top of the body 12, so as to be readily viewable by the photographer immediately following a picture taking. One or more information displays 114 can be provided on the body 12, to present camera information to the photographer, such exposures remaining, battery state, printing format (such as C, H, or P), flash state, number of prints ordered, and the like. For convenience, the information display is generally discussed here in the singular. The information display 114 provides a variety of camera 10 related information and can include a warning message if an archival image will provide an unsuitable quality print or other final image after photofinishing, as discussed below in detail. The information display 114 and image display 26 can be provided by separate display devices or both be provided by contiguous parts of a common display device. The information display 114 can be deleted if information is instead provided on the image display 26 as a superimposition on the image or alternately instead of the image (not illustrated). If separate, the information display 114 is operated by an information display driver 116. Alternatively, the camera 10 can include a speaker 237 which provides audio warnings instead of, or in addition to, visual warnings depicted on the information display 114, image display 26, or both.

In the embodiment shown in FIG. 1, the image display 26 is mounted to the back of the body 12 and the information display 114 is mounted to the body 12 adjacent to the image display 26 such that the two displays form part of a single user interface 118 that can be viewed by the photographer in a single glance. The image display 26, and an information display 114, can be mounted instead or additionally so as to be viewable through the viewfinder 58 as a virtual display (not shown).

It is preferred that the image display 26 is operated on demand by actuation of a switch (not separately illustrated) and that the image display 26 is turned off by a timer or by initial depression of the shutter release 22. The timer can be provided as a function of the controller 81.

Referring now particularly to FIGS. 1 and 4, the user interface 118 of the camera 10 includes the shutter release 22, a "zoom in/out" button 120 that controls the zooming of the lens units, and other user controls 122 along with the image display 26 and the information display 114. The shutter release 22 operates both shutters 92,94. To take a picture, the shutter release 22 is actuated by the user and trips from a set state to an intermediate state, and then to a released state. The shutter release 22 is typically actuated by pushing, and, for convenience the shutter release 22 is generally described herein in relation to a shutter button that is initially depressed through a "first stroke", to actuate a first switch S1 and alter the shutter release 22 from the set state to the intermediate state and is further depressed through a "second stroke", to actuate a second switch S2 and alter the shutter release 22 from the intermediate state to the released state. Like other two stroke shutter releases well known in the art the first stroke actuates exposure-delimiting camera components, such as autofocus, autoexposure, and flash unit readying; and the second stroke actuates capture of the archival image.

Referring now to FIG. 4, when the shutter release 22 is pressed to the first stroke, the taking lens unit 76 and combined lens unit 64 are each auto focused to a detected subject distance based on subject distance data sent by the rangefinder 86 to the controller 81. The controller 81 also receives data indicating what focal length the lens units 76,64 are set at from one or both of the zoom drivers 78 or a zoom sensor (not shown). The camera 10 also detects the film speed of the film cartridge 40 loaded into the camera 10 using a film unit detector 124 and relays this information to the controller 81. The camera 10 obtains scene brightness (Bv) from components, discussed below, that function as a light meter. The scene brightness and other exposure parameters are provided to an algorithm in the controller 81, which determines a focused distance, shutter speeds, apertures, and optionally a gain setting for amplification of the analog signal provided by the imager 24. Appropriate signals for these values are sent to the drivers 88,100,108,110,112 via a motor driver interface (not shown) of the controller 81. The gain setting is sent to the ASP-A/D converter 104.

The camera 10 assesses ambient lighting using the imager 24 or a separate detector 126 (indicated by dashed lines in the figures) or both. The detector has an ambient detector driver 128 that operates a single sensor 129 or multiple sensors (not shown). The term "sensor" is inclusive of an array of sensors. Sensors are referred to here as being "single" or "multiple" based on whether the ambient light detection separately measures light received from different parts of the ambient area. A "single sensor" may have separate photodetectors for different colors. The ambient light detector or sensors can receive light from the optical system 56 or can be illuminated external to the optical system 56.

In some embodiments, the evaluation capture unit 18 is used to assess ambient lighting. In those embodiments, one or more electronic images are captured prior to capture of the archival image. The captured electronic image data from one or more of these preliminary images is sampled and scene parameters, such as automatic setting of shutter speeds and diaphragm settings, are determined from that data. These preliminary electronic images can be captured in a continuing sequence as long as the capture system 14 is in a preliminary mode. For example, preliminary images can be captured, seratim, as long as the shutter release 22 is actuated through the first stroke and is maintained in that position. This capture of preliminary images ends when the shutter release 22 is returned to a stand-by position or is actuated through the second stroke for archival image capture. The preliminary electronic images could be saved to memory 54; but, except as otherwise described here, are ordinarily discarded, one after another, when the replacement electronic image is captured to reduce memory usage. The preliminary images can also be provided to the image display 26 for use by the photographer, prior to picture taking, in composing the picture. This use of the image display 26 as an electronic viewfinder greatly increases energy usage and is not preferred for that reason.

The electronic capture unit is calibrated during assembly, to provide measures of illumination, using known values. For example, the controller 81 can process the data presented in a preliminary image using the same kinds of light metering algorithms as are used for multiple spot light meters. The procedure is repeated for each succeeding preliminary image. Individual pixels or groups of pixels take the place of the individual sensors used in the multiple spot light meters. For example, the controller 81 can determine a peak illumination intensity for the image by comparing pixel to pixel until a maximum is found. Similarly, the controller 81 can determine an overall intensity that is an arithmetic average of all of the pixels of the image. Many of the metering algorithms provide an average or integrated value over only a selected area of the imager array 24, such as an upper middle region. Another approach is to evaluate multiple areas and weigh the areas differently to provide an overall value. For example, in a center weighted system, center pixels are weighted more than peripheral pixels. The camera 10 can provide manual switching between different approaches, such as center weighted and spot metering. The camera 10 can alternatively, automatically choose a metering approach based on an evaluation of scene content. For example, an image having a broad horizontal bright area at the top can be interpreted as sky and given a particular weight relative to the remainder of the image.

Under moderate lighting conditions the imager 24 can provide light metering and color balance determination from a single preliminary image. More extreme lighting conditions can be accommodated by use of more than one member of the series of preliminary electronic images while varying exposure parameters until an acceptable electronic image has been captured. The manner in which the parameters are varied is not critical.

The following approach is convenient. When an unknown scene is to be measured, the imager 24 is set to an intermediate gain and the image area of interest is sampled. If the pixels measure above some upper threshold value (TH) such as 220, an assumption is made that the gain is too high and a second measurement is made with a gain of one-half of the initial measurement (1 stop less). (The values for TH and TL given here are by way of example and are based on 8 bits per pixel or a maximum numeric value of 255.) If the second measurement provides a code value corresponding to approximately one-half the previous measured sensor illumination level, it is assumed that the measurement is accurate and representative. If the second measurement is still above TH, the process is repeated until a measurement is obtained that has a value that is one half that of the preceding measurement. If the initial measurement results in a value less than a low threshold (TL) such as 45, the gain is doubled and a second measurement made. If the resultant measurement is twice the first measurement, it is assumed that the measurement is accurate and representative. If this is not the case, then the gain is doubled again and the measurement is repeated in the same manner as for the high threshold. Exposure parameters, such as aperture settings and shutter speeds can be varied in the same manner, separately or in combination with changes in gain. In limiting cases, such as full darkness, the electronic image capture unit is unable to capture an acceptable image. In these cases, the evaluator 140 (illustrated in FIG. 4, as a dashed box within controller 81) can provide a warning message to the user that the camera 10 cannot provide appropriate settings under the existing conditions. The evaluator 140 is generally treated herein as a part of the controller 81. The evaluator 140 can also be provided as a separate component or as part of another component of the control system 80.

After the controller 81 receives the scene brightness value, the controller 81 compares scene brightness to a flash trip point. If the light level is lower than the flash trip point, then the controller 81 enables full illumination by the flash unit 36, unless the user manually turned the flash off. Appropriate algorithms and features for these approaches are well known to those of skill in the art.

A second switch S2 actuates when the shutter release 22 is further pushed to a second stroke. When the second switch S2 actuates, the film shutter 92 is tripped and the capture of the latent image exposure on the film frame begins. The film shutter 92 momentarily opens for a duration referred to herein as a "archival image exposure time interval". The imager shutter 94 is also actuated and momentarily opens one or more times during the archival image exposure time interval.

Revision Suggestions and Use of Oversized Imager

In particular embodiments, the camera 10 provides revision suggestions to the user, after successful image capture. (Unsuccessful image capture is discussed below, in relation to warning messages.)

Figure 3:
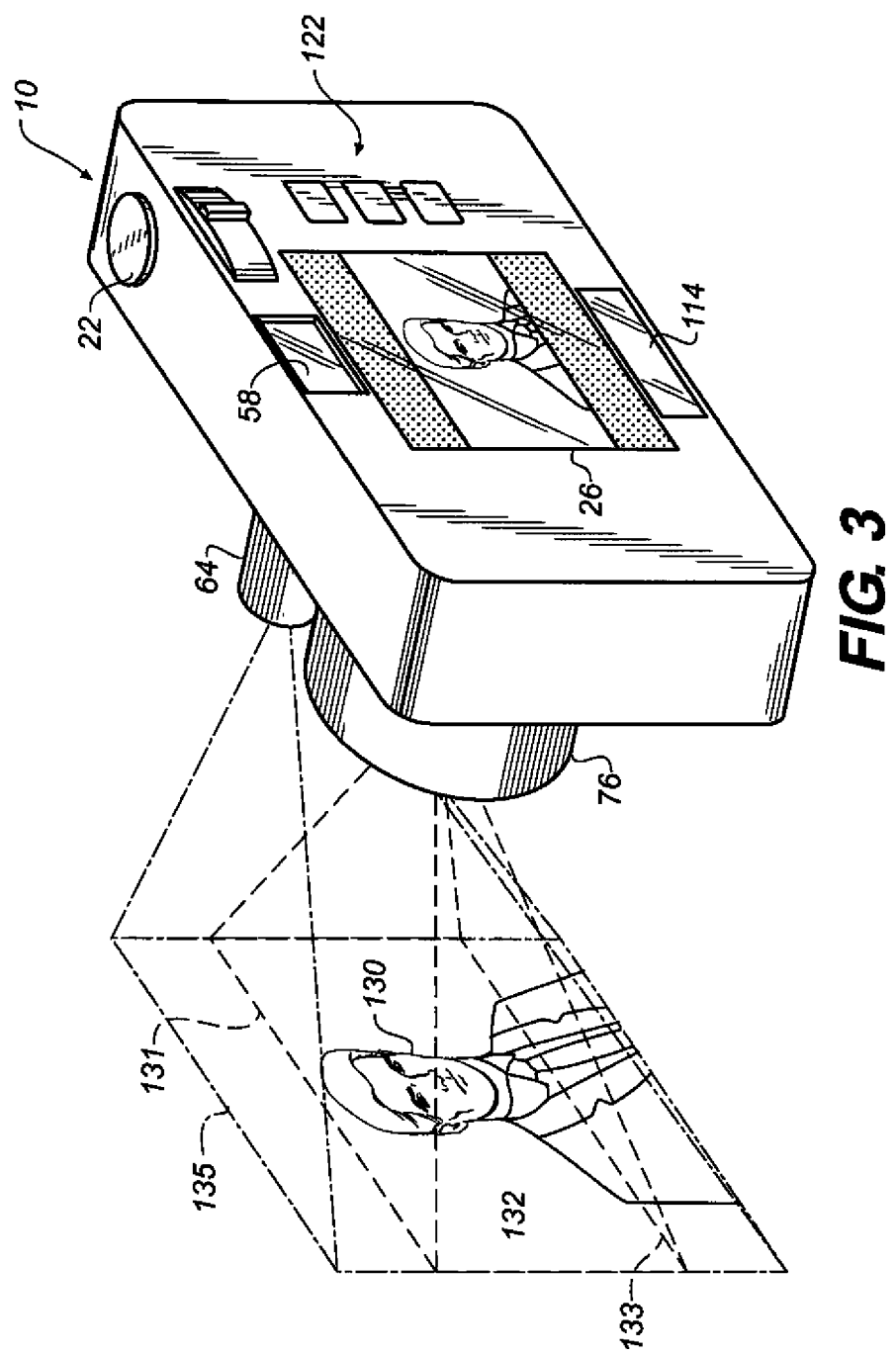
FIG. 3 is a diagrammatical perspective view illustrating for a particular capture event using the camera of FIG. 1: the scene, the archival angle of view, and the assessment angle of view.

Referring now to FIG. 3, the camera 10 is aimed by the user at a subject of interest 130. With the camera 10 aimed, an archival angle of view (indicated by dashed lines in FIG. 3) of the archival image capture unit 16 defines a photographic scene 133 for archival capture and the evaluation capture unit 18 defines an assessment angle of view 135 that may or may not be the same as the angle of view of the archival capture unit 16. In FIG. 3, the assessment angle of view 135 includes the archival angle of view 131 indicated by dashed lines and the additional volume indicated by dot-dashed lines in FIG. 3.

As an aid in aiming, it is highly preferred that the photographic scene 133 defined by the archival image capture unit 16 is also delineated in a viewfinder 58 of the camera 10 (within ordinary viewfinder limits, as already discussed). The delineation of the scene in the viewfinder 58 can be accomplished by limiting the field of view of the viewfinder 58 to match the scene or by defining the scene by imposing a reticle on a larger field of view.

The terms "photographic scene" and "scene" as used herein, refer to everything in a particular light image that has been or would be captured by the archival image capture unit 16 of the camera 10. In other words, the photographic scene is defined by the field of view of the archival image capture unit 16. The term "field of view" is used herein to refer to the entire area imaged by a particular optical component or system. The "scene" is the totality of what the user has composed for archival image capture in a particular picture taking event. The "scene" generally can be classified as having a subject 130 and a background 132. From the viewpoint of the photographer, the subject 130 is the important part of the scene, such as a person or object or interest, and the background 132 is ancillary.

The photographic scene is defined by archival image capture or, alternatively, by a user designation of a photographic scene independent of archival image capture. The latter provides for use of the camera 10 as an instructional tool without archival image capture. The user designation, in that case, can be provided by actuation of the shutter release 22 through the second stroke, when archival media is not present in the camera 10 or archival image capture is disabled by the user. The user designation can alternatively be provided by actuation of a separate control (not illustrated) provided for that purpose. For convenience, the following discussion is limited to revision suggestions prepared following archival image capture. It will be understood that like considerations apply when the camera 10 is used as an instructional tool without archival image capture.

Again referring to FIG. 3, while the scene is delineated in the viewfinder 58, an archival image is captured along with one or more original electronic images. The original electronic images each have a field of view that is inclusive of the defined scene, and, in some cases, is larger than the field of view of the defined scene. Following capture, one or more images are derived from the original electronic image and these derived images are displayed to the user on the image display 26 mounted to the body 12 of the camera 10, either on demand or automatically following capture. More than one derived image can be shown on the image display 26 at the same time, but due to size constraints, it is preferred that each of the derived images are displayed in alternation. It is also preferred that the derived images are only shown on demand, so as to not distract the user during continued picture taking.

It is preferred that an original electronic image is captured concurrently with the capture of the archival image and that a derived image corresponding to the scene is made available for display immediately following image capture. This derived image is also referred to herein as the "derived scene image". As earlier indicated, when matched to resemble a corresponding archival image after expected photofinishing, the derived scene image is also referred to herein as a "verification image". Derived images including different parts of the original electronic image than the derived scene image and derived images with modified exposure parameters relative to a corresponding archival image are referred to herein as "assessment images".

The cameras 10 are generally discussed herein in terms of embodiments in which derived images include a verification image and assessment images. It will be apparent that like considerations apply to other, different embodiments.

Following successful capture of the original electronic image, exposure information for the derived scene image is analyzed for common photographer errors and oversights, and, responsive to that analyzing, one or more revision suggestions for changes in an ensuing capture of an archival image of the same subject matter are displayed to the user. The exposure information can include such information as rangefinder data on the regions 90 corresponding to the derived scene image, the camera orientation, the selected print format (aspect ratio), and brightness and color information for different areas of the image. The camera orientation is provided by a camera orientation sensor 134. The print format is indicated by a user actuable switch (not separately illustrated). Brightness and color information can be derived from the electronic image or one or more separate sensors or both.

It is highly preferred that the analysis of the exposure information includes one or more different determinations directed to identifying the photographic subject and background in the photographed scene and derived scene image. The reason for this preference is that revision suggestions relating to composition are expected to be more of a help to a novice photographer than other revision suggestions. This is particularly the case where the camera 10 provides one or more automatic functions, such as automatic flash and focusing, which eliminate the need for some possible revision suggestions. A novice photographer is also less likely to recognize and know how to remedy compositional shortcomings shown in a verification image, than other shortcomings, such as brightness problems. On the other hand, the compositional shortcomings are likely to be just as apparent to the user in finished prints or other relatively large images. The novice may also need encouragement to retake a picture with a compositional problem than to retake a picture that is too bright, or too dark, or blurred by camera movement, or the like. In this case, the revision suggestion acts as a teaching tool and encourages the user to try different compositions that might not otherwise come to mind.

It is preferred that the determination of subject and background uses rangefinder 86 data for the different regions 90 of the derived scene image. The criteria used for separating the different regions 90 into subject and background can vary, depending upon expected camera usage. A convenient criteria is that a region 90 is background if the measured distance for the region 90 is greater than some multiple of the measured distance of the nearest region 90 and a region 90 is subject if the measured distance is less than or equal to that multiple of the measured distance of the nearest region 90. A convenient multiple is two. Another convenient criteria, that can be applied by itself or in combination with the last criteria; it that a region 90 is background if the measured distance corresponds to the infinity position for the taking lens unit 76. For example, with some cameras 10, this distance is 12 feet or greater. Another criteria that can be applied by itself or with one or more other criteria, is that outer regions 90 of the image are background. This criteria is most useful if applied as a counterpart to a determination of close inner regions 90 of the image. Another criteria is, if the flash unit 36 has fired, then brighter regions 90 or regions 90 that are both brighter and closer represent the subject and other regions 90 are background. This criteria is conveniently used as a fallback when other distance based criteria are ambiguous. Still another criteria is that if the rangefinder 86 detects only subject matter at the infinity position, then regions 90 that are brighter or bluer or both are considered sky. For example, a re-aiming suggestion can then be made, if the horizon is centered.

An advantage of the criteria just mentioned is simplicity. Other, more complex criteria, such as pattern detection, can also be used. For example, the electronic image can be analyzed to determine eye positions within the image. This approach requires greater computing resources.

A shortcoming of the various criteria, particularly the simple criteria, is that erroneous compositional revision suggestions will be presented, at least occasionally. This is not a major drawback. The great majority of people recognize good composition and bad composition when they see it. It is expected that revision suggestions that show good composition will be easily detected and that erroneous revision suggestions with poor composition will be easily ignored. It is also likely that having been shown different ways of capturing the same subject, users will more easily pursue their own visions by combining one or more suggestions or going off in another direction entirely.

Since erroneous revision suggestions are not critical, a number of different revision suggestions can be made in response to a single derived scene image, using different conflicting criteria, such as determinations of the subject and background. It is likely that the user will consider the resulting group of revision suggestions beneficial, even if one or more suggest a worse composition than was originally captured.

A revision suggestion is implemented, during a succeeding archival image capture. Revision suggestions, if followed by the user, result in a capture of an archival image that differs from the assessment image. In preferred embodiments, the revision suggestion follows exposure of a first archival image (film or digital); and the user follows the revision suggestion in capturing a second archival image. The first archival image captures the moment that is, a scene that may quickly change. The second archival image can provide an improvement based upon a revision suggestion, but only if desired and if circumstances allow a repetition. Revision suggestions can be provided without an initial archival image capture, but this approach is primly intended to teach better technique rather than provide a camera for ordinary use.

Based upon the analysis of the exposure information, digital subroutines for one or more revision suggestions are selected from a look-up table 136 of available revision suggestions. The look-up table 136 can be in the form of a database of stored subroutines, or an algorithm from which subroutines are derived as needed, or can be some combination of one or more databases and algorithms. The algorithms can include fuzzy logic algorithms or subroutines.

Figure 26:
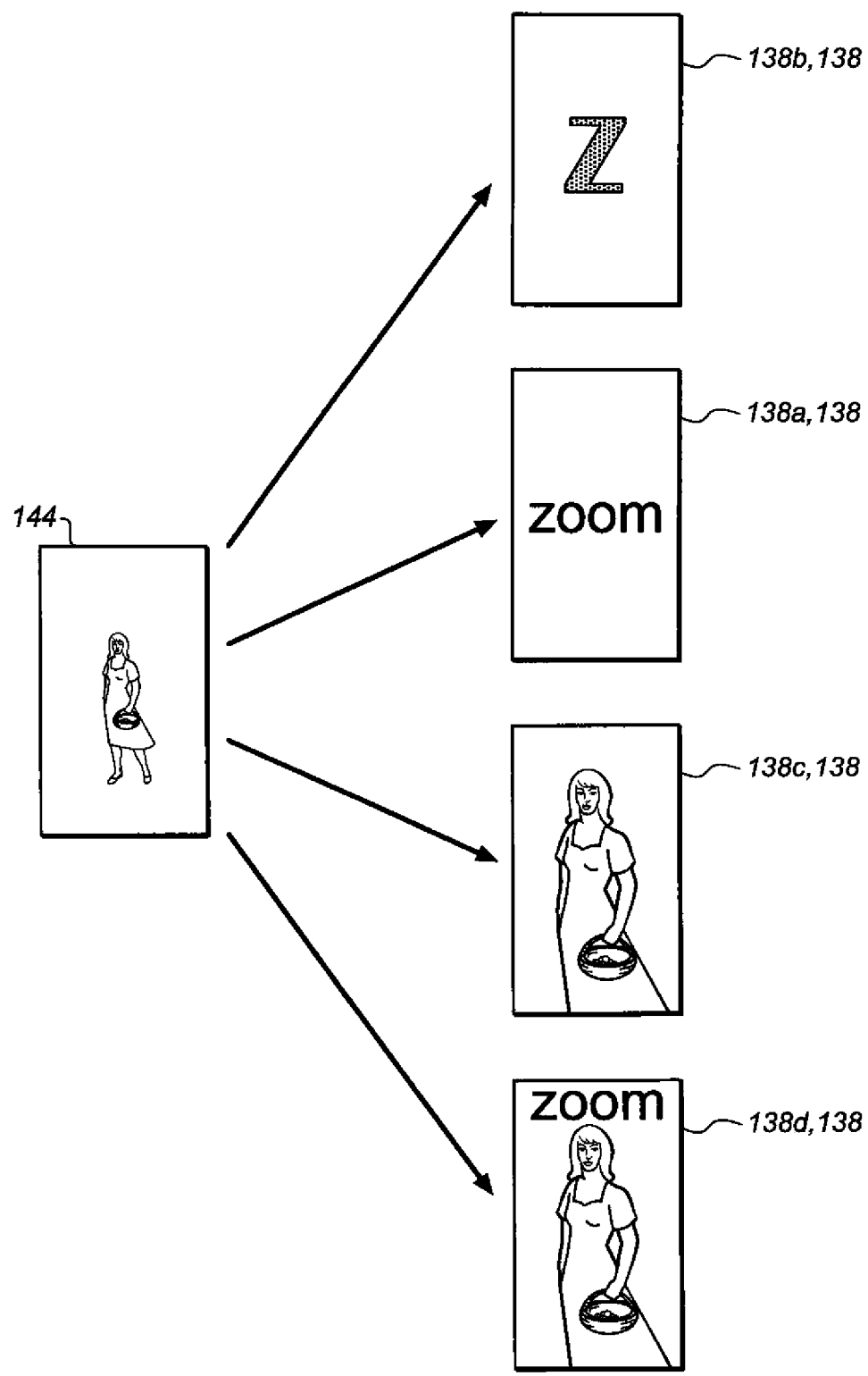
FIG. 26 is a diagram illustrating a verification image and four different depictions of the same revision suggestion.

Referring to FIG. 26, the revision suggestions are represented by a depiction 138 that is shown to the user. The depiction 138 can be in the form of a text message 138a or an icon 138b communicating the suggested effect. It is highly preferred that the subroutines are for the derivation of images embodying an application of the various revision suggestions to the original electronic image. (Revision suggestions, which are displayed as derived images are also referred to here as "revision suggestion images 138c".) Revision suggestions can also be presented as a combination of derived images and indicia. In FIG. 26, four different depictions of a revision suggestion of zooming in or getting closer are shown. An icon depiction 138b is in the form of a stylized letter "Z". A text depiction 138a is the text "zoom". A revision suggestion image 138c shows a derived image that has been digitally zoomed in to a predetermined extent. A combination revision suggestion 138d superimposes a text or iconic suggestion on the revision suggestion image.

It is highly preferred that revision suggestions are presented to the user as revision suggestion images 138c, because this approach is quicker for the user to implement than is the case for indicia or combinations of indicia and one or more derived images. With indicia or an indicia-image combination, the user must visualize the appearance of the succeeding archival image either mentally or by setting up for the proposed shot. This takes time, particularly for a novice presented with multiple revision suggestions. With revision suggestion images 138c, an additional visualizing step is unnecessary, since the appearance of the succeeding archival image is shown, within practical limits, on the image display. The user can more quickly decide to follow, or not follow, a revision suggestion. The user can also quickly decide whether to follow a revision suggestion only in part, or to combine more than one revision suggestion. This increases the benefit to the user, since a suggestion does not have to be perfectly appropriate to provide useful advice, and also frees the user to be more create and enjoy the photographic process.

It will be apparent that an almost unlimited number and variety of revision suggestions can be made available for the user. One practical limit on the number and type of revision suggestions is the intended use of the camera 10. For example, a wider variety and larger number of revision suggestions are more appropriate for a camera 10 designed for use primarily as a teaching tool or for expert use, than for a camera 10 intended for general purpose use. Another practical limit is the conflicting requirements of the user's tolerance of erroneous suggestions and the greater processing load imposed by hardware and software capable of reducing the number of erroneous suggestions. Still another practical limit is the photographer's ability to quickly understand and act on the information presented. Some revision suggestions are also intrinsically of marginal usefulness in most picture taking situations, such as suggesting a double exposure or use of a fish-eye lens. It is thus preferred that, for a particular capture event, the total number of revision suggestions be limited and that revision suggestions with a high risk of inappropriateness be avoided.

mation be analyzed for both composition changes and exposure parameter changes. For example, a determination can first be made to identify the photographic subject and background in the photographed scene and the derived scene image. The relative characteristics of the subject and background can then be then evaluated and compared to predetermined ranges of values.

Table 1 lists some examples of revision suggestions and corresponding categories, user actions, and digital modifications used to make the assessment images mimic the suggested changes.

TABLE 1

| Revision suggestion | Category | User action | Digital modification of assessment image |
|---|---|---|---|
| increase or decrease relative size of subject in scene | composition change | zoom in or out or bring camera and subject closer together or further apart | digital zoom |
| change position of subject relative to background in scene | composition change | re-aim camera | recenter derived digital image |
| change scene geometry (camera orientation) | composition change | rotate camera | digital rotation |
| change lighting on subject | exposure parameter change | alter flash settings - flash/fill flash/no flash or alter ambient lighting | digital lightening/ darkening |
| change depth of field/focus zone | exposure parameter change | alter exposure settings or exposure mode | digital sharpening/ blurring based on rangefinder data |

Specific values for the total number and type of suggestions can be preset, or set by the user. In the latter case, revision suggestions can be provided in a hierarchy or selectable levels in the same manner that pull-down menus are varied in computer programs. For example, a user could select a revision suggestion level between few, moderate, and many, or alternatively, between, beginner, novice, and advanced. An "off" setting can also be provided, in either case, to turn off the revision suggestion function. The user controls 122 of the user interface 118, can include a switch for this purpose. For a camera 10 used by a casual photographer, it is currently preferred that the number of revision suggestions be preset at no more than three per image capture event and that the revision suggestions be limited so as to reduce the risk of suggestions that are completely inappropriate to a particular scene.

Duplication of suggestions and provision of more than one similar suggestion can also be eliminated to improve the photographers ability to quickly understand and act on the information presented. For example, for a horizontally composed scene, it is undesirable to suggest both a right rotation to a vertical composition and a left rotation to the same composition. Likewise, zooming in/moving closer is better suggested by a single or small number of revision suggestion images 138c, rather than a long series of images at many different zoom positions.

Revision suggestions can be broadly categorized as composition changes and exposure parameter changes and combinations of both. Composition changes are rearrangements in some or all of the visual elements of a scene. Exposure parameter changes are modifications of camera functions that alter some or all of the visual elements of a scene without rearrangement. It is highly preferred that the exposure infor- Composition changes can be limited to the derived scene image or can add image elements that go beyond the derived scene image in one or more directions. An example of a change limited to the derived scene image is zooming. For zooming, a digital zoom algorithm is applied to the derived scene image and the resulting revision suggestion image 138c mimics the effect of optical zooming or moving closer. Digital zoom algorithms are well known to those of skill in the art. Another example of a composition change that does not add image elements is rotation of a square derived scene image.

An example of a composition change that adds image elements that go beyond the derived scene image is re-aiming the camera 10 so as recenter the scene of the succeeding archival image relative to the derived scene image. Another example of a composition change that adds image elements that go beyond the derived scene image is rotation of a camera 10 having a rectangular derived scene image. In order to provide these sorts of revision suggestion images 138c, an original electronic image field of view is needed that includes the derived scene image and extends beyond the derived scene image on at least one side.

Figure 9:
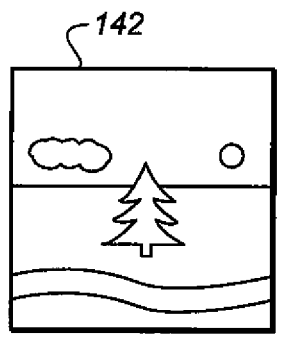
FIG. 9 is a diagrammatical view of an original electronic image captured by the camera of FIG. 1.
Figure 10:
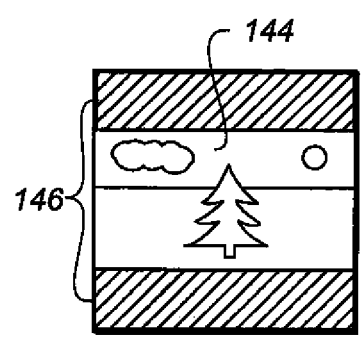
FIG. 10 is a diagrammatical view of a verification image derived from the original electronic image of FIG. 9 (with the camera held in a horizontal position). The cross-hatching indicates the size and relative position of the original electronic image.
Figure 11:
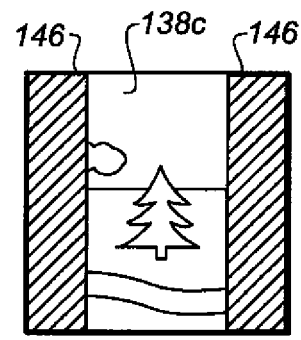
FIG. 11 is a revision suggestion image for a suggested rotation of 90 degrees, derived from the original electronic image of FIG. 9.
Figure 12:
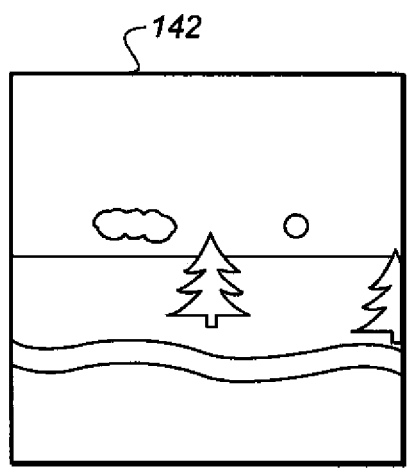
FIG. 12 is a diagrammatical view of an original electronic image of a modified camera, which permits revision suggestions including recentering and zooming out.
Figure 13:
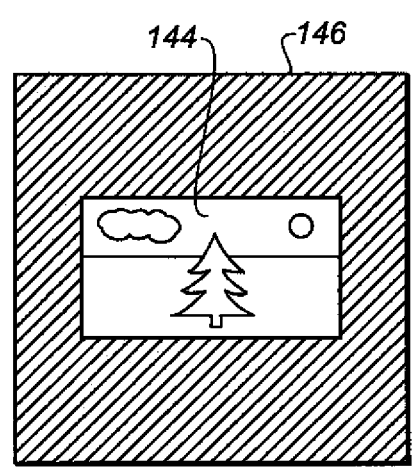
FIG. 13 is a diagrammatical view of a verification image derived from the original electronic image of FIG. 12. The cross-hatching indicates the relative size and relative position of the original electronic image.

FIG. 9 illustrates an original electronic image 142 of a scene captured by an imager 24 that is "oversized" relative to the archival image captured by the camera 10. FIG. 10 illustrates a verification image 144 that has a rectangular format and is derived from the original electronic image 142. The verification image 144 is shown against a crosshatched box 146 that indicates the size and relative position of the original electronic image. The archival image captured has the same relationship to the original electronic image, as is shown for the verification image in FIG. 10. The original electronic image is scaled and proportioned so as to permit the production of the revision suggestion image 138c shown in FIG. 11 against box 146. This revision suggestion image 138c mimics a 90 degree rotation of the camera 10. The width and height of the original electronic image in FIG. 9 are equal and are proportional to the longest dimension of the archival image, as indicated by FIGS. 10 and 11. FIG. 12 illustrates an original electronic image that is scaled and proportioned so as to permit revision suggestion images 138c including rotation and recentering. The original electronic image extends beyond the verification image 144 on all four sides, as shown in FIG. 13.

An oversized imager for a particular configuration of archival image is prepared by designing the optical system to provide a desired angle of view to particular imager, in a manner well known to those of skill in the art. The imager angle of view exceeds that necessary to allow a verification image to be derived that is offset sufficiently to remove parallax changes between the electronic capture unit and archival capture unit at different focus distances. The imager angle of view is, thus, oversized relative to both the archival image and any parallax correction of the electronic image capture unit. This allows the camera to correct verification images and other derived images for parallax by shifting the portion of the original electronic image used to derive the images. This is in addition to the other changes discussed herein, necessary to provide particular revision suggestions.

The evaluation capture unit 18 is configured to provide the angle of view needed for an original electronic image 142 scaled and proportioned to match an archival image having a particular format. As above illustrated, the angle of view can be larger than the original electronic image 142 in one or both dimensions and act dimensions of the imager 24 are not critical. For reasons of efficiency, it is preferred that the imager 24 is no larger than necessary to enable revision suggestions desired for the camera 10.

FIGS. 14a-18 illustrate the effect of re-aiming and rotation revision suggestions on the required size of the original electronic image 142. In FIG. 14a, a verification image 144 is shown in which a subject's head 148 is centered horizontally and vertically. A revision suggestion image 138c, shown in FIG. 14b, has the person's head 148 be moved up to a position one-third of the distance from the top of the image. The horizontal position is unchanged. FIG. 14c shows the original dimensions of the scene in solid lines 145 and the proposed change in dashed lines 147. FIGS. 15a-15c show the same things for a vertically oriented scene.

FIG. 16a shows the same scene as in FIG. 14a FIG. 16b is a revision suggestion image 138c showing the effect of camera rotation and re-aiming to move the person's head 148 to one-third of the way down from the top of the image. FIG. 16c shows the effect of this change on the dimensions of the scene in the same manner as FIGS. 14c and 15c. FIG. 17a is a verification image 144 the shows the sane scene as in FIG. 14b, that is, the person's head 148 is one-third down from the top of the image. FIG. 17b is the same revision suggestion as in FIG. 16b. FIG. 17c, the suggested change in the scene, differs from FIG. 14c; since the revision suggestion re-aims the camera 10 through a different angle.

FIG. 19b shows a zoom in or move closer revision suggestion image 138c that would be provided in response to the verification image 144 of FIG. 19a FIG. 19c shows the effect of this change on the dimensions of the scene. FIGS. 20a-20c are comparable, but the camera 10 is held vertically and the revision suggestion image 138c shows both zooming in or moving closer and repositioning the person's head to the one-third position. To help the user, this suggestion can include a text message or other indicia (not shown in FIGS. 20a-20c, such as the words "zoom in", indicating the action required of the photographer to implement the revision suggestion accompanying the image. The camera can follow this same approach with all revision suggestions or only those that are complex and might be confusing. The text or other indicia can be imposed on the revision suggestion image 138c or on a separate information display 114 or the like. The text can be simple or even incomplete on the assumption that the user will rely predominantly on the image. For example, FIG. 20b could be provided with the message: "Zoom+Reposition".

FIG. 18 is a diagrammatical view of an imager 24 capable of capturing an original electronic image that can be used for the revision suggestions 138 shown in FIGS. 14-17 and 19-20. The solid line is the imager 24. The dashed line 149 indicates the portion of the imager 24 that provides the derived scene image used as the verification image 144. (The dashed line 149 shown has an aspect ratio of 4:7. The aspect ratio of the verification image is matched to the aspect ratio of the archival image.) The center (indicated by a plus sign "+") of the derived scene image portion is centered horizontally and on-third down from the top of the original electronic image vertically. The longest dimension (indicated by an "x") of the imager 24 is 4/3 of the corresponding dimension (indicated by an "a") of the derived scene image portion. The other dimension (indicated by a "y") of the imager 24 is 7/6 of dimension "a" of the derived scene image portion.

The imager 24 of FIG. 18 is also suitable for capturing an original electronic image 142 that can be used for revision suggestion images (not illustrated) that include zooming out or moving farther from the subject.

Figure 21:
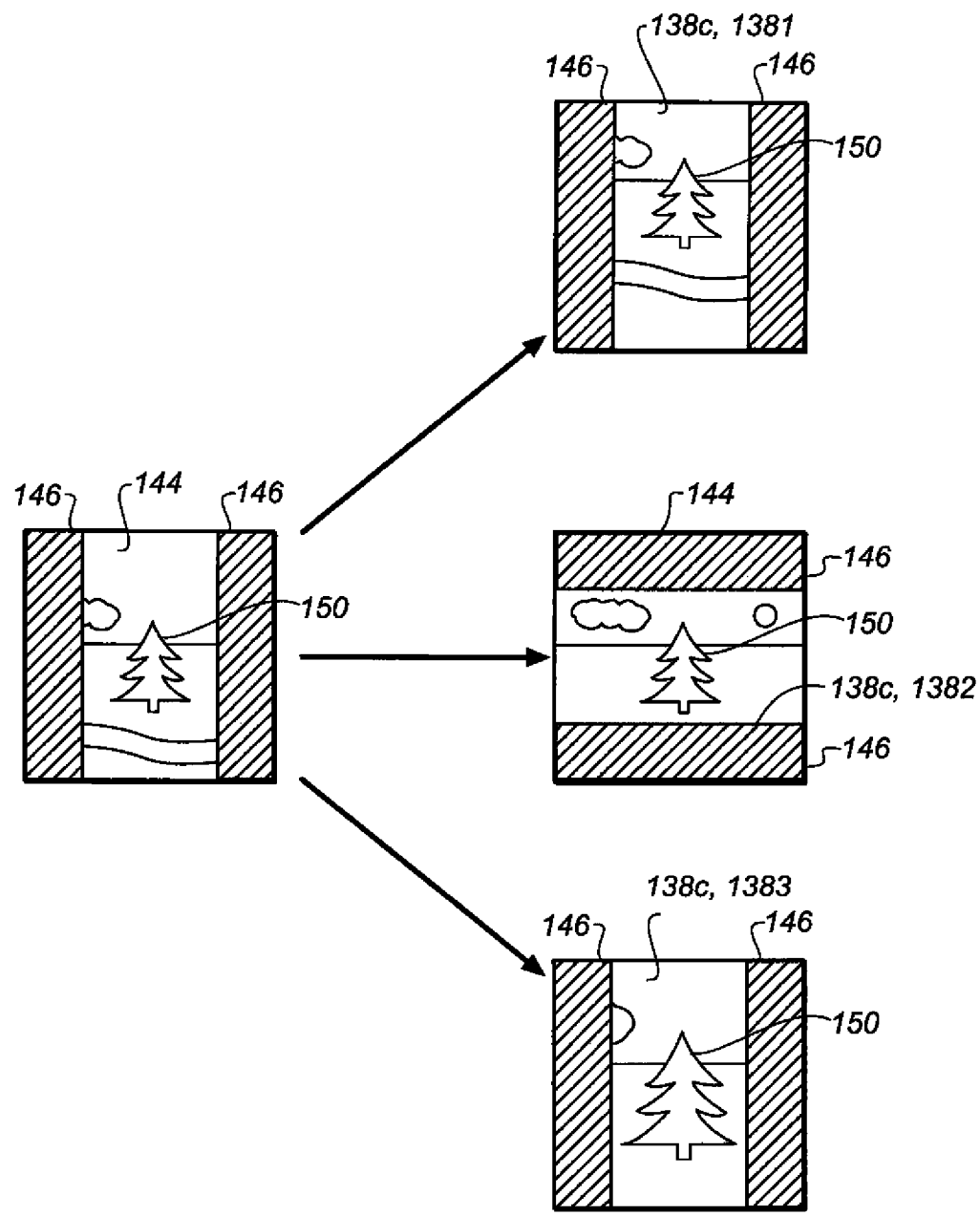
FIG. 21 is a diagrammatical view of a verification image provided by a camera having the features illustrated in FIGS. 1 and 12 and three depiction of revision suggestions for other ways of photographing the subject, including re-aiming the camera to relocate the subject at two-thirds of the distance from the bottom edge of the picture, reorienting the camera in a horizontal position, and zooming in/moving closer to the subject. Cross-hatching indicates the relative size and position of the original electronic image relative to the other images.

The capabilities of the imager 24 of FIG. 18 can be implemented in a camera 10 that is capable of providing all of the revision suggestions of FIGS. 14-17 and 19-20. This is convenient, since this combination of revision suggestions covers a great many of the common failings of novice photographers. Referring to FIG. 21, this combination also allows the camera 10 to offer multiple revision suggestions in response to the detection of a particular set of scene parameters. In FIG. 21, for example, a tree 150 is positioned at about the center of the verification image 144. The camera prepares a suggestion set having three revision suggestion images 138c. All three of the revision suggestion images 138c move the tree 150 up to the one-third point. The uppermost revision suggestion image 1381 does nothing further. The second 1382 has the camera 10 rotated 90 degrees. The third 1383 has the tree 150 zoomed in or closer.

In FIG. 21, the revision suggestions provide the user with both a suggested correction of the detected mispositioning of the tree 150 at the center and, in addition, suggest alternative ways of composing the scene. This is likely to be valuable to the user, even if the user finds the suggestion of re-aiming to position the tree at the one-third point to be inappropriate. For this and similar reasons, it is generally desirable to provide revision suggestions to the user that suggest alternatives and different ways of looking at a scene, rather than simply closely tying revision suggestion to just curing detected problems.

Figure 23:
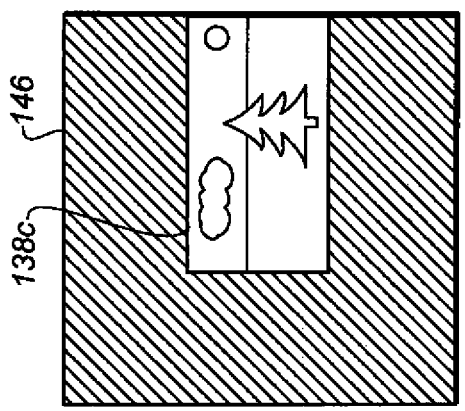
FIG. 23 is a diagrammatical view of a depiction of a revision suggestion responsive to the electronic image of FIG. 22. The revision suggestion is to re-aim the camera so as to center the subject.
Figure 22:
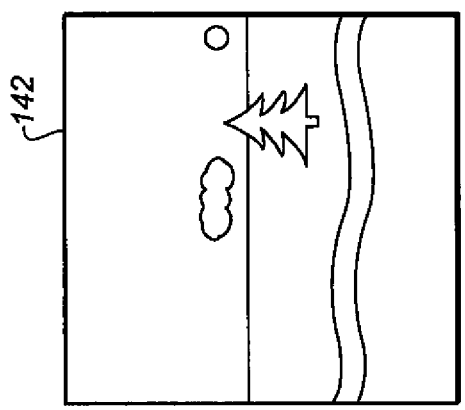
FIG. 22 is a diagrammatical view of an original electronic image produced by the same embodiment of the camera as in FIG. 12.

The imager 24 can provide an original electronic image 142 that has a greater assessment angle of view than even the imager 24 of FIG. 18. This is useful for re-aiming in a horizontal direction, comparable to and in addition to, the re-aiming in a vertical direction previously described. FIGS. 22-23 illustrate an original electronic image 142 for such an imager 24 and a corresponding revision suggestion image 138c that suggests recentering a detected subject in a horizontal direction.

The algorithm used to determine which revision suggestions to provide can be more or less complex, as desired, within the limits of available processing power in the camera 10. For example, an implementation of a simple algorithm is illustrated in FIGS. 27-30. In this case, the rangefinder data is first analyzed, as earlier discussed, to determine subject and background. Suggestions are then made, except in one case, based solely on the relative position of the subject. FIGS. 27-30 show detected subjects and resulting revision suggestions. Rangefinder information is represented by grids 91 of rangefinder regions 90 in a manner similar to FIG. 2. The position of the detected subject is indicated by boxes bearing an "X". In all of these figures, the revision suggestions are made in relation to an H-aspect ratio (4:6) verification image. Similar suggestions would apply to C-aspect ratio (4:7) images. Revision suggestions are shown in FIGS. 27-30 by solid lines 145 for the original dimensions of the scene and dashed lines 147 for the suggested dimensions following the revision suggestion.

Figure 27:
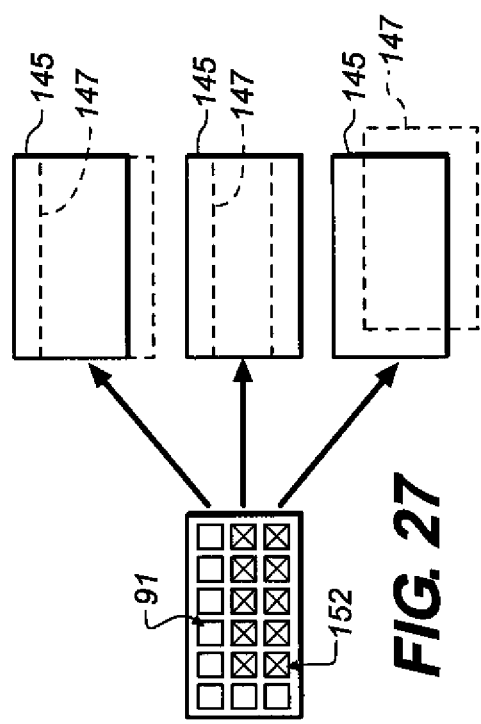
FIG. 27 is a diagrammatic view of a detected grid of rangefinder regions and a suggestion set of three revision suggestions matched to that grid in the revision suggestion look-up table. The revision suggestions are, in vertical order: moving down, changing to panoramic aspect ratio, and recentering down and to the right.

In FIG. 27, a relatively large subject 152 has what may be excessive background above and to the left of the subject. A first revision suggestion is re-aiming vertically. A second revision suggestion is changing to a panoramic aspect ratio. A third revision suggestion is re-aiming vertically and to the right.

Figure 28:
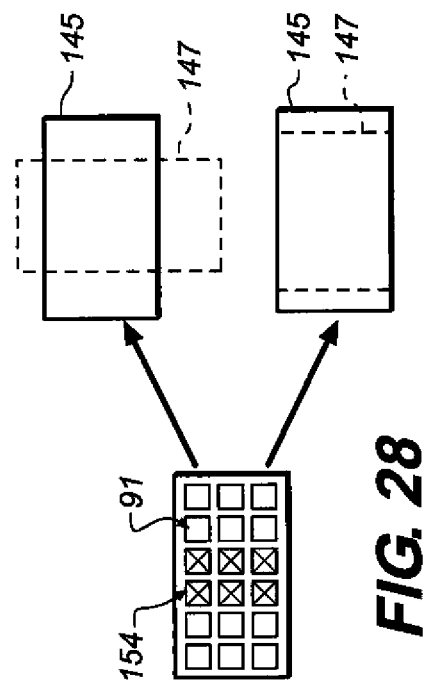
FIG. 28 is the same view as FIG. 27, but with a different detected grid and set of revision suggestions. In this case, the revision suggestions are, in vertical order: rotate 90 degrees and recenter, and change to C-aspect ratio.

In FIG. 28, a subject 154 is narrow with what may be excessive background on both sides. A first revision suggestion is changing to a vertical orientation. A second revision suggestion is changing to a C-aspect ratio.

Figure 29:
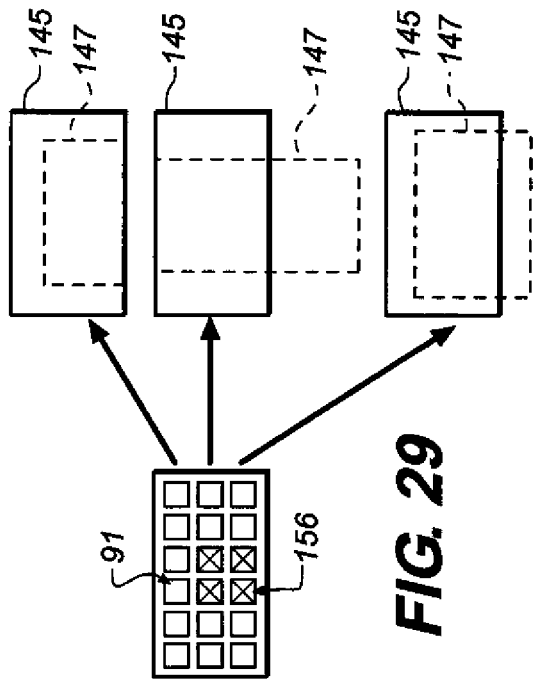
FIG. 29 is the same view as FIG. 27, but with a different detected grid and set of revision suggestions. In this case, the revision suggestions are, in vertical order: zoom in/move closer, rotate 90 degrees, and change to C-aspect ratio and move down.

In FIG. 29, a subject 156 has what may be excessive background above and on both sides. A first revision suggestion is re-aiming and zooming in/moving closer. A second revision suggestion is re-aiming and changing to a vertical orientation. A third revision suggestion is re-aiming and changing to C-aspect ratio.

Figure 30:
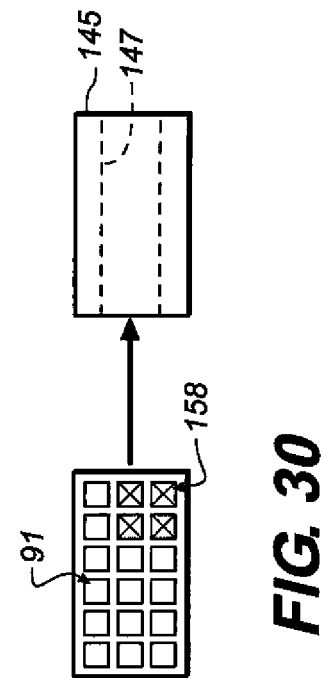
FIG. 30 is the same view as FIG. 27, but with a different detected grid and suggestion set. In this case, the set has a single revision suggestion: change to panoramic aspect ratio.

In FIG. 30, a subject 158 is off center, with what may be excessive background above the subject. The off center subject is assumed to be intentional, but a revision suggestion is changing to a Panoramic aspect ratio.

Another situation, that is not illustrated, is that the rangefinder data shows only background, with no subject. In this case, a landscape image is presumed and a panoramic aspect ratio is suggested. Brightness and color information can also be used to suggest re-aiming to move the apparent horizon to the one-third point. For this revision suggestion, it is assumed that the sky is in the upper portion of the image and is brighter or bluer than the rest of the image.

The image display 26 shows the verification image and the other derived images. This can be accomplished in several different ways. A rectangular display can show a rectangular derived image, of the same aspect ratio, at full size and can show a reduced size image for a camera rotation revision suggestion. Alternatively, the image display 26 can show the same suggestion sideways at full size for the image display. In this case, the user is forced to rotate the camera 10 to see the displayed revision suggestion in proper orientation. This approach has the advantage that the compared derived images are the size; but is not preferred, since it is cumbersome and discourages rapid switching between the verification image and revision suggestion images 138c. (It is expected that many users will find such rapid switching valuable for comparing differences in the verification image and revision suggestion images 138c.

It is preferred that the image display 26 is oversized such that derived images having the same aspect ratio can be shown the same size in vertical and horizontal orientations. A square display, as shown in FIG. 1, is convenient for this purpose, but a rectangular display can also be used if the derived images are commonly sized to fit in all orientations.

In embodiments of the camera 10 in which the original electronic image 142 is larger than the archival image and verification image 144, the electronic capture unit 18 can assess ambient lighting for the original electronic image 142 as a whole or for the portion of the original electronic image 142 corresponding to the archival image and the verification image. (In both cases, as above discussed, actual measurements may be limited by sensor configuration to less than the entire area of the image.) It is currently preferred that ambient lighting be assessed using the portion of the original electronic image that provides the verification image and corresponds to the archival image. This approach follows the intentions of the photographer and also provides values for capture settings that best match the scene.

Since the data is available, ambient lighting and other conditions for each of the revision suggestion images 138c can, optionally, also be assessed independently. These assessments are not used to set exposure parameters, but rather to determine digital modifications for individual revision suggestion images 138c. The digital modifications change the respective revision suggestion images 138c to mimic what would be seen in the succeeding archival image corresponding to the individual revision suggestion image 138c. This is necessarily inexact and is limited by available image information and processing speed and memory constraints. A further constraint, as earlier noted, is that the subject of the scene must also remain available for recapture in the succeeding archival image.

Figure 24:
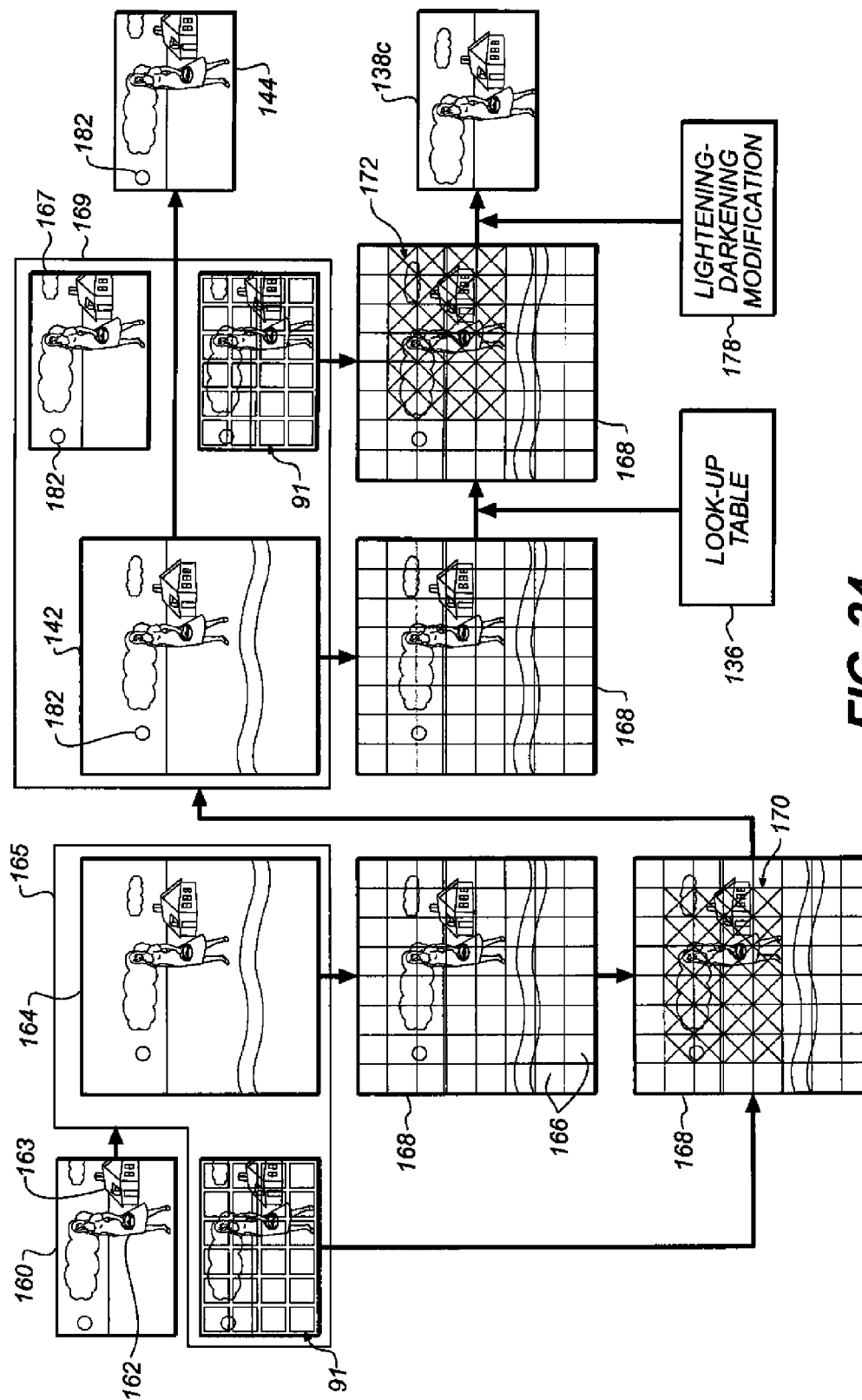
FIG. 24 is a diagrammatical view of exposure setting during the preparation of a revision suggestion image that includes re-aiming.

FIG. 24 illustrates an example of this approach. The digital modification is the use of a lightening-darkening algorithm to mimic the effects of changes in Ev (exposure value). A scene is first composed by the photographer using the camera viewfinder 58. The viewfinder image 160 of the scene has a subject 162, a woman holding a basket, positioned to one side rather than centered. (In this example, a house 163 is also shown. The house is much farther from the camera 10 than the woman and is treated as part of the background.) The shutter release is pressed through a first stroke, actuating switch S1. As, elsewhere discussed, this preliminary capture event (indicated in FIG. 24 by box 165) causes the electronic imager to capture one or a series of preliminary electronic images 164 and to capture rangefinder information 91. For simplicity, the following discussion is based on usage of a single preliminary electronic image 164.

The preliminary electronic image 164 is digitized and subdivided into paxels 166 resulting in a subdivided image 168. Each paxel 166 is a block of pixels (not illustrated). For example, a convenient approach divides an image into an array of 36 by 24 paxels, each paxel being derived from a 16 by 16 block of pixels. (For clarity, the paxels in FIG. 24 are illustrated greatly oversized and in an n by n array. Paxels are not limited to n by n blocks.)

A determination is made of the exposure value of a first portion 170 of the subdivided image 168. The first portion 170 matches the scene defined by the viewfinder image 160 and is symbolized, in FIG. 24, by a pattern of X's in the respective paxels 166 of the subdivided image 168. The pixels of the first portion 170 are combined into respective paxels 166 by a pixel accumulator (not illustrated), which averages logarithmically quantized RGB digital values to provide an array of paxel values for the paxels 166 in the first portion 170. The paxels 166 are weighted, in one of the manners above-discussed, to determine exposure values for archival image capture and for capture of an original electronic image 142 concurrent with capture of the archival image.

The rangefinder information is in the form of ranging values for different elements (not separately illustrated) of the rangefinder 86. The values indicate detected distances in a pattern of regions 90 defined by respective elements. The regions have a predetermined relationship to the scene and viewfinder image 160 (symbolized in FIG. 24 by the region grid 91 superimposed on a representation of the scene). The autofocus uses the values for the regions to adjust focus of the taking lens.

The shutter release is then pressed through a second stroke, actuating switch S2 and resulting in the main capture event (indicated by box 169 in FIG. 24). The archival image 167 is captured. Concurrent with capture of the archival image 167, an original electronic image 142 is captured. The original electronic image is digitized to provide a digitized original electronic image 142 and a corresponding subdivided image 168*a* is produced.

A verification image 144 is prepared from the first portion 170 of the subdivided image 168 that corresponds to the scene. In FIG. 24, the verification image is shown at the upper right. Within the limits of processing equipment and the like, the final image produced by photofinishing will match the verification image 144.

Rangefinder information is accessed at this time (this is indicated in FIG. 24 by a repetition of region grid 91). The rangefinder information used can be concurrent with the preliminary electronic image earlier discussed or can be new information resulting from a measurement of rangefinder values at the time of archival image capture, depending upon available processing power and other practical limitations. The values for the regions 90 are compared and a subject is determined. This analysis may correspond to the autofocusing earlier performing, or can weigh values in a different manner. In FIG. 24, the subject is determined to be off-center. This information and other values of camera parameters are fed into a look-up table 136, which, in response, supplies a revision suggestion to re-aim the camera 10 to center the subject. This is indicated by the displaced pattern 172 of X's in the respective paxels 166 of the subdivided image. A revision suggestion image 138*c* is prepared from the second portion of the original electronic image defined by the displaced pattern 172.

In the verification image 144, the sun 182 is in the background. In the revision suggestion image 138*c* shown in FIG. 24, the camera is re-aimed and the sun 182 would be out of the angle of view of the archival image capture unit 16. With some light metering arrangements, this would result in different exposure parameters than were determined for the first scene. The presence or absence of the sun in the scene can cause different exposure parameters to be determined. For example, the foreground of the scene can be underexposed if the sun is in the scene and properly exposed when the sun is excluded.

This type of change from a verification image 144 to a revision suggestion image 138*c* can be accommodated by using the array of paxels 166 corresponding to the revision suggestion image 138*c* to determine hypothetical exposure parameters which can then be used by a lightening-darkening modification algorithm 178 to calculate modifications of the respective portion of the electronic image to mimic the effect the exposure parameters would produce in the operation of the archival image capture unit 16. The modifications are applied to produce the respective revision suggestion image 138*c*, as needed.

Exposure parameter changes alter exposure parameters, such as shutter speed, diaphragm opening, and lighting. The revision suggestion images 138*c* that present exposure parameter changes are generated by modifying the entire scene or only part of the scene, in a manner similar to the revision suggestion image 138*c* just described, in which the exposure parameters differed between the different portions of the original electronic image.

A variety of exposure parameter revision suggestions can be provided for flash related changes. The use of full flash can be suggested. This can be provided when the camera 10 detects a dark subject against a dark background, with both the subject and background within flash range. A corresponding revision suggestion image 138*c* can be uniformly brightened digitally to mimic the effect of the flash. The use of fill flash can be suggested. This can be provided by a digital modification that lightens paxels 166 in the revision suggestion image 138*c* matching the position of the subject detected by the rangefinder 86. If the camera 10 detected a dark subject against a dark, out of flash range background; the camera 10 could suggest two revision suggestions: one for normal flash, depicted by lightening the subject only; and another for night portrait, depicted by lightening the subject and lightening the background to some degree. (In night portrait, the subject is mainly exposed by flash illumination, but the shutter remains open sufficiently to provide an ambient light background exposure. Night portrait mode is designed for situations, in which a flash exposure sufficient for a foreground subject is insufficient to illuminate the background adequately. With night portrait mode, the subject is well exposed by the flash against a visible background.)

Changes in depth of field and focus zone can be presented in a similar manner. Areas of the revised suggestion images detected at various distances can be blurred or sharpened digitally to mimic optical blurring and sharpening resulting from changes in lens focus and depth of field.

Figure 31A:
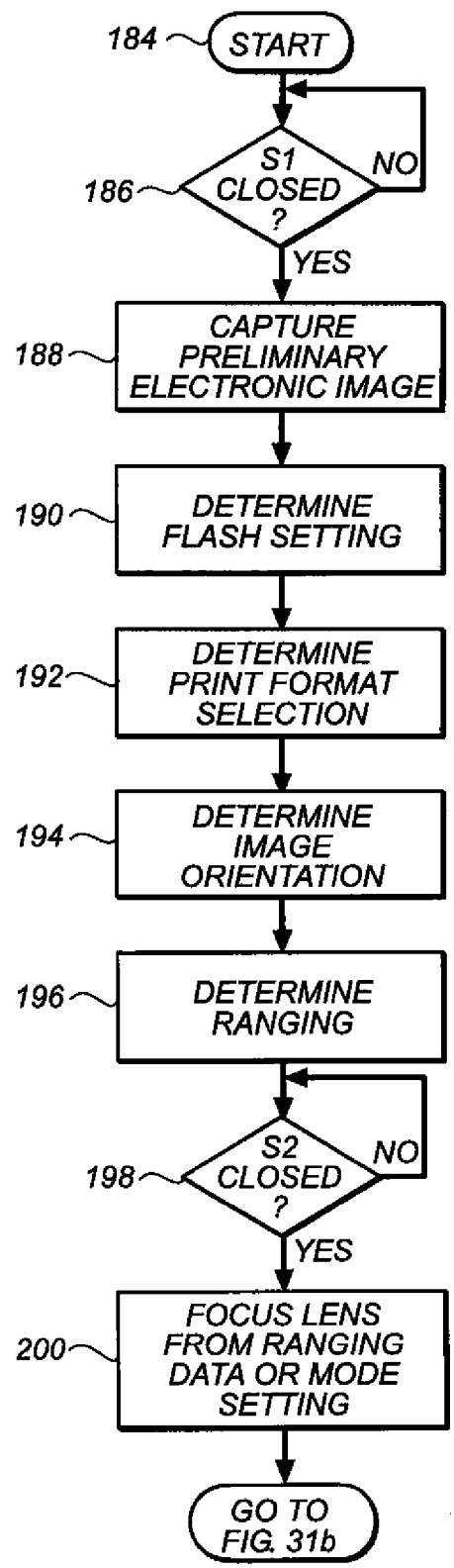
FIGS. 31a-31c are a flow chart of camera operation using an embodiment the revision suggestion photography method.
Figure 31B:
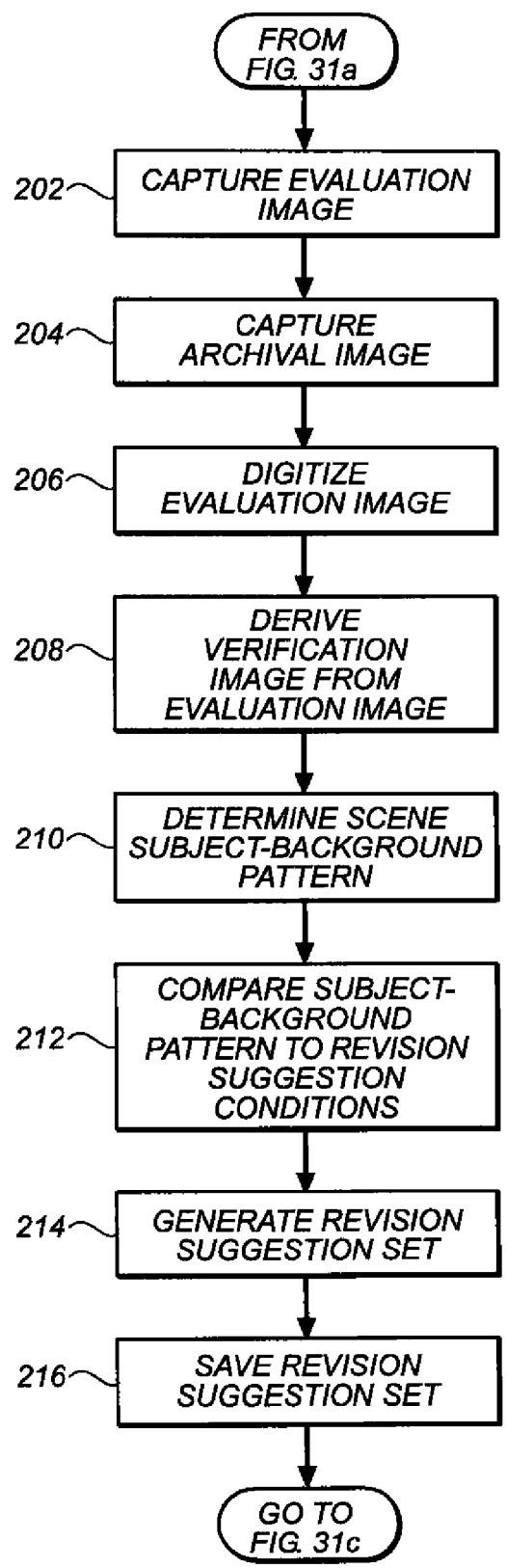
Figure 31C:
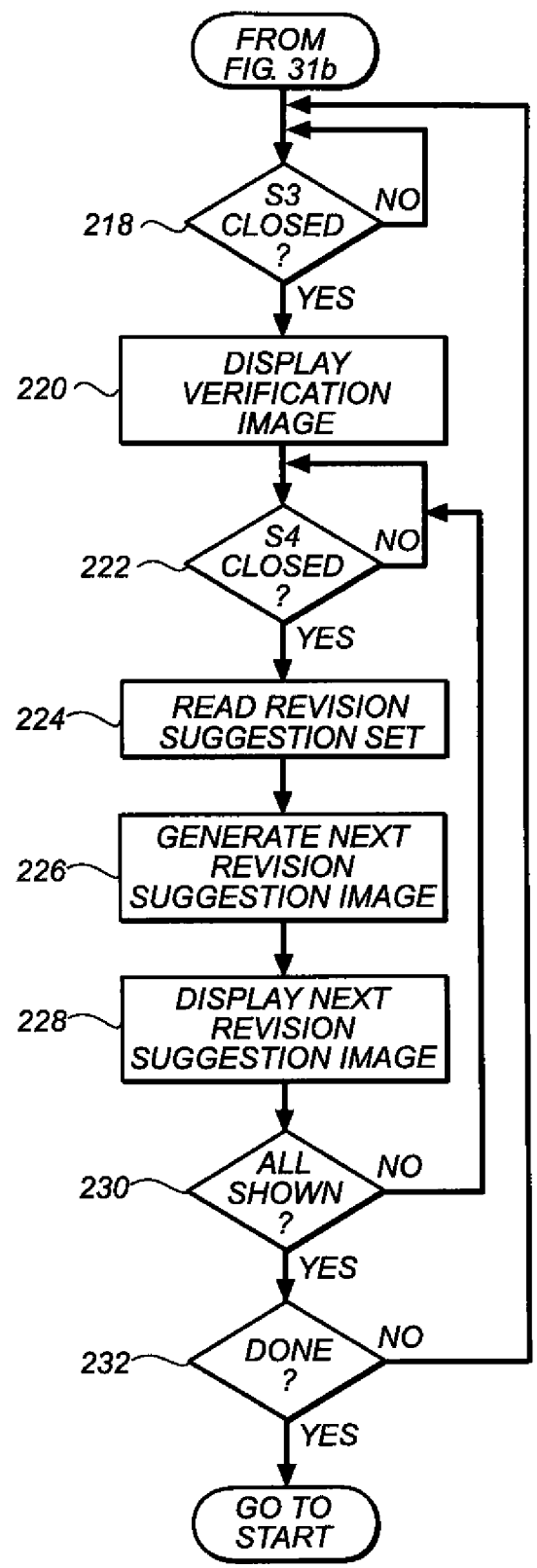
Figure 32:
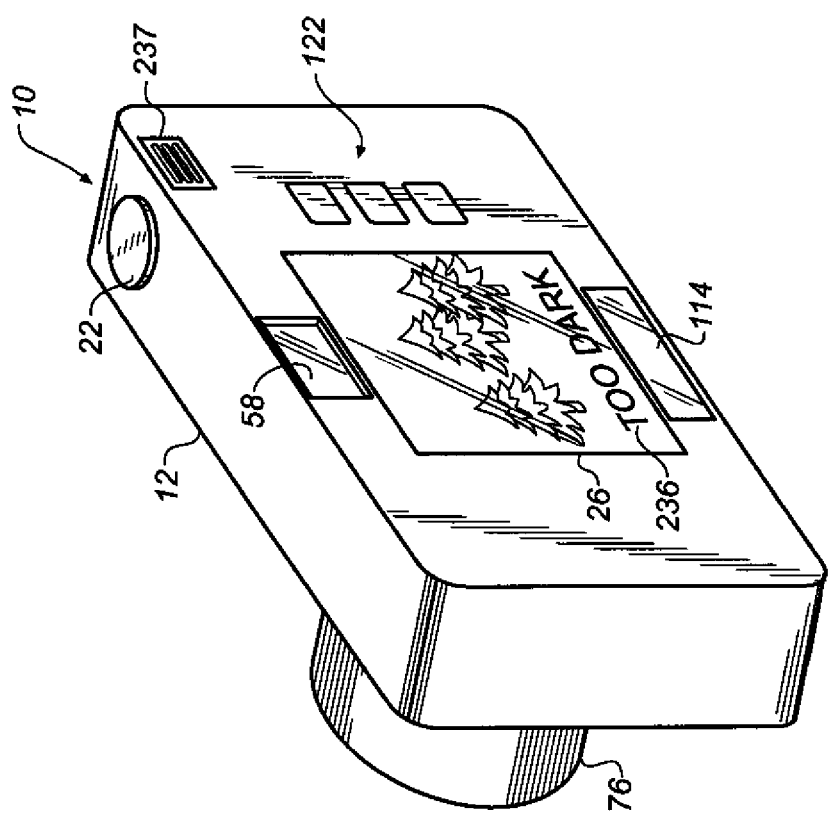
FIG. 32 is a rear perspective view of a modification of the camera 10, which provides output quality warnings.

FIGS. 31*a*-31*c* are a flow-chart of a particular embodiment of camera logic implementing the providing of the above discussed composition and exposure parameter revision suggestions. Beginning at "Start 184", the user presses the shutter release 22 through a first stroke closing switch S1. The camera determines (186) if switch S1 is closed and, if so, one or more preliminary electronic images are captured (188). The flash setting, print format selection, image orientation, and ranging information are also determined (190), (192), (194), (196).

The camera determines (198) if switch S2 is closed by the user pushing the shutter release through the second stroke. If so, the camera first focuses (200) the taking lens and captures (202) the archival image. Other parts of the optical system, such as the viewfinder lens unit, are focused in tandem with the taking lens, as necessary and within the limitations of differences in focus positions and the like. At least one evaluation image is captured (204) by the electronic imager concurrent with capture of the archival image. The evaluation image is digitized (206). A verification image is derived (208) from the digitized evaluation image.

Either at this point or earlier, the camera determines (210) the subject and the background in the scene. The camera compares (212) the subject-background information and other values of exposure parameters to the look-up table to see if the determined information matches preset conditions for one or more of the revision suggestions in the look-up table and generate (214) the revision suggestion set. The revision suggestion set is saved (216) to memory.

The user actuates switch S3 to view derived images. The camera determines (218) if switch S3 is closed and, if so, actuates the image display. It is preferred that S3 be configured to remain open, despite attempted user actuation, if switch S1 is closed. Upon closure of switch S3, the verification image is shown (220) on the display.

The user can then actuate switch S4 to view revision suggestion images. The camera determines (222) if switch S4 is closed. If switch S4 is closed, the camera reads (224) the revision suggestion set, generates (226) a first revision suggestion image, and shows (228) the first revision suggestion image in place of the verification image.

Camera determines (230) if all of the revision suggestion images have been shown and, if not, repeats the steps of the last paragraph for each of the revision suggestion images of the suggestion set. When all of the revision suggestion images of the set have been shown, the camera determines (232) if the user is done reviewing the images. If not, the camera repeats the steps beginning with determining whether switch S3 has been actuated. If the user is done, then the camera returns to an initial condition as at the start (184). A switch S5 can be provided to allow the user to provide an overt indication of being done reviewing images. Alternatively, a timer can presume the user is done after a period of inactivity or the like. The camera can also monitor for actuation of switch S1 and stop displaying derived images whenever switch S1 is pressed.

The above discussion has generally been limited to simple revision suggestions and simple parameters triggering implementation of those suggestions. In actual use, more complicated approaches are likely to be found more beneficial for users. For example, revision suggestions of one or more of: re-aiming the camera, rotating the camera, and zooming or moving closer, can be limited to scenes in which a subject is detected in a particular distance range, such as 3 to 20 feet (1 to 6 meters) by the rangefinder.

Output Quality Warnings

Referring now to FIGS. 32-45, in some embodiments, the camera 10 provides an output quality warning if a captured archival image is likely to be of low quality when photofinished. The warning allows the user to take another picture of the same subject matter, while correcting for the undesired condition that was present in the earlier capture event. The warnings are based on an analysis of one or more evaluation images captured during archival image capture. The warnings can be provided in addition to revision suggestions or can be provided separately without revision suggestions.

Figure 43:
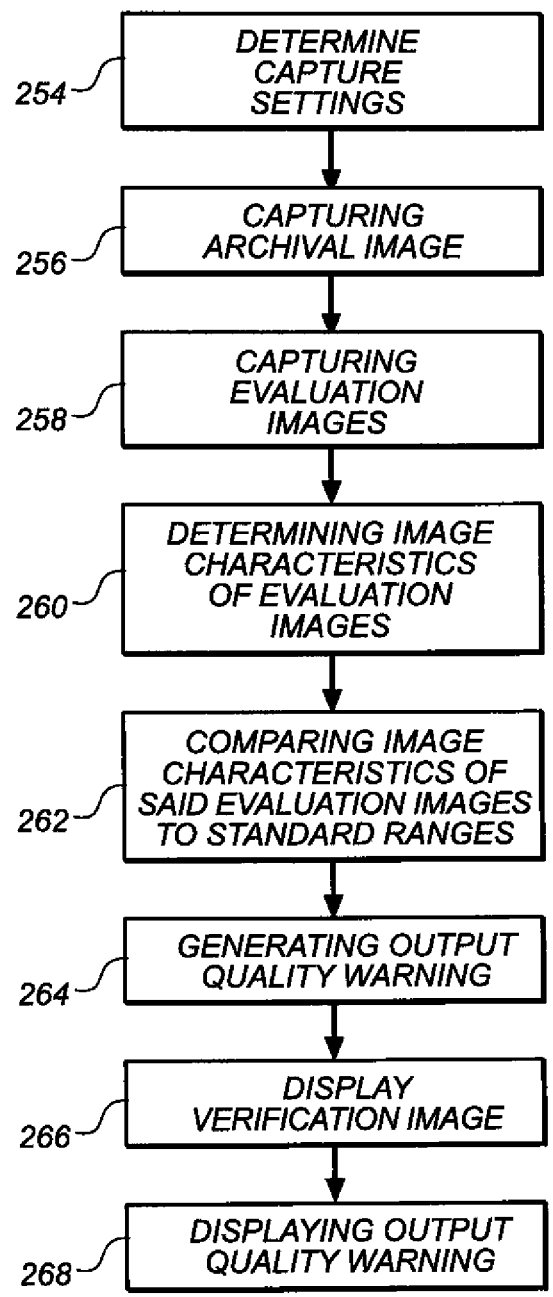
FIG. 43 is a diagrammatic view of the output quality warning photography method.

Referring now to FIG. 43, in the method for providing output quality warnings, the capture settings are determined (254) for archival image capture and the archival image is captured (256). Concurrent with capture (256) of the archival image is capture (258) of a plurality of evaluation images. One or more image characteristics of the evaluation images are determined (260) following capture (258). The image characteristics of the evaluation images are then compared (262) to standard ranges provided in a lookup table (not illustrated). An output quality warning is then generated (264) when one or more of the image characteristics is outside one of the standard ranges. The verification image is presented (266) to the user on the display and that the same time the output quality warning is also presented (268).

Figure 38:
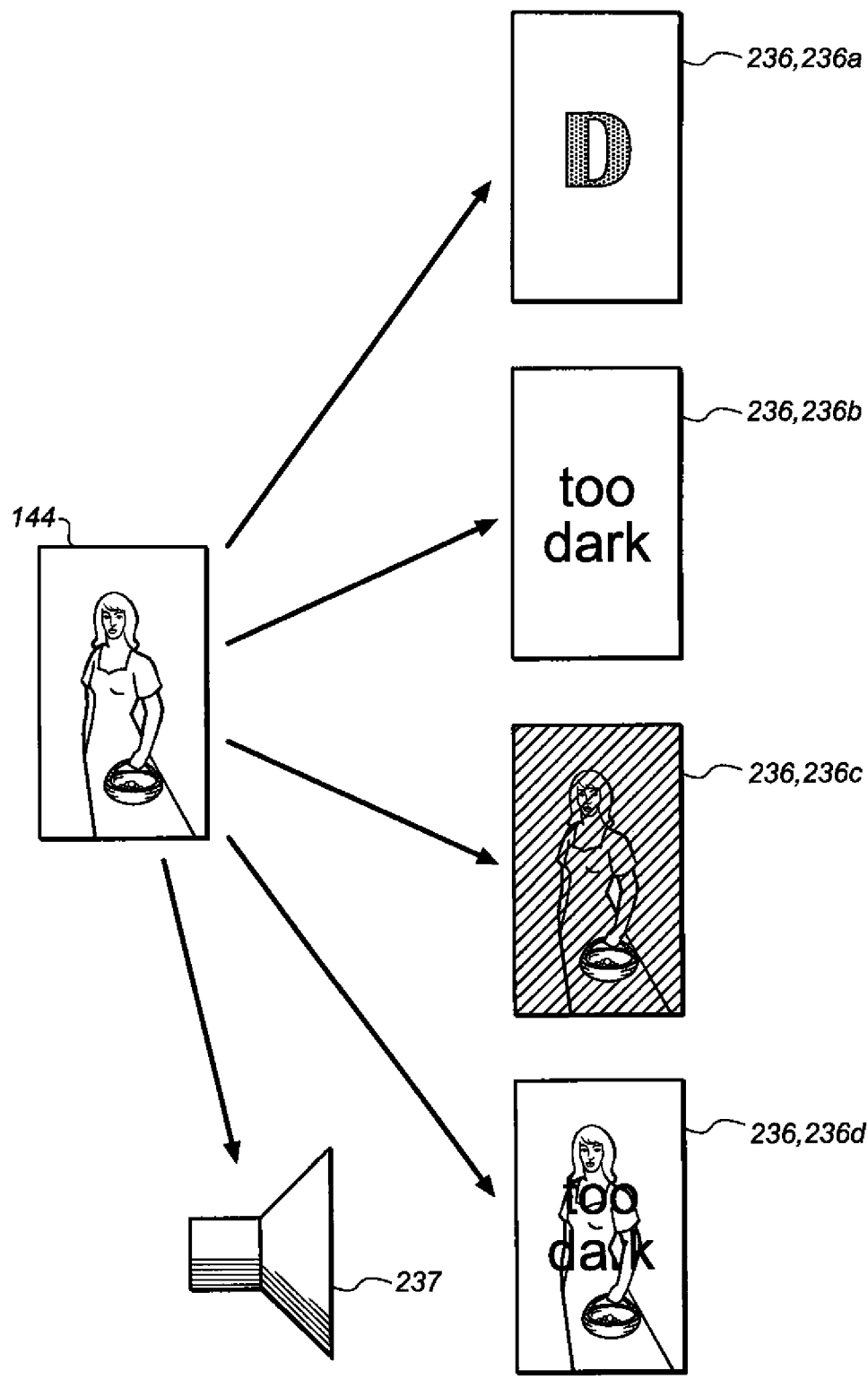
FIG. 38 a diagram illustrating a verification image and four different depictions of the same output quality warning.

The warnings can be depicted by indicia or images or a combination. FIG. 38 illustrates a verification image 144 and four different depictions of a warning that the final image is likely to be too dark after photofinishing. A first warning depiction 236a is an icon in the form of a stylized letter "D". A second warning depiction 236b is the text "too dark". A third warning depiction 236c is a derived image which is darkened excessively relative to the verification image 144. A similar warning depiction (not illustrated) can be a depiction of fully black image. Another warning depiction 236d is a combination of the verification image 144 and the text message "too dark". The warning depiction 236 necessarily differs from the verification image, since the verification image is not in and of itself a warning. In all cases, the warning 236 depicts a particular problem expected in the final image after photofinishing, in a manner that is more apparent to the user than would be the case with the verification image 144. This is shown in FIG. 38. The third warning depiction 236c is a modification of a derived image in which the image is artificially darkened much more than the verification image 144. This darkening is readily apparent to the user. The fourth warning depiction 236d is a combination of the verification image 144 and a superimposition on the verification image 144 of the text "too dark". For ease of rapid recognition, it is preferred that warnings 236 are in the form of indicia, such as text, either by itself or in combination with a derived image.

The warning can be presented as text or other indicia, on the information display 114 instead of the image display 26. If the warnings are presented on the information display 114, it is preferred that the information display 114 and the image display 26 be provided in a user interface 118 that can be perused in a single glance without reorienting the camera 10. This allows a user to quickly check for warning messages 236 while reviewing the verification image 144.

It is possible for the warning 236 to be presented by an indicator (not illustrated) such as a light emitting diode or the like. This approach is not preferred. The reasons are that an indicator light or the equivalent is much more ambiguous than the other warning depictions earlier discussed unless an impractical number or arrangement of many indicators is provided. It is much simpler and more practical to present necessary text or other indicia on a display.

It is preferred that the warnings 236 attract the attention of the user to an unambiguous message that there will be a problem in the final image after photofinishing. Currently preferred forms of warnings are static, scrolling, or blinking text messages and large icons centered on the image display. The indicia can also be highlighted. "Highlighting" here refers to any presentation, such as brighter lighting, that makes one of a group of icons more noticeable.

FIGS. 33-37 illustrate some specific examples of how the warning 236 can be provided. In the embodiments shown in FIGS. 33-37, the information display 114 is rectangular and contiguous with the bottom of the image display 26. Textual warning messages are presented on the information display.

Figure 33:
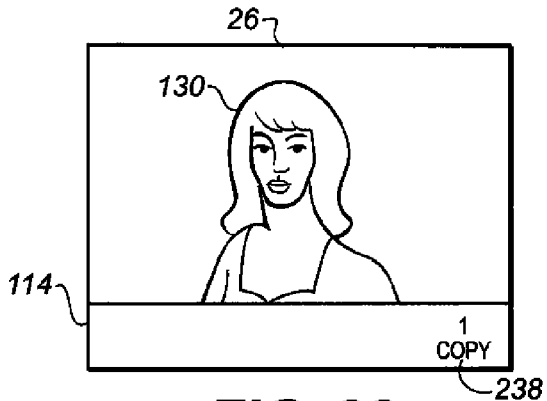
FIG. 33 is a diagrammatical view of an image display showing a verification image and the adjoining information display.
Figure 34:
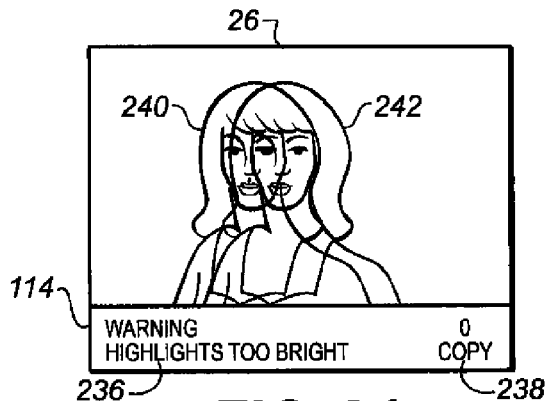
FIG. 34 is the same view as FIG. 33 for a different capture event, in which the user moved the camera as the picture was taken.

In FIG. 33, the scene was properly captured, with no motion or exposure problems, and the information display 114 does not provide a warning message. A text message 238 indicates that the film unit 36 includes recorded information that is interpreted at photofinishing to require printing of "1 copy" of the archival image. FIG. 34 illustrates the same information panel as in FIG. 33, but after a different scene has been captured. In this example, the user moved the camera 10 as the picture was taken. A warning message is provided in the information display 114 indicating that there was too much motion. In addition, the print count is automatically set to zero copies, so that the archival image will not be printed in this case, unless overwritten by the user.

Figure 35:
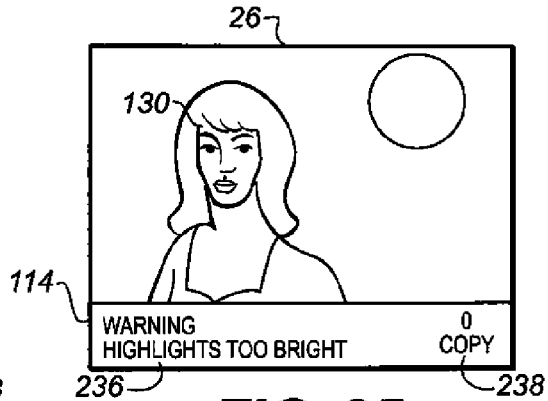
FIG. 35 is the same view as FIG. 33 for a different capture event, in which the sun is in the background of the image.
Figure 36:
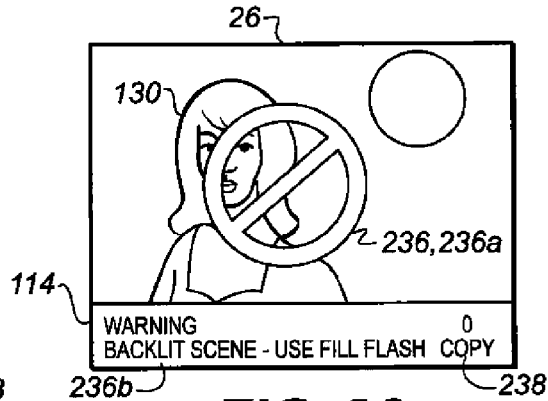
FIG. 36 corresponds to the view and capture event of FIG. 35, but using a modification of the camera.
Figure 37:
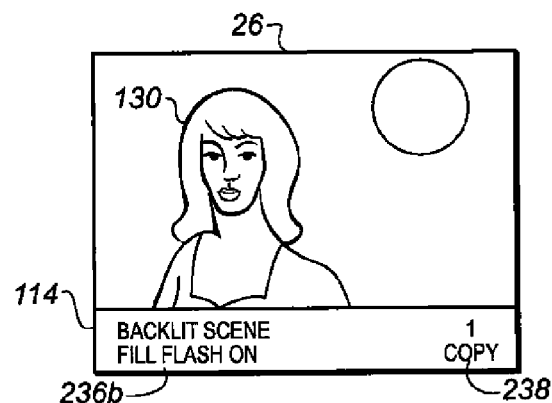
FIG. 37 corresponds to the view and capture event of FIGS. 35 and 36, but using another modification of the camera.

FIG. 35 illustrates the same information panel as in FIG. 33, but after a different scene has been captured. In this example, the user took a portrait under backlighted conditions and the sun was included in the archival image field-of-view. A warning message is provided by the information display 114 indicating that the highlights are too bright. The print count is again set to zero. FIG. 36 illustrates an alternative warning message for the same picture taking conditions as in the example of FIG. 35. In FIG. 36, a large warning message icon 236a is overlaid in the image. This icon may be a bright color (e.g. bright red) and/or may be flashing, in order to gain the user's attention. In FIG. 37, the warning message 236b, "BACKLIT SCENE FILL FLASH ON", is that the camera has responded to lighting conditions with an automatic compensation, which will may or may not be acceptable to the user.

In FIG. 34, the warning message is based on an analysis of one or more exposure characteristics of two or more temporally displaced electronic images captured, concurrently with archival image capture. As disclosed in U.S. patent application Ser. No. 09/493,442, filed Jan. 28, 2000, multiple images can be used to determine if the captured latent image was blurred by relative motion of the camera 10 and the contents of the scene.

Camera motion that occurs during the archival image exposure time interval is captured in the latent image as a blurred image. Subject motion, rather than camera motion, appears as a blurred area within the latent image. The extent of blur is a function of range of the particular motion and the time duration of the motion relative to the latent image time interval. This blur may or may not be visualized in a single concurrent electronic image depending upon any difference in the electronic exposure time interval and the latent image time interval. Shutter times can be made the same for electronic and latent images, but not without considerable difficulty.

U.S. patent application Ser. No. 09/493,442 discloses a technique for visualizing motion blur in a verification image. In this technique, two temporally displaced electronic images are captured during the archival image exposure time interval and combined to provide the verification image. The result, two superimposed images, approximates the motion blur in the archival image. (FIG. 34 illustrates this with two combined line images 240,242.)

The camera 10 uses this technique to prepare a verification image and, in addition, makes a determination for warning purposes as to whether motion blur is present. Movement of the optical system 56 relative to all or part of the scene is determined by comparing the values from two digital images taken at different times during the film exposure period. Hand shake, undesired movement in the scene to be captured, and the like, can be determined by determining the amount of difference between the two images. If this motion-related difference exceeds a threshold, a warning message is shown on the image display 26.

Figure 39:
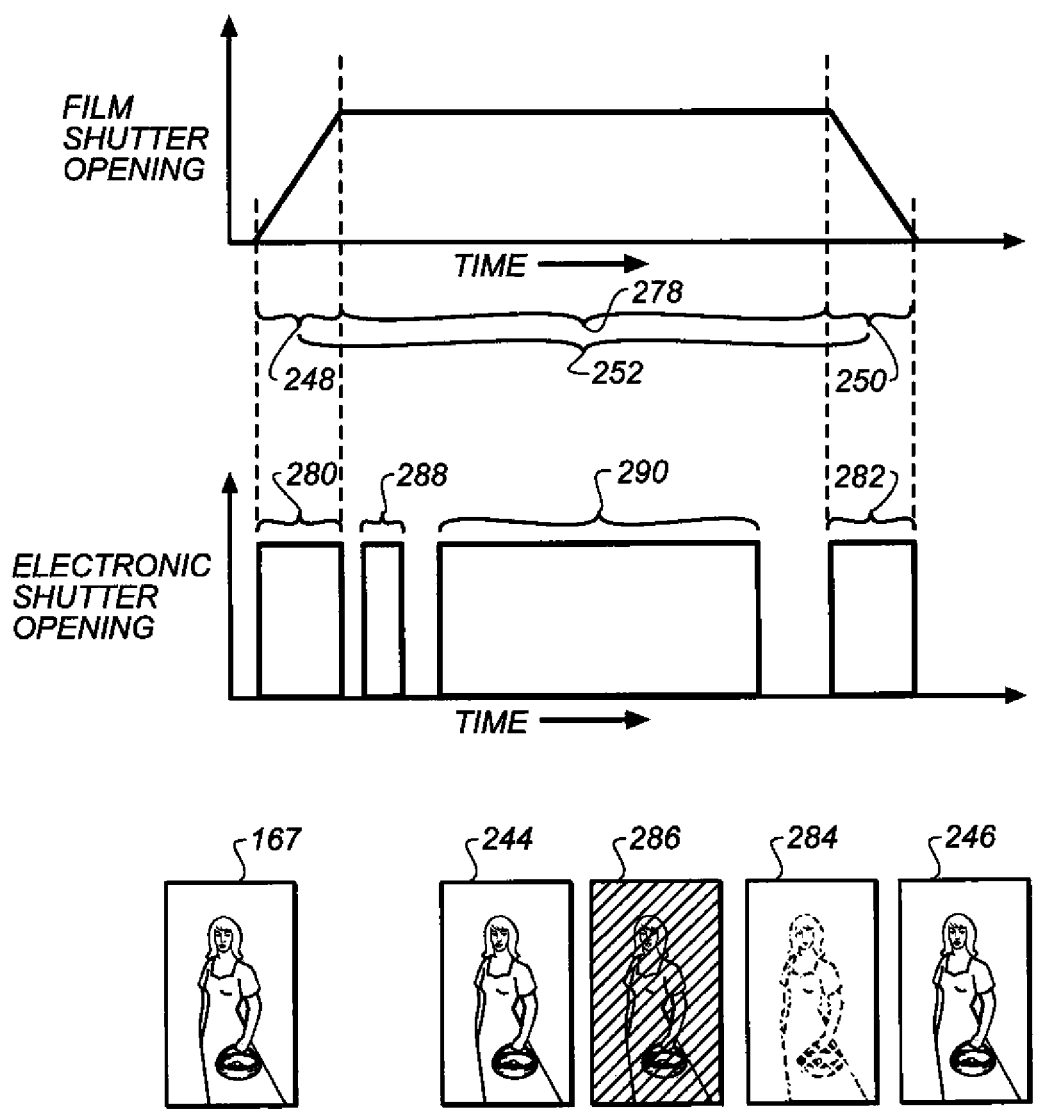
FIG. 39 is a diagrammatical view of a single capture event of the output quality warning photography method. Shutter opening is graphed versus time for the film and electronic shutters (The graphs are aligned and at the same scale.) The archival image and four original electronic images captured during the graphed time periods are indicated below the graphs.

Referring now to FIG. 39, capture, during archival image capture, of the two digital images 244,246 used for motion blur analysis is preferably timed to occur at the beginning 248 and end 250 of the archival image exposure time interval 252. (The two additional electronic images shown in FIG. 39 are discussed below in relation to exposure analysis.) Motions that cause a difference in the scene image between initial and final portions 248,250 of the archival image exposure time interval 252 will cause corresponding differences in the digital images 244,246. These digital images 244,246 from the beginning and end of the latent image capture interval are referred to here as "first and last electronic images 244,246". This term is inclusive of both the respective original electronic images and corresponding derived images. More precise terminology, such as "first and last original electronic images" and "first and last evaluation images", is used only when a further distinction is needed.

The verification image can be either of the first or last evaluation images or, preferably, the verification image can be provided by a pixel-by-pixel combination of the two images, with intensities reduced by half before or after combining.

Relative camera-scene motion that is completely limited to the middle portion 278 of the archival image exposure time interval 252 is not detected. For most picture taking, this is unimportant; since the majority of motions seen in actual picture taking and those motions most damaging to photofinished final image quality would be detected.

It is preferred that capture of the first original electronic image 244 begin at substantially the same time as the archival image exposure time interval 252 and that capture of the last original electronic image 246 end at substantially the same time as the archival image exposure time interval 252. The alternative, that the electronic exposure time interval of one or both of the first and last original images 244,246 goes beyond the time limits of the archival image exposure time interval 252; presents a risk that the resultant combined image will show motion that was not timely and was not captured by the latent image. The first and last original electronic image time intervals 280,282 are "substantially" simultaneous with the archival image exposure time interval if any difference in simultaneity is of a length of time that would stop motion in an image capture event. For example, a first original electronic image time interval that started ½50 second before the archival image exposure time interval would be substantially simultaneous with the archival image exposure time interval. The relative proportions of the initial portion 248, middle portion 278, and final portion 250 of the archival image exposure time interval 252 can vary, but it is preferred that the initial and final portions 248,250 be equal in duration and have the same temporal overlap with the respective first and last electronic exposure time intervals 280,282.

The evaluation of motion requires an imager 24 that can obtain at least two exposures in the archival image exposure time interval. The relative photographic speeds of the film 20 and the imager 24 must be selected so as to make this possible. This currently is very easy to accomplish, since relatively fast imagers and slower films are readily available. It is convenient to select an imager first and then select a film that has a photographic speed allowing archival image exposure time intervals that permit multiple exposures by that particular imager.

Figure 40:
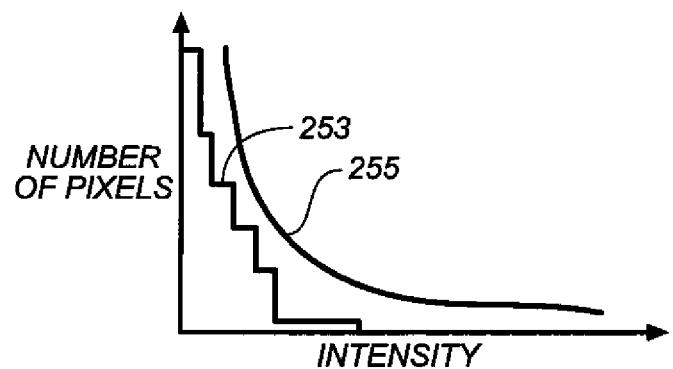
FIG. 40 is a graph of comparison of the difference in the first and fourth original electronic images of FIG. 39 to the respective warning threshold.

The two evaluation images derived from the first and last original electronic images 244,246 are subtracted, in the form of intensities on a pixel-by-pixel basis, to prepare a difference image (not illustrated) that indicates the magnitude of the difference between the first and last images 244,246. (Different exposure times can be adjusted for, but it is preferred that the first and last original electronic images 244,246 have the same exposure time.) The difference image is compared to a threshold and if the difference image exceeds the threshold, a warning message is provided to the user. This comparison is illustrated in FIG. 40 by a histogram 253 of an example difference image plotting intensity versus number of pixels at each unit intensity. A curve 255 on the same plot shows the threshold. In this example the difference image does not exceed the threshold. Determination of such histograms is performed in the control system using methods well-known to those skilled in the art.

Figure 44:
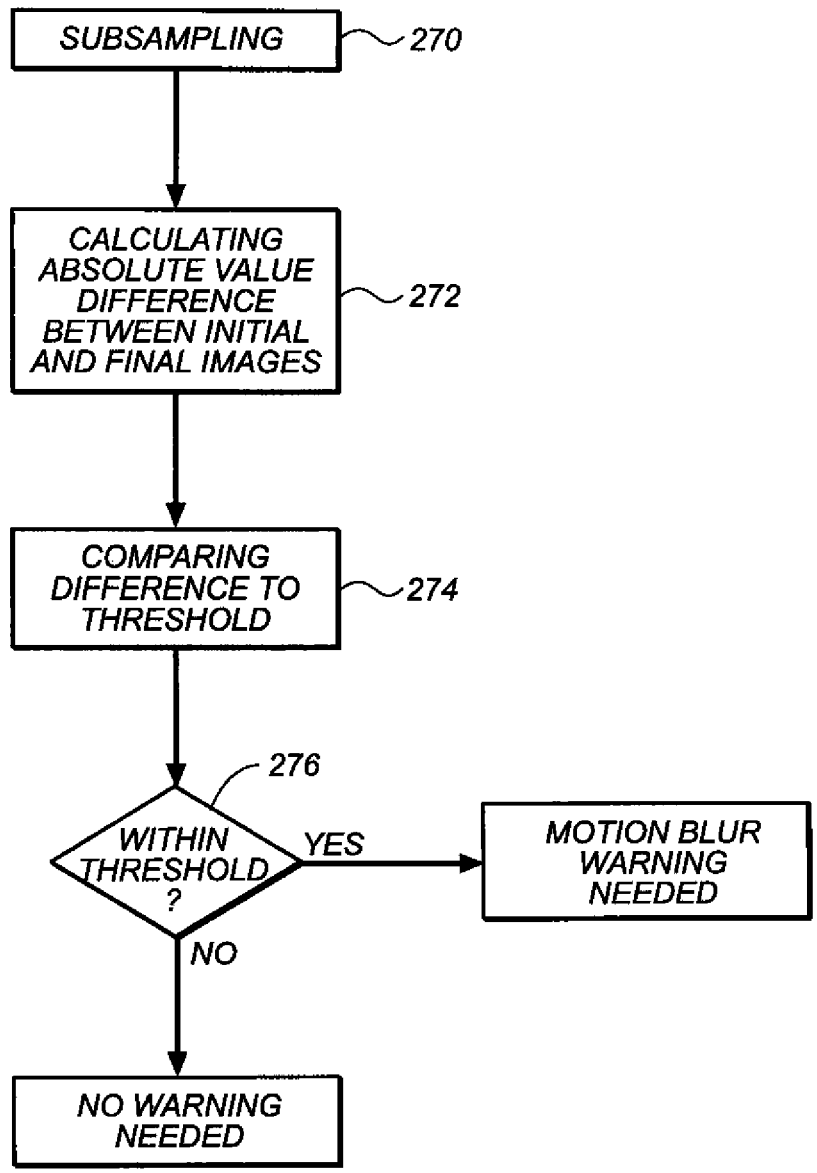
FIG. 44 is a more detailed diagrammatical view of the determining and comparing steps of an embodiment of the method of FIG. 43.

FIG. 44 illustrates these steps for the method shown in FIG. 43. The last evaluation image 246 is subsampled (270) and the first evaluation image 244 is subtracted (272). (In addition to producing difference values, this procedure also, in effect, subsamples the first evaluation image 244 in the same manner as the last evaluation image 246.) The absolute value of the intensity of each pixel of the difference image is calculated. If there were no motion, and no electronic noise, this difference image would be equal to zero. However, due to noise and subject motion, the difference image pixel values are generally non-zero. The larger the values, the more motion was present in the captured film image. The difference image is compared (274) to the threshold. For example, as discussed above a histogram providing the number of pixels at each particular code value can be calculated and plotted against a predetermined threshold curve. The camera checks (276) if the difference image is within or beyond the threshold and generates (264) a warning only when needed.

In addition to a warning, the camera can provide a revision suggestion that the user try to hold the camera steadier, use a tripod, or the like.

FIG. 40 depicts the motion blur testing histogram for the capture event corresponding to the verification image shown in FIG. 33, along with the threshold limit curve 255 for excessive motion blur. The histogram count at each code value is compared to the threshold limit at that same code value provided by curve 255. If the threshold comparison indicates that the threshold is never exceeded for any pixel code value, then there is no motion blur problem. If the threshold comparison indicates that the threshold is exceeded for at least one code value, the quality is determined to be unsuitable due to motion blur. The example depicted in FIG. 40 has no motion blur. FIG. 34 illustrates a captured image in which the user moved the camera 10 as the picture was taken. In this case, the threshold curve of FIG. 40 is exceeded and a warning message indicating excessive motion is provided on the information display.

Alternative methods of determining the amount of motion blur can be utilized. For example, a threshold comparison could require that the threshold be exceeded for several code values before indicating that the quality was unsuitable; or the average of the absolute value of all pixels in the difference image can be calculated and compared to a threshold code value. The desirablity of a particular comparison depends upon the level of motion blur considered acceptable for a particular use and the level of electronic noise expected with a particular camera. Other algorithms for determining motion blur, for example, algorithms based on the results of motion vectors calculated using the first and last electronic images, could alternatively be used.

Multiple original electronic images can also be used to determine whether a final image that will be produced by photofinishing a particular non-flash archival image will have a range of luminance values likely to represent an unsuitable picture by reason of overexposure or underexposure or what is, in effect, a combination of both. (A common example of the latter is a backlit scene shot without fill-flash.) This exposure evaluation can be combined with an evaluation for motion blur.

The exposure evaluation here is directed to the expected qualities of a final image produced by photofinishing, rather than the qualities of the scene captured. This takes into account the latitude of photographic film, particularly photographic print film, which corrects moderate over and under exposure of the archival image.

In the capture event, the latent film image is captured by momentarily opening the film shutter 92 for an archival image exposure time interval with the film diaphragm at an archival image diaphragm setting. The duration of the archival image exposure time interval and the archival image diaphragm setting are determined and set, before the film exposure begins, in the same manner as in other photographic film cameras 10. An exposure value for a particular scene is evaluated and the shutter and diaphragm settings are determined. This is generally described here as an automatic procedure, but these procedures could be performed manually, for example, by using an external meter and fully manual controls.

As noted, the photographic film has an exposure latitude that does not require archival image capture at an optimum exposure value. The term "exposure latitude" is used herein to refer to the exposure range of a characteristic curve segment over which instantaneous gamma ([DELTA]D/[DELTA] log E) is at least 25 percent of the average gamma in the straight line center portion of the characteristic curve. (The term "E" is used to indicate exposure in lux-seconds. The term "gamma" is employed to indicate the incremental increase in image density ([DELTA] D) produced by a corresponding incremental increase in log exposure ([DELTA] log E) and indicates the maximum gamma measured over an exposure range extending between a first characteristic curve reference point lying at a density of 0.15 above minimum density and a second characteristic curve reference point separated from the first reference point by 0.9 log E. The exposure latitude of a color element having multiple color recording units is the exposure range over which the characteristic curves of the red, green, and blue color recording units simultaneously fulfill the aforesaid definition.) The archival image capture, thus, can be anywhere within a range of exposure values and satisfactory results will be obtained. The exposure latitude is particularly broad with color negative film, i.e., print film.

The camera 10 provides a warning when an archival image exceeds a predetermined exposure requirement. To do so, the camera 10 must take into account the exposure latitude of the film used and the relationship of camera determined exposure values to the exposure latitude.

A relationship of camera determined exposure values to exposure latitude, in most cameras 10, is simple. The film shutter 92 and diaphragm settings are matched to the determined exposure value, within the limits of accuracy of camera components. This approach is simple and independent of available exposure latitude. An alternative approach is to offset film shutter 92 and diaphragm settings from a determined exposure value relying upon some of the available exposure latitude. For convenience, cameras 10 disclosed herein are described in terms of, but not limited to, the simpler approach of matching to the determined exposure value.

The camera 10 can determine the exposure latitude for a loaded film by reading an encodement or manual setting. The camera 10 can instead be limited to using photographic films that all have similar exposure latitudes. This is currently the case for Advanced Photo System™ (APS™) films (also referred to herein as "APS negative films"), which are limited to color and chromogenic negative films, which all have similar exposure latitudes. For example, the camera could be limited to use with APS negative films having an exposure value for acceptable images of up to 4 photographic stops overexposure and up to 2 stops of underexposure relative to an optimized exposure. As an alternative, warning messages can be limited to occasions when appropriate films are used, as determined automatically by the camera 10 from a film unit encodement, such as a DX code or manually set by the user. Each encodement or manual setting would define a particular exposure latitude for the purposes of warning messages.

Corresponding to the archival image exposure value is a nominal electronic exposure value for electronic image capture. The nominal electronic exposure value is calculated in the same manner as the archival image exposure value, but based on parameters of the evaluation capture unit 18 rather than the archival image capture unit 16. The imager 24 of the evaluation capture unit 18 differs from photographic film in that, at least in comparison to film, the imager 24 exhibits a negligible amount of the above-discussed exposure latitude. Commonly available commercial imager have this characteristic. In practical terms, the exposure latitude of these imagers is within limits of accuracy for setting exposure parameters and can thus be ignored.

The nominal electronic exposure value is used to provide settings for the first and last original images that are used for the motion blur analysis earlier discussed. Either of these two original electronic images can be used in deriving the verification image, or, preferably, the verification image can be provided by a pixel-by-pixel combination of the two images. The camera 10 is generally discussed here in terms of first and last original images, each exposed at the nominal electronic exposure value; and a verification image derived by reducing pixel values of each image by half and combining the results. Other approaches, such as combining pixel values of first and last original images exposed at exposure levels reduced by half, can also be used to produce an equivalent verification image. For convenience, the verification image is generally referred to herein as having been exposed at the nominal electronic exposure value. This usage is inclusive of the various different approaches used to produce the verification image. Also for convenience, the camera 10 is generally discussed in relation to an embodiment simultaneously providing both motion blur analysis and exposure analysis.

Referring to FIG. 39, for exposure analysis, at least two more original electronic images are captured in addition to the first and last original images. The different original electronic images can be separated only by a minimal time interval imposed by the imager or more of the original electronic images can be delayed relative to a preceding original electronic image, within the limits of available time. The capture of four temporally displaced original electronic images is convenient for this purpose. Those original images include the first and last original images 244,246 and two more original electronic images 284,286 (also referred to here as "exposure original electronic images"). After capture, each of the original electronic images are sent as analog output to the A/D converter 104 for conversion to digital images, which are then stored in memory 54. Original images not need for the production of the verification image can be subsampled to reduce the size of the memory needed for storage, since the processing needed to determine whether the image quality is suitable can be performed on a relatively low resolution image.

The exposure original electronic images 284,286 can be captured during the archival image exposure time interval 252, between capture of the first and last original images 244,246. Alternatively, the exposure original electronic images 284,286 can be captured outside the archival image exposure time interval 252 (this is not illustrated). Those captures can be either before or after the archival image exposure time interval 252, or one exposure original electronic image 284 or 286 can be captured before and the other 286 or 284 can be captured after the archival image exposure time interval 252. Due to the possibility of changing exposure conditions and to minimize time requirements for each picture taking event, it is preferred that the exposure original electronic images 284,286 are both captured during the archival image exposure time interval 252.

The exposure original electronic images 284,286 have higher and lower exposure values than the nominal electronic exposure value and are referred to as an "overexposure image 286" and "underexposure image 284", respectively. The order indicated by the references numbers 284 and 286 and shown in FIG. 39 is unimportant. Either exposure original electronic image 284 or 286 can precede the other.

The overexposure and underexposure values are selected to represent the limits of the maximum exposure latitude of the film. For example, with color negative film that has an exposure value latitude for acceptable images of up to 4 photographic stops overexposure and up to 2 stops of underexposure; the overexposure setting exposes the color negative film at +2 stops and the underexposure setting exposes the film at −4 stops.

Whether a latent film image was exposed at a suitable level is determined by analyzing the histograms of the verification image, the overexposure image, and the underexposure image. Determination of such histograms can be performed in the same manner as earlier described for the motion blur analysis.

If the verification image has many pixels values at the minimum and maximum levels, the histograms from the overexposed and under-exposed images can be examined to determine how significant the over or under exposure was, taking into account the particular film type. For example, pixels can be counted that have a code value of 0 using a scale of possible values of 0 to 255 in both the verification image and the overexposure image. Likewise, pixels can be counted that have a code value of 255 using the same scale in both the verification image and the underexposure image.

In the example shown in FIG. 39, four temporally displaced original electronic images are captured. The first original electronic image 244 is captured, followed by capture of the underexposure image 284, followed by capture of the overexposure image 286, followed by capture of the last original electronic image 246. The imager 24 has a nominal electronic exposure time interval "t" for a properly exposed original electronic image. The first and last original images 244,246 are exposed during first and last original electronic image time intervals 280,282 that each have the same duration as the nominal exposure time interval "t". The underexposure image 284 is exposed during an underexposure time interval 288 that is shorter in duration than time interval "t". The overexposure image 286 is exposed during an overexposure time interval 290 that has a longer exposure time than time interval "t".

As illustrated in FIG. 39, the underexposure time interval is relatively short, compared to the time intervals of the other original electronic images, and provides an underexposed image; and the overexposure time interval is relatively long compared to the others, and provides an overexposed image. If the evaluation capture unit of the camera 10 has a variable aperture, then the duration of one or both of the exposure evaluation time intervals can be changed, while keeping the same exposure value, by changing a diaphragm setting.

Figure 45:
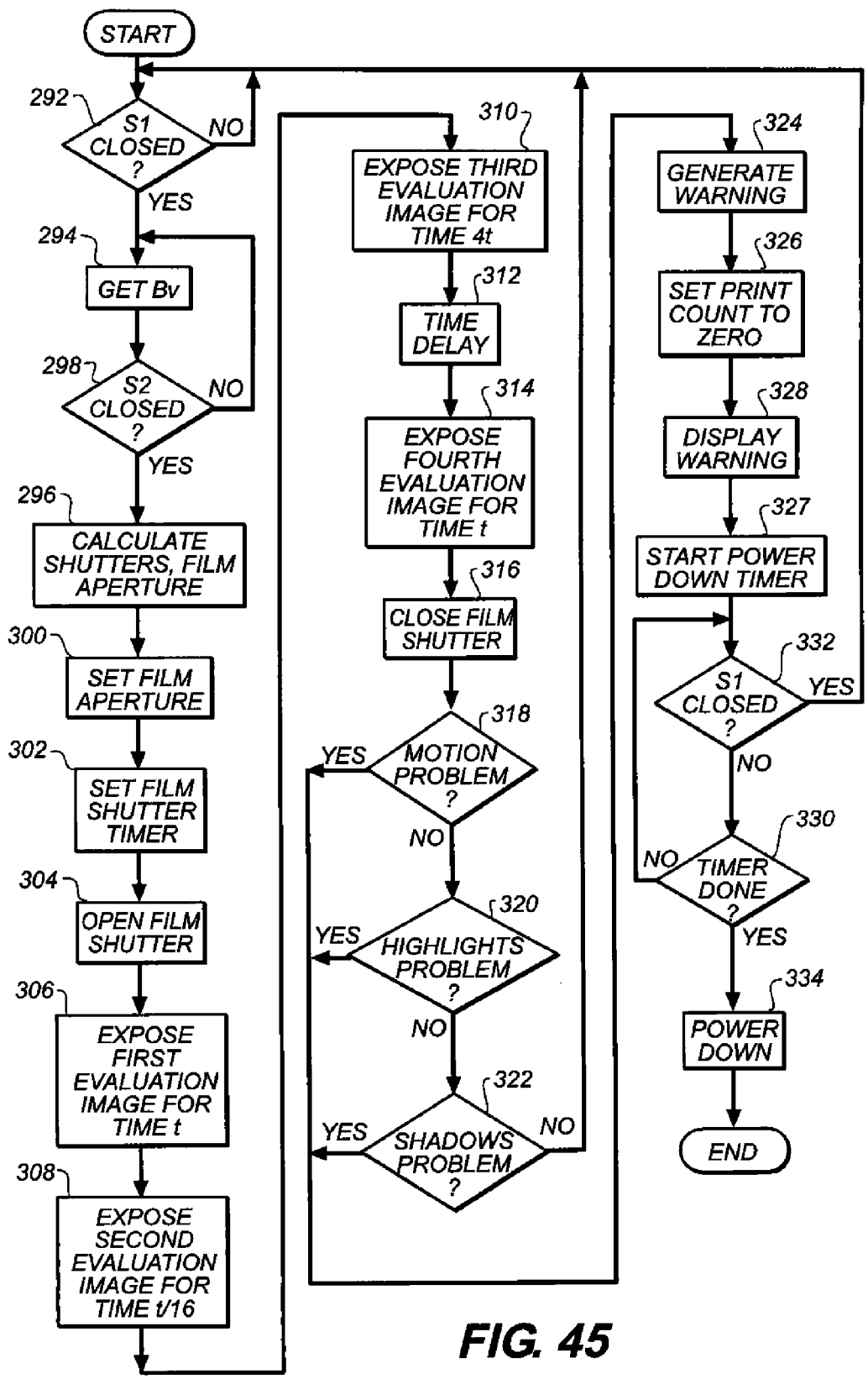
FIG. 45 is a flow chart of camera operation utilizing the method of FIG. 43.

The sequence of procedures followed by the camera in capturing the archival and electronic images is shown in FIG. 45. The controller 81 initially does a determination (292) of whether the first switch S1 "S1" is closed. If so, then the light value is ascertained (294) based on the film type and speed loaded in the camera 10 (which can be determined using the DX code as is well-known in the art) and the film shutter 92 and aperture are calculated (296) and the electronic exposure time intervals are calculated (296). (In this embodiment, the aperture for the imager 24 does not change.) During this time, a determination (298) is made that the second switch S2 "S2" is closed. The film aperture is set (300) and the film shutter 92 timer is set (302). The film shutter 92 is opened (304) and the electronic shutter is opened and closed to expose (306) the first original electronic image 244, for a period of time t. This first electronic image 244 is then subsampled and stored in memory 54. (The subsampling and storing of the electronic images are not illustrated in FIG. 45.)

The electronic shutter is next opened and closed to expose (308) the underexposed image 284 for a period of time t/16, corresponding to a −4 stop exposure relative to the normal exposure, and the underexposed electronic image is subsampled and stored in memory 54. The electronic shutter is then opened and closed to expose (310) the overexposed image 286 for a period of time 4*t*, corresponding to a +2 stop exposure relative to the normal exposure, and the overexposed image 286 is subsampled and stored in memory 54. A time delay is waited (312) through so that the last electronic image capture begins at the appropriate time, and the last original electronic image 246, is exposed (314) and stored in memory 54.

The film shutter 92 timer is checked (not shown) and the film shutter 92 is closed (316) at the end of the archival image exposure time interval 252. The film is then transported (not shown) to advance to the next film frame.

The difference between the first and last original electronic images 244,246 is analyzed (318) to determine if there was motion blur in excess of a first threshold. The underexposed image 284 is analyzed (320) to determine if there are highlights in excess of a second threshold. The overexposed image 286 is analyzed to determine (322) if there are shadows which exceed a third threshold.

If any of the thresholds are exceeded an appropriate warning is generated (324) and the print count default is set (326) to zero prints. This also sets (327) a display timer and enables the display to show (328) the warning. Alternatively, the display timer and display can be enabled by the user using an appropriate button or other user control (not shown).

The display is shown (328) and continues with the controller checking (330),(332) if the display time has elapsed or the first switch S1 is closed, in which case, the display is disabled (334).

Figure 41:
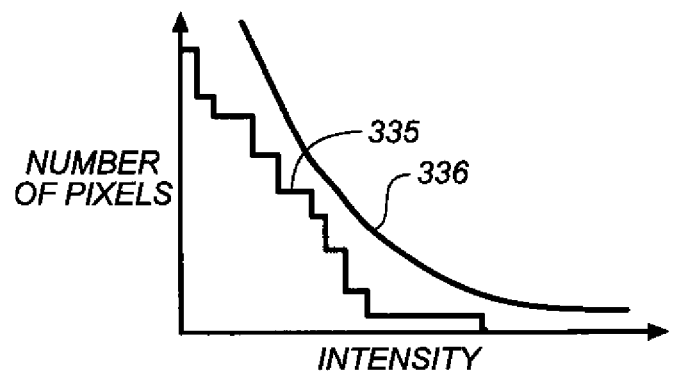
FIGS. 41 and 42 are graphs of the comparison of the second and third original electronic images of FIG. 39, respectively, to the respective excessive highlight warning threshold and excessive shadows warning threshold.
Figure 42:
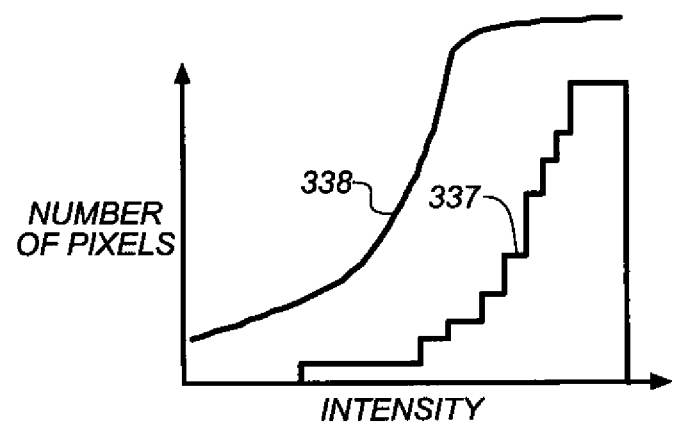

FIGS. 41-42 illustrate a particular approach for analyzing exposure level. Referring to FIG. 41, a histogram 335 providing the number of pixels in the underexposed image 284 (captured using an exposure time of t/16) having each particular code value is shown along with a threshold curve 336 for excessive highlights. Since the underexposed image 284 has a very short exposure time (−4 stops), there should be very few pixels having high code values, unless there are some very bright scene highlights, as is the case with some backlit scenes. The histogram count at each code value is compared to the threshold limit at that same code value provided by curve. If the threshold comparison indicates, that the threshold is exceeded for at least one code value, the quality is determined to be unsuitable due to highlight exposure problems. On the other hand, if the threshold comparison indicates that the threshold is never exceeded for any pixel code value, then there is no highlight exposure problem. This is the situation for the example depicted in FIG. 41.

Referring to FIG. 42, a histogram 337 is shown for the number of pixels in the overexposed image 286 (captured using an exposure time of 4*t*) having each particular code value along with a threshold curve 338 for excessive shadows. Since the overexposed image has a very long exposure time (+2 stops), there should be very few pixels having low code values, unless there are some very dark shadows in the scene. The histogram count at each code value is compared to the threshold limit at that same code value provided by curve. If the threshold comparison indicates that the threshold is exceeded for at least one code value, the quality is determined to be unsuitable due shadow exposure problems. On the other hand, if the threshold comparison indicates that the threshold is never exceeded for any pixel code value, then there is no shadow exposure problem. This is the situation for the example depicted in FIG. 42.

Lookup tables are provided for the over and under exposure thresholds and processing is performed by the control system as above described for the motion blur analysis. The evaluation of over and under exposure can likewise be varied, as noted above for the motion blur analysis.

Warning messages are provided to the user when a significant over-exposure or under-exposure condition is detected. If the underexposure image contains many pixels at high code values, then the exposure value of the archival image, which corresponds to the exposure value of the verification image, was too high to capture image highlights. If the overexposure image contains many pixels with low code values, then the exposure value of the archival image was too low to capture shadow details. In either case, the user is warned that the captured image is expected to provide a less than satisfactory quality print.

After the user is warned that the motion blur or scene exposure setting is expected to provide an unsuitable quality print, the user can then repeat the picture taking event. In some embodiments, such as cameras 10 providing Advanced Photo System features, the user can change the number of photographic prints ordered to be other than a default number of prints, usually one print. If desired, the camera 10 can automatically change to a default number of prints for images determined to be of unsuitable quality to zero. This is shown in FIGS. 33-36. In FIG. 33, the scene was properly captured and the print count display has a text message 238 that indicates that one print of this film image will be provided, unless the user changes the print count. In FIGS. 34-36, the archival images are unsuitable for prints, the camera 10 has changed the print count, and the print count message 238 indicates that zero prints of this film image will be provided, unless the user changes the print count.

The verification image can be displayed when the user actuates a switch for the verification image. The warning message can instead be provided immediately following capture, without requiring a switch actuation, as desired. Revision suggestions are provided following actuation of a switch. The revision suggestions can include information on potential ways to avoid the problem or problems that caused a warning message to be presented in relation to a previous exposure. For example, scrolling text can provide various reasons why the picture may have had camera 10 shake as well as potential ways to reduce the motion in future images, such as holding the camera 10 steady with both hands. Similarly warning message text can provide an explanation of the problem of a backlit scene and a revision suggestion can be provided that a fill flash be used. Revision suggestions related to warning messages, like other revision suggestions earlier discussed, can be provided as revision suggestion images 138*c* or indicia or a combination of both.

Revised Recapture Camera

In a particular an embodiment of the invention, the camera 10 accepts an input from the user choosing one of the revision suggestions. The camera 10 then acts upon the chosen revision suggestion by resetting the capture configuration of the camera 10 for recapture of the same scene implementing the chosen revision suggestion. The user can then repeat image capture and, if the conditions have not changed, the resulting archival image closely resembles the chosen revision suggestion.

Figure 46:
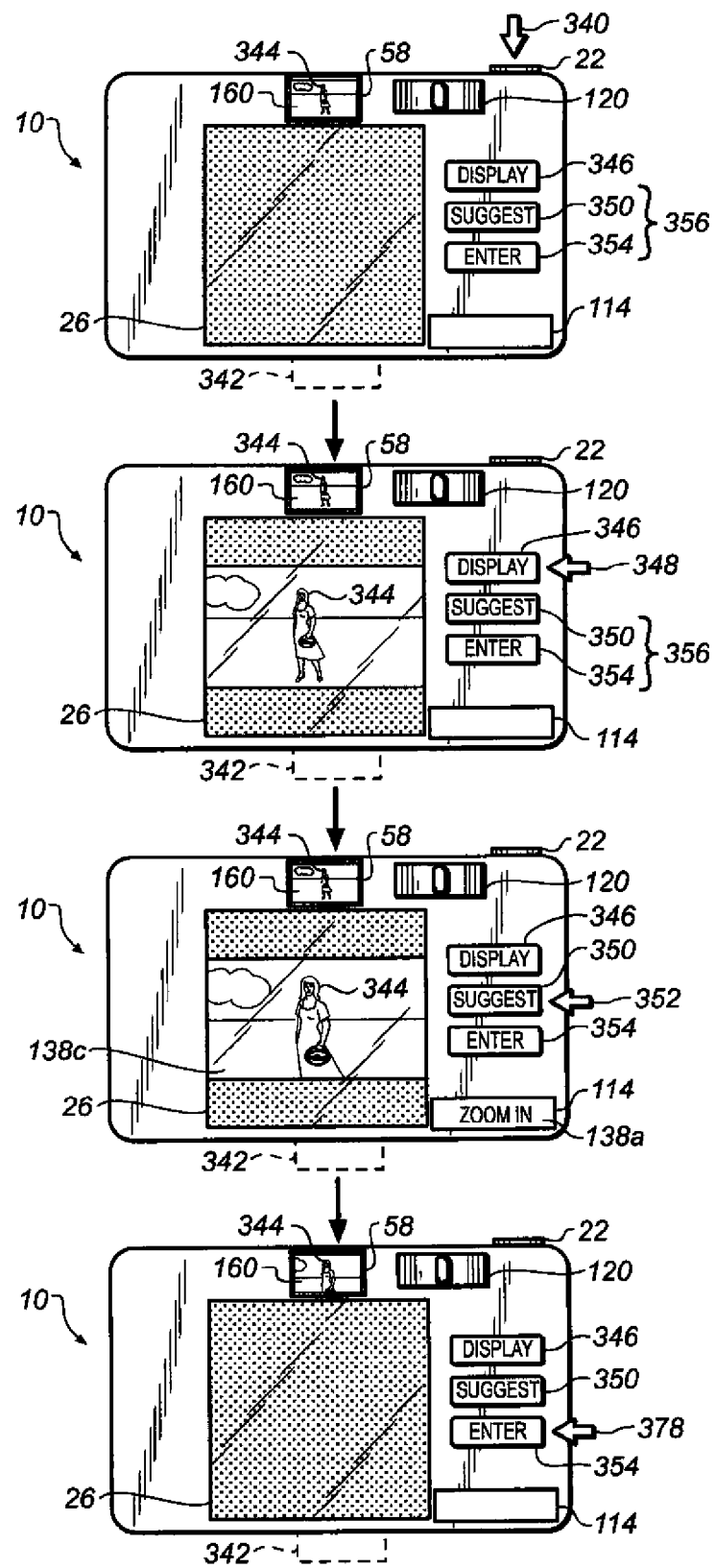
FIG. 46 is a diagrammatical view of the operation of a modification of the camera of FIG. 1, which provides for revised recapture.
Figure 47:
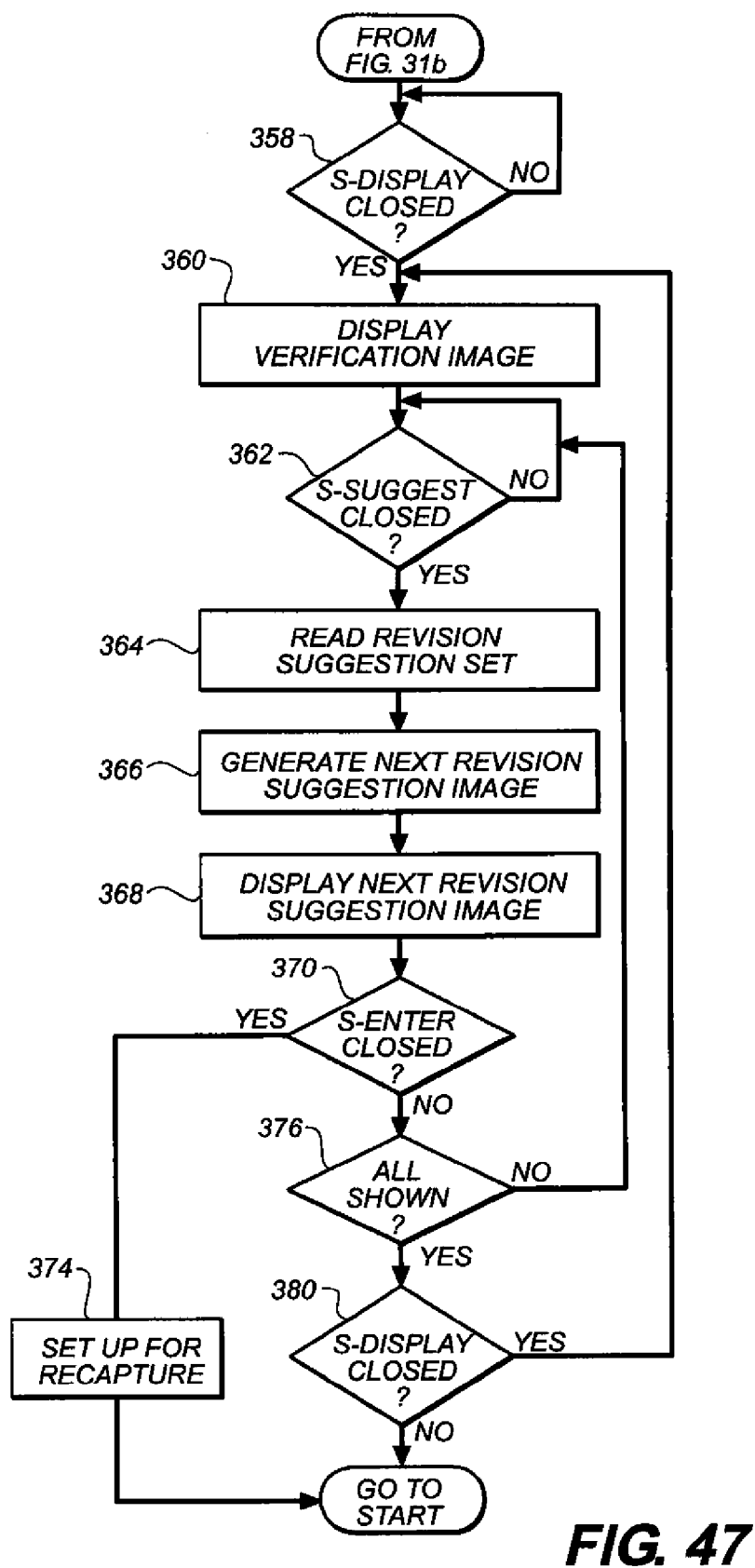
FIG. 47 is a modification of the flow chart of FIGS. 31a-31c in which the camera provides for revised recapture.

Referring now to FIGS. 4, 46, and 47, the user captures an archival image and one or more evaluation images of the scene by pressing (indicated by arrow 340 in FIG. 46) the shutter release 22, as earlier discussed in relation to FIGS. 31*a*-31*b*. The viewfinder image 160 shown corresponds to the scene image captured. In the camera shown in FIG. 46, the image display is not used as an electronic viewfinder and no image is shown at the time of image capture.

In FIG. 46, the camera 10 is attached to a tripod 342 (indicated by dashed lines) and the camera 10 and model 344 in the images remain immobile during the steps shown. These conditions are imposed to simplify understanding in this discussion. If a tripod is not present, then it is expected that the camera will be moved between capture of the scene and later recapture, even if the photographer and model have themselves not moved and the camera is positioned in the same place for capture and recapture. Such movements would change what the viewfinder shows during intermediate steps, but would not change other features shown in FIG. 46. The camera is not, however, limited to use in situations in which the scene remains static. Many or most revision suggestions remain applicable despite some relative movement between a subject and the photographer or other moderate changes in scene conditions. For example, a revision suggestion to zoom in is dependent upon the relative separation of the subject and the be photographer. Other movement of the subject or exchange of one human subject for another at the same distance does not affect the applicability of the revision suggestion.

The camera 10 has a display switch 346 ("S-display" in FIG. 47) that is selectively actutated (indicated by arrow 348) by the user to activate the image display 26 following image capture. The control system 80 checks (358) for this actuation and responsively shows (360) the verification image 144 on the image display 26.

The camera 10 has a suggestion review switch 350 ("S-suggest" in FIG. 47) that is selectively pushed (indicated by arrow 352) by the user. This momentarily closes switch 350. The control system 80 checks (362) for this closing. Responsive to this actuation of switch 350, the control system 80 reads (364) the revision suggestion set in memory, generates (366) a revision suggestion image 138c and shows (368) the revision suggestion image 138c on the image display 26.

In FIG. 46, the revision suggestion shown is to zoom in to a predetermined extent. The revision suggestion is provided in the form of both a revision suggestion image 138c and a text suggestion 138a presented on the information display.

The control system 80 next checks (370) if an enter switch 354 is closed and, if not, checks (372) if all members of a suggestion set have been shown. If not, then the process of checking for actuation of the suggestion review switch 350 through display of the next revision suggestion image is repeated. The revision suggestion images 138c are cycled through by repeated actuations of the suggestion review switch 350.

In the embodiment shown in FIG. 47, the control system 80 also checks (376), after all the revision suggestion images have been shown, and checks (380) for an actuation of the display switch 346. If an actuation is found, then the process is repeated starting with a redisplay of the verification image. A timer (not shown) can be provided to give the user a limited period to press the display button and, if the display button is not pressed in that time period, return to the camera to a start condition.

A revision suggestion is chosen by the photographer actuating (indicated by arrow 378 in FIG. 46) the enter switch 354 ("S-edit" in FIG. 47). The choice of the revision suggestion causes the control system 80 to set up (374) the camera 10 in a capture configuration that would allow recapture of the original scene in the manner indicated by the chosen revision suggestion. As shown in FIG. 46, the viewfinder image 160 is changed and matches the chosen revision suggestion. The camera is ready for archival image recapture and no image is shown on the image display. When a revision suggestion is chosen, the unchosen revision suggestions are no longer necessary and can be deleted from memory to save space.

The retaining of the camera in the capture configuration used for the archival image, as illustrated by the verification image 144, can be provided as a default condition which occurs unless the enter switch is pressed while a particular revision suggestion image 138c is displayed. The user can also be given the option of quickly returning from the capture configuration provided by a chosen revision suggestion to a default configuration. This can be implemented by a dedicated switch (not shown) or as an additional function of one of the existing control buttons.

For convenience, discussion here is generally limited to revision suggestion depictions in the form of images. Other depictions, as above discussed, can also be used in a similar manner. Warnings can be provided, in appropriate circumstances, in the manner earlier discussed.

The switches 346,350,354 are mounted to the body 12 of the camera 10 and the suggestion review and enter switches 350,354 together define a designator 356 that is changeable between settings for each of the revision suggestions of the suggestion set. The particular form and manner of operation of the designator 356 are not critical and are not limited to those described here. For example, the designator 356 can have a keypad (not shown) rather Man a group of dedicated buttons or can be remotely operated using a radio-frequency link (also not shown). Likewise, the designator 356 can operate in a different manner, such as cycling through the verification image along with the revision suggestion images of the suggestion set upon repeated actuations of a display button or the like. Cycling can be automatic following archival image capture or activation of the image display. Similarly, the designator can require the user to choose one of the verification image and the revision suggestion images by pressing the enter switch 354 when the respective image is displayed. If the user does not choose before a timer elapses, then the camera enters a default capture configuration rather than retaining the previous configuration or changing to a configuration indicated by a revision suggestion.

The nature of the changes in the capture configuration of camera 10 that occur when a particular revision suggestion is chosen, depend upon the nature of the revision suggestion. The possibilities are limited by available settings of camera parameters provided by a set of capture modifiers. Capture modifiers are camera control features that change the image capture in some manner. For example, in the camera 10 shown in FIG. 4, the set of capture modifiers includes the zoom taking lens 76, the film shutter 92, the film aperture/diaphragm 96, and the flash unit 36. Changes in configuration signaled by the control system are effected by respective drivers 78, 88, 110, 108.

In a particular embodiment, the camera 10 has different archival image capture settings for the following parameters: zoom position, print format (print aspect ratio C, H, P), shutter speed, capture, and flash usage. A revision suggestion can change the setting of one or more of these in any combination.

After recapture set up is completed, the resulting capture configuration is immediately available for recapture of the scene. If the scene has changed and recapture is not an option, the user can use the new configuration for capture of another scene. As earlier noted, if the new scene is similar to the earlier scene, that it is likely that acceptable results will be obtained.

Revision suggestions can be selected to help ensure acceptable results even if a scene has moderately changed before recapture. For example, a revision suggestion to zoom in or to use fill flash is unlikely to present a problem to the user, even if the scene has changed. Revision suggestions to otherwise compose the scene relative to an earlier subject or to change the lighting conditions present a much greater risk of error, if the scene has moderately changed.

Revision suggestions that present a great risk of error or call for changes in configuration that are beyond camera capabilities without human intervention, such as, rotating the camera or attaching a filter or lens, can be excluded from the camera or can be provided only as an instruction to the user. In the latter case, actuation of the enter switch 354 by the user can provide an appropriate message such as, "Automatic set-up for recapture unavailable" or "Rotate the camera 90 degrees", informing the user that he or she will have to take the steps necessary to set up the camera for recapture implementing the chosen revision suggestion.

The camera 10 can have a set of condition sensors 400 (shown in FIG. 49) that signal the controller 81 as to the status of or a change in particular camera settings. Such condition sensors are well known to those of skill in the art and are commonly used to provide feedback during automatic camera operations. Condition sensors are also used with manual controls, such as a manually operable zoom lenses, to detect the current setting. In the camera 10, condition sensors 400 can be used to detect a change in the capture configuration. The controller 81 can monitor for changes in camera settings following display of the revision suggestions. Once a change is detected, the camera 10 can turn off the display of the revision suggestions so as to be ready for image capture.

Figure 49:
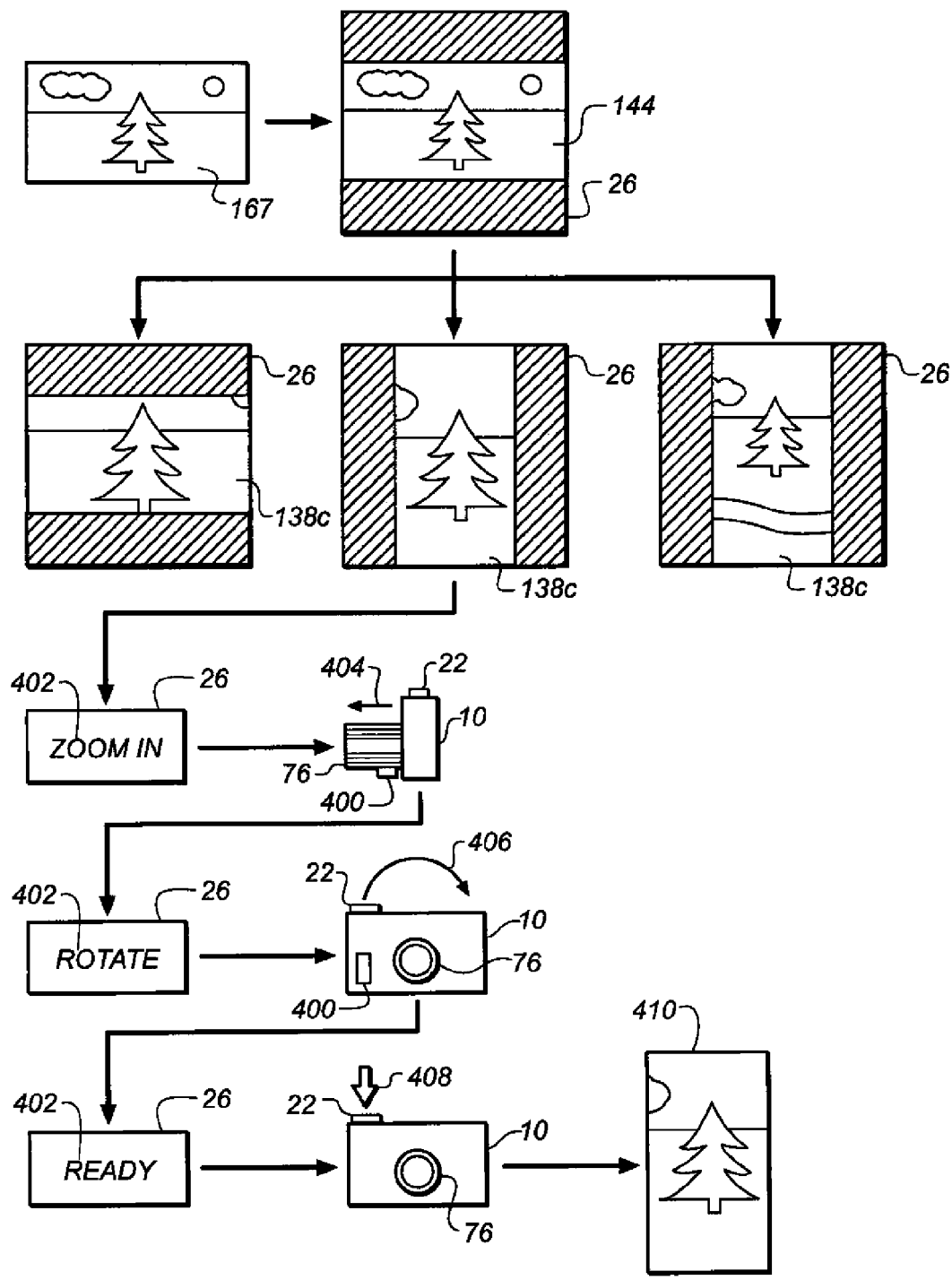
FIG. 49 is a diagrammatical view of another revised recapture photography method in which the camera provides user instructions.

Referring now to FIGS. 49 and 4, in a particular embodiment of the invention, the controller 81 generates a set of instructions 402 responsive to the selection of one of the revision suggestions (illustrated as revision suggestion images 138c) by the user. As earlier described, this follows display of the revision suggestions. The instructions 402 are presented on the user interface, preferably in the form of text or simple icons, shown on the information display 114, or image display 26, or both. Audio instructions 402 provided through a speaker (not shown) can be used instead, or in addition. The set of instructions 402 can be presented altogether, but is preferably presented one instruction 402 at the time. The user can act on the instructions 402, when presented, to effect the changes necessary for image recapture implementing the selected suggestion. Following presentation of the instructions, the controller 81 monitors the configuration of the camera using the condition sensors 400, to determine if the configuration has been changed by the user.

If desired, the controller 81 can lock out one or more user controls 122 of the user interface during the monitoring. This limits user inputs to those required to put into effect the instructions of the selected suggestion. As with other features described herein that are not mandatory for image capture, a user control 122 can be provided on the camera to turn off the display of the instructions or the display of revision suggestions and ready the camera for continued image capture.

In the example shown in FIG. 49, a scene is captured as an archival image 167. The user then selects to show the verification image 144 and, following that, selects to see revision suggestions 133c. The revision suggestions 138c illustrated are, in order from left to right, zooming in, zooming in and rotating the camera 90 degrees, and rotating the camera 90 degrees. The revision suggestion 138c of zooming in and rotating the camera 90 degrees is selected by user actuation of the appropriate control (not shown in FIG. 49). This results in preparation of a set of instructions 402 for the selected suggestion. The instructions 402 are presented on a stepwise basis, with the first instructions being "zoom in". The instructions, in the embodiment shown, are presented on the image display 26. The user complies (indicated by an arrow 404 in FIG. 49) with the instruction and adjusts the talking lens 76 so as to increase the size of the subject. A condition sensor 400 signals the controller 81, which is monitoring, following the presentation of the initial instruction 402, for changes in the camera configuration. The controller 81 determines from the sensor signal, that the taking lens 76 has been repositioned Responsive to the signal from the sensor 402, the next instruction "rotate", is presented on the image display 26. The user then rotates (indicated by arrow 406 in FIG. 49) the camera 10. A sensor 400 in the camera 10 detects the rotation and signals the controller 81, which responsively turns off the instruction 402 to rotate the camera. The camera 10 can lock up to the shutter release 22 when the instruction "zoom in" is given, and unlock the shutter release 22 after determining the camera rotation. The camera 10 can indicate "ready" on the display 26, following the rotation. The user then actuates the shutter release 22, (indicated by arrow 408). The image is recaptured, resulting in a new archival image 410. In an alternative embodiment, after the revision suggestion of zooming in and rotating the camera 90 degrees is selected by the user, the controller 81 automatically moves the zoom lens to the suggested setting, and presents only the "rotate" instruction on the image display 26.

In the various embodiments, after the user has recaptured the scene, the camera 10 can remain in the configuration determined by the user's earlier choice of a particular revision suggestion. It is preferred, however; that the camera 10 return to the previous configuration or a default configuration upon completion of the recapture. The previous or default configuration can provide for setting one or more camera parameters with automatic camera systems. In preferred embodiments, reversion is to a default configuration having a predetermined zoom position, a predetermined print format, and exposure parameters, including flash values, automatically set for a currently measured exposure value. The camera 10 can also provide this same reversion to a previous or default capture configuration when the user actuates a particular control, such as the display switch, during or following display of the revision suggestions.

Following set up, but prior to recapture, the camera can provide a message to the user indicating that the configuration of the camera 10 has changed in response to the user's choice of one of the revision suggestions. This can be communicated to the user in a variety of ways. For example, the information display 114 can provide the message "Set for recapture" (not shown), or some like message. Reversion to a previous or default configuration would eliminate this message.

Archival Image Revising Camera

The revision suggestions displayed following successful capture of an evaluation image are not the only type of usage options that can be presented to the user following a capture event. One additional type of usage option that was already mentioned is a warning message that indicates capture failure. Another type is a presentation of available changes that can be made to captured archival images either immediately, for electronic archival images, or during photofinishing, for film archival images or alternatively for electronic archival images subject to photofinishing. (For convenience, the following discussion is generally limited to photofinishing of film archival images. Like considerations apply to photofinished electronic archival images and to archival images that are printed on a personal computer-and-printer, or a stand-alone "appliance" printer, without further editing.)

While in most cases the available changes will be the same as those presented in the revision suggestions earlier discussed, some revision suggestions will not be usable for this purpose. Some cameras may also be capable of making less changes than others. For this reason, revision suggestions that represent available changes are referred to, in relation to image revising cameras and methods, by the term "editorial suggestions". This term excludes revision suggestions that cannot be automatically implemented by the particular camera, or camera and appropriate photofinishing equipment. For example, a revision suggestion to detach the talking lens and substitute a fisheye lens is not an editorial suggestion, since the suggestion must be implemented by the user. Editorial suggestions do not differ in other respects, from the be revision suggestions earlier discussed. For example, editorial suggestions can be depicted in the same manner as revision suggestions and editorial suggestion images, corresponding to revision suggestion images, are again preferred depictions.

Figure 48:
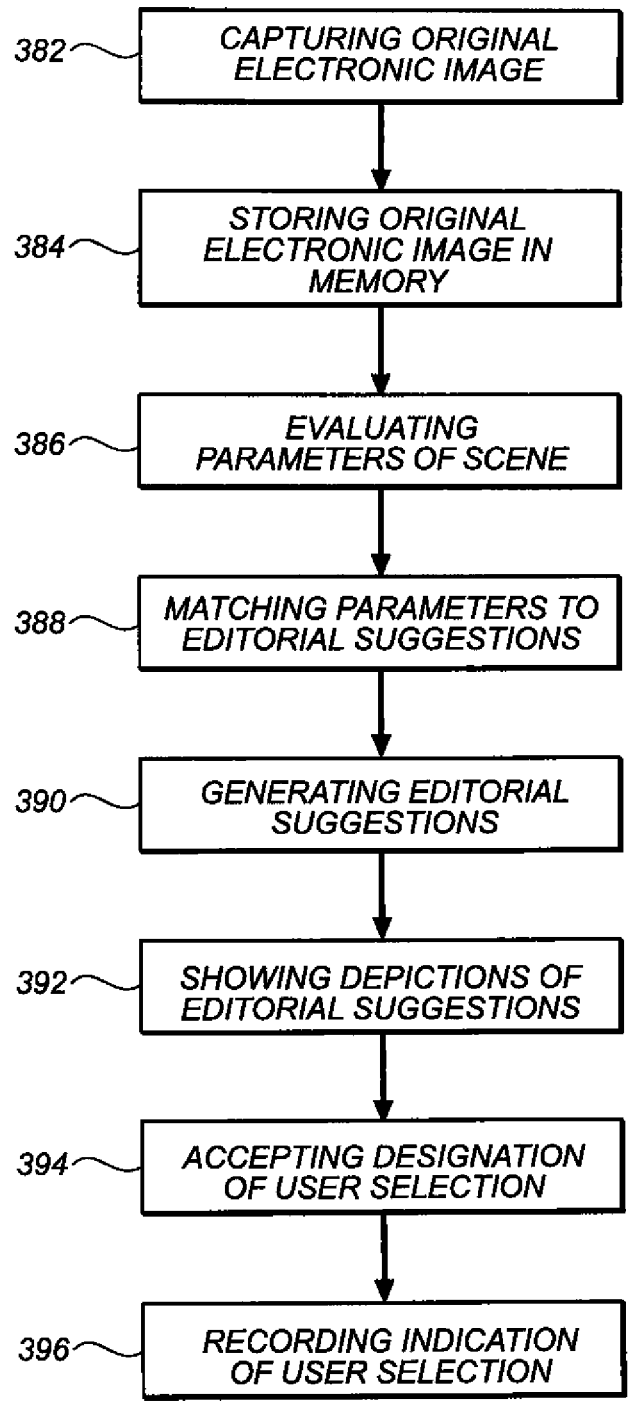
FIG. 48 is a diagrammatical view of the archival image revising photography method.

An embodiment of the photography method for revising an archival image is shown in FIG. 48. In a capture event, an original electronic image is captured (382) and stored (384) in memory. The original electronic image can be the archival image or can archival image can be captured time currently with the capture of the original electronic image.

After capture (382), a suggestion set of editorial suggestions is generated in the same manner earlier discussed in relation to the generation of a revision suggestion set. In FIG. 48, this is illustrated in simplified form by the steps of: evaluating (386) parameters of the scene, matching (388) parameters to editorial suggestions, and generating (390) editorial suggestions.

After the set of editorial suggestions has been generated (390), depictions of the editorial suggestions are displayed (392), in the same manner as we are disclosed for the revision suggestions. During display, the user can designate a selected suggestion. The camera accepts (394) the designation and records (396) an indication of the user selection. The indication is either an edited form of the archival image or data in the form of editing instructions for the photofinishing equipment. The procedure and camera features for designating the selected suggestion can be the same as those earlier described in relation to be revised recapture camera and methods, with the distinction that the camera does not setup for recapture but instead records the indication of the user selection.

The nature of the indication of the user selection varies with the type of archival image. If the archival image is a latent image on photographic film, then the indication of the user selection is in the form of data recorded on the photographic film. The camera 10 shown in FIG. 4 has a data recorder 398 that can record the data in the film unit of photographic film.

The manner in which the data is recorded is not critical. For example, procedures and equipment are well known for recording data in a film unit in optical, magnetic, or electronic form. "Advanced Photo System" ("APS") film provides for the recording of data in a magnetically recordable layer of the film. For example, many APS cameras can record magnetic data that indicates which of three print aspect ratios: H, C, and P, is selected for each latent image. Photofinishing equipment (not shown), in which the film is processed, reads recorded magnetic data and prints the latent images as final images in the selected aspect ratios. The photofinishing equipment produces the final images in the selected print aspect ratios optically or digitally.

A selected editorial suggestion that provides for changing the print aspect ratio of an image can be implemented in exactly this manner. Other editorial suggestions can be implemented similarly. It will be understood that this requires that the cameras and photofinishing equipment act on a common scheme, in which the photofinishing equipment can read and interpret the recorded data and, in response, provide a modification of the photofinishing output. Suitable schemes for providing these functions, like the Advanced Photo System, are well known to those of skill in the art.

If the archival image is derived from the original electronic image, then the indication of the user selection is in the form of an edited image, an electronic image derived from the original electronic image by editing in accordance with the selected editorial suggestion. The edited image is stored in memory 58 of the camera 10.

The edited image can join the original electronic image in the memory, such that the same image information is duplicated, except as modified by the respective editorial suggestion. This approach is not preferred, since the user has to, at some time in the future, review the images and decide whether the original electronic image or edited image is better, before using or discarding one of the two images. It is preferred that the original electronic image in the memory, is replaced by the edited image. This approach reduces memory requirements and prevents duplication of effort by the user. The edited image that replaces the original electronic image can include sufficient information to recreate the original electronic image, in the form of metadata instructions or the like.

In this embodiment, the effect of the user's choice of an editorial suggestion varies with the nature of the depiction used for the editorial suggestion. The original electronic image is edited after the user input is chosen, if the depiction of the editorial suggestion is text or an icon presented on the information display or, preferably, merged with the verification image on the image display. If the editorial suggestion is a low resolution editorial suggestion image, then the original electronic image is modified in a simplified manner to prepare a depiction that suggests, but does not fully represent a particular editorial suggestion. In this case, when an editorial suggestion is chosen, the depiction is deleted and the original electronic image is modified again to produce the edited image, in a modification that fully complies with the editorial suggestion. If the editorial suggestion is a suggestion image, at high resolution, then further modification of the derived image is not required. When an editorial suggestion or the verification image is chosen, the unchosen editorial suggestions are no longer necessary and can be deleted.

Figure 50:
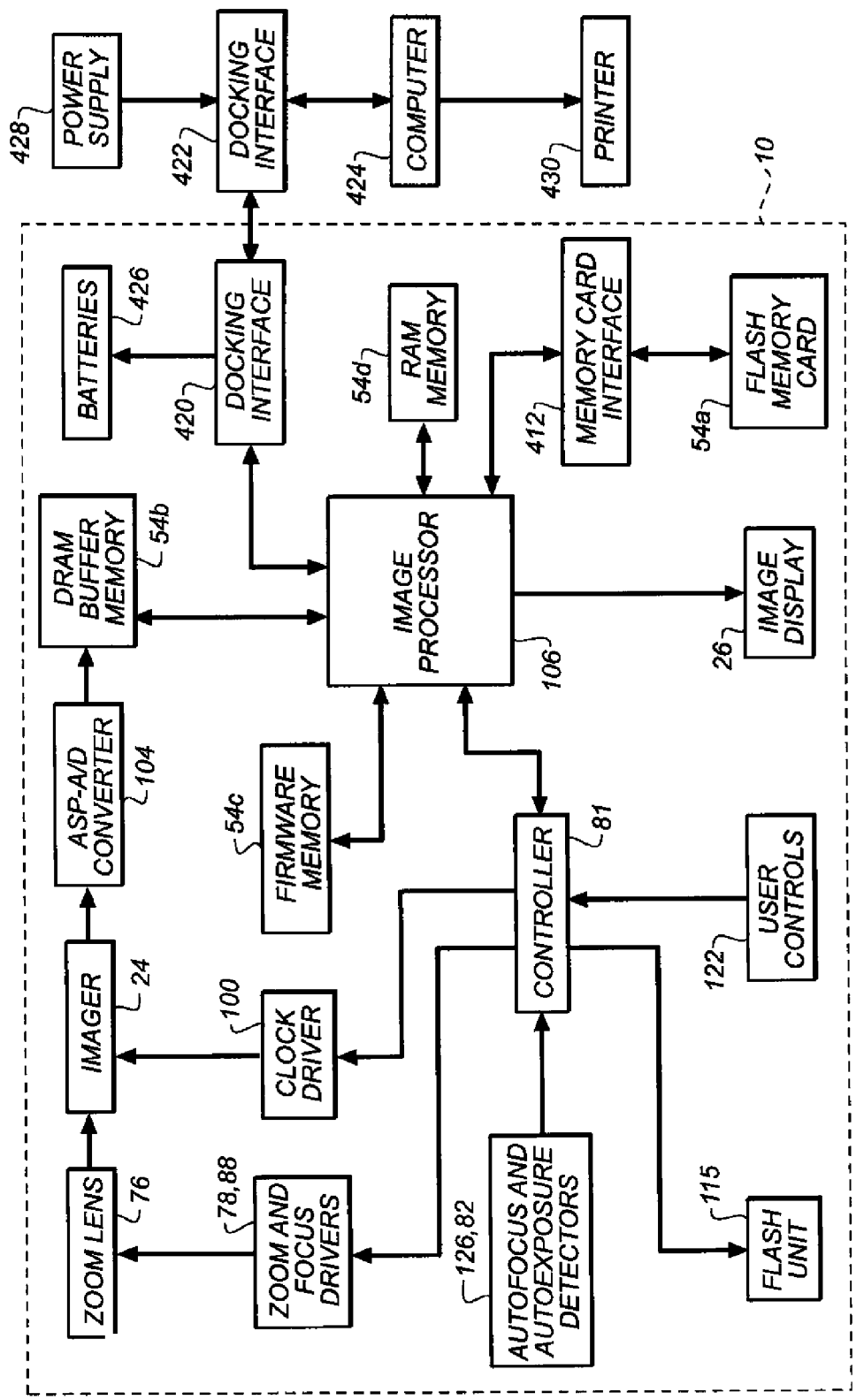
FIG. 50 is a diagrammatical view of an electronic camera that provides archival image revising.
Figure 51:
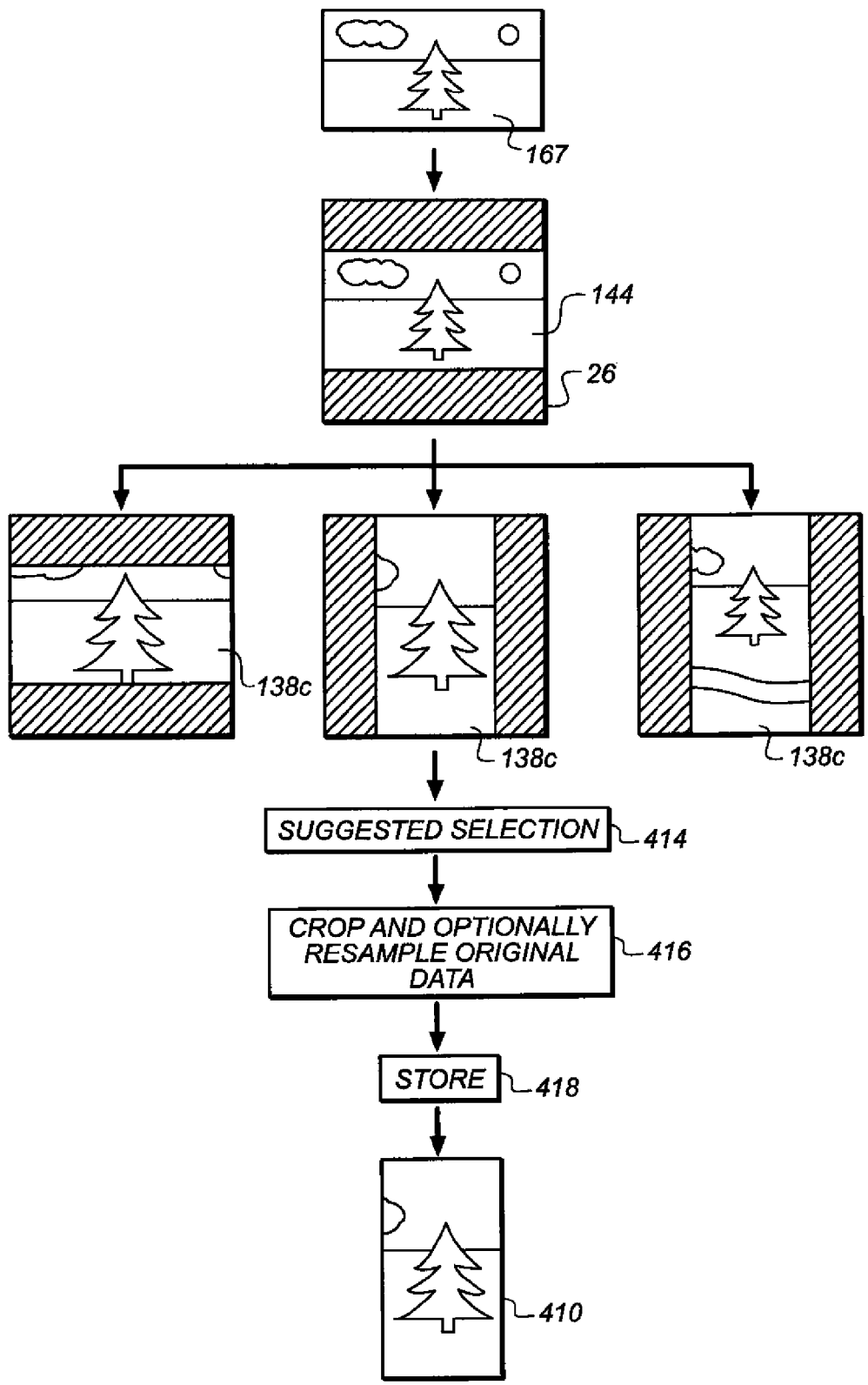
FIG. 51 is a diagrammatical view of another archival image revising photography method.

In a particular example shown in FIGS. 50-51, the digital camera 10 uses a megapixel imager 24 to capture an initial electronic image, which is then stored as an archival image in the form of a JPEG compressed file on a removable memory card 54*a* accessed through a memory card interface 412. The camera 10 selectively displays a verification image on the image display 26 that is derived from the archival image by subsampling. (Buttons or other user controls that actuate the verification display and the like are not illustrated in FIG. 50, but can be like those earlier discussed. The digital camera 10 includes a mode that displays editorial suggestions. The editorial suggestions shown in FIG. 51 are enlarge image, enlarge and rotate, and rotate. When the user selects (414) one of the editorial suggestions (in FIG. 50, the suggestion to enlarge and rotate is selected), the archival image is decompressed from the JPEG compressed file and modified by cropping (416) the image data, recompressing, and storing (418) the cropped image file 410 onto the removable memory. The original archival image file 167 is then preferably deleted to save space. If the user actuates display of the verification image, the replacement image file is subsampled to provide a new verification image for display on the image display 26. The replacement image 410 can, optionally, be resampled when cropped, as shown in FIG. 51.

Suitable cameras 10 and methods are otherwise like those earlier described. For example, the camera 10 shown in FIG. 4 can be used, with software modified to allow the user to select one of the editorial suggestions of a suggestion set by actuating a user control 122 and to allow the data recorder 398 to record the data representing the user selection on the film. An example of a suitable electronic camera 10, shown in FIG. 25, is a modification of the camera of FIG. 4 to exclude features related to photographic film. Removable memory 58 is also provided in place or in addition to other memory in the control system 80.

Another suitable electronic camera 10 is shown in FIG. 50. The camera 10 has a docking interface 420 that is compatible with a docking unit 422 of a personal computer 424. Electric power for the circuits of the camera is provided by rechargeable batteries 426. The batteries 426 are recharged via a power supply 428 that is connected to the docking unit 422. Other camera features, including the control system, are similar to those earlier described. For example, the camera produces digital images that are stored on a removable memory card 54a. The camera includes a zoom lens 76 having zoom and focus drivers 78,88 and an adjustable aperture and shutter (not shown in FIG. 50). The zoom lens 76 focuses light from the scene on an imager 24 such as a single chip color CCD image sensor using the well-known Bayer color filter pattern. The image sensor 24 is controlled by clock drivers 100. The zoom and focus and clock drivers 78,88,100 are controlled by control signals supplied by a controller 81. The controller 81 also receives inputs from autofocus and autoexposure detectors 126,82 and controls a flash unit 115. The analog image signal from the imager 24 is amplified and converted to digital data by an ASP-A/D converter 104. The digital image data from the ASP-A/D 104 is stored in a DRAM buffer memory 54b and subsequently processed by the processor 106, which is controlled by firmware stored in a firmware memory 54c, using RAM memory 54d. Electronic images transferred through the docking interface 420 and docking unit 422 are printed by the computer 424 using a printer 430.

The camera can have other features not illustrated here. For example, the camera can be a hybrid allowing film or electronic capture of the archival image.

The invention has been described in detail with particular reference to certain preferred embodiments thereof, but it will be understood that variations and modifications can be effected within the spirit and scope of the invention.

PARTS LIST camera 10
body 12
capture system 14
archival image capture unit 16
evaluation capture unit 18
film 20
shutter release 22
imager 24
image display 26
covers 28,30
chassis 32
film door 34
flash unit 36
film holder 38
film unit 40
film chambers 42,44
exposure frame 45
canister 46
spool 48,49
opening 50
film transport 52
memory 54
optical system 56
viewfinder 58
first path 60
second path 62
combined lens unit 64
imager lens unit 66
viewfinder lens unit 68
partially transmissive mirror 70
fully reflective mirror 72
eyepiece 74
taking lens unit 76
zoom driver 78
control system 80
controller 81
autofocusing system 82
sensor 84
rangefinder 86
focus driver 88
region 90
grid 91
film shutter 92
imager shutter 94
Diaphragms/aperture plates 96
Signal lines 98
imager driver 100
image display driver 102
A/D converter 104
processor 106
aperture drivers 108
film and imager shutter drivers 110,112
information display 114
flash circuit 115
information display driver 116
user interface 118
"zoom in/out" button 120
other user controls 122
film unit detector 124
detector 126
driver 128
sensor 129
subject 130
archival angle of view 131
background 132
scene 133
orientation sensor 134
assessment angle of view 135
look-up table 136
depiction 138, 138a, 138b, 138c
original electronic image 142
verification image 144
solid lines 145
crosshatched box 146
dashed lines 147
person's head 148
dashed line 149
tree 150
subject 152, 154, 156, 158
viewfinder image 160
subject 162
house 163
preliminary electronic images 164
box 165
paxels 166
archival image 167 subdivided image 168
box 169
first portion 170
pattern 172
lightening-darkening algorithm 178
sun 182
Start 184
determines (186)
captured (188)
determined (190), (192), (194), (196)
determines (198)
focuses (200)
captures (202)
captured (204)
digitized (206)
derived (208)
determines (210)
compares (212)
generate (214)
saved (216)
determines (218)
shown (220)
determines (222)
reads (224)
generates (226)
shows (228)
determines (230)
determines (232)
warning 236
speaker 237
text message 238
line images 240,242
digital images 244,246
beginning 248
end 250
archival image exposure time interval 252
histogram 253
determined (254)
threshold curve 255
captured (256)
capture (258)
determined (260)
compared (262)
generated (264)
presented (266)
presented (268)
subsampled (270)
subtracted (272)
compared (274)
determines (276)
middle portion 278
first and last original electronic image time intervals 280,282
underexposure image 284
overexposure image 286
underexposure time interval 288
overexposure time interval 290
determination (292)
ascertained (294)
calculated (296)
determination (298)
set (300)
set (302)
opened (304)
expose (306)
expose (308)
expose (310)
waited (312)
exposed (314)
closed (316)
analyzed (318)
analyzed (320)
determine (322)
generated (324)
set (326)
sets (327)
show (328)
checking (330),(332)
disabled (334)
histogram 335
threshold curve 336
histogram 337
curve 338
arrow 340
tripod 342
model 344
display switch 346
arrow 348
suggestion review switch 350
arrow 352
enter switch 354
designator 356
checks (358)
shows (360)
checks (362)
reads (364)
generates (366)
shows (368)
checks (370)
checks (372)
set up (374)
checks (376)
arrow 378
checks (380)
captured (382)
stored (384)
evaluating (386)
matching (388)
generating (390)
displayed (392)
accepts (394)
records (396)
recorder 398
electronic capture unit 1618
first switch S1
second switch S2

The invention claimed is:

1. An image capture device comprising:
an image capture unit configured to capture an electronic image;
an input system comprising a shutter mechanism including a first mechanism configured to be actuated in response to a first stroke, and a second mechanism configured to be actuated in response to a second stroke;
a display configured to present the electronic image; and
a processing system configured to:
cause the image capture unit to capture a first digital image of a scene using initial capture settings in response to the first stroke;
cause the first digital image to be presented on the display;
automatically determine a subject region associated with the scene; and
automatically modify a previous capture configuration associated with the captured scene based on the determined subject region and in response to the second stroke, wherein modifying the previous capture configuration comprises altering an exposure parameter associated with the captured scene and altering the composition of the captured scene, and wherein altering a composition of the captured scene comprises at least one of altering a center of the captured scene and rotating the captured scene.

2. The image capture device of claim 1, wherein the processing system is configured to automatically modify the previous capture configuration by automatically adjusting the initial capture settings.

3. The image capture device of claim 1, wherein the processing system is further configured to provide instructions to manually adjust the initial capture settings using at least one additional input received via the input system.

4. The image capture device of claim 3, wherein the instructions are presented as text or icons on the display or in audio form by an audio output.

5. The image capture device of claim 3, further comprising a sensor configured to monitor image capture settings and to provide a capture signal to the processing system based on which the processing system can determine when the image capture device is ready to capture an image in accordance with the previous capture configuration.

6. The image capture device of claim 3, wherein the instructions comprise instructions to move the image capture device closer or farther from the determined subject region.

7. The image capture device of claim 3, wherein the instructions comprise instructions to re-aim or rotate the image capture device.

8. The image capture device of claim 1, wherein the initial capture settings comprises a first zoom position setting, and wherein the previous capture configuration includes a second zoom position setting different than the first zoom position setting.

9. The image capture device of claim 1, wherein the processing system is further configured to derive an evaluation image from the captured first digital image.

10. The image capture device of claim 1, wherein the processing system is further configured to automatically determine a subject region of the scene by determining eye positions within the captured first digital image.

11. The image capture device of claim 1, wherein altering the exposure parameter comprises altering at least one of a shutter speed parameter, a diaphragm opening parameter, or a lighting parameter.

12. The image capture device of claim 1, wherein the image capture device comprises a digital camera or a film camera.

13. A method comprising:
capturing, by an image capture device, a first digital image of a scene using initial capture settings in response to actuation of a first mechanism;
presenting, by the image capture device, the first digital image on a display;
automatically determining, by the image capture device, a subject region of the scene; and
automatically modifying, by the image capture device, a previous capture configuration associated with the captured scene based on the determined subject region and in response to actuation of a second mechanism, wherein the modifying the previous capture configuration comprises altering an exposure parameter associated with the captured scene and altering a composition of the captured scene, and wherein the altering the composition of the captured scene comprises at least one of altering a center of the captured scene and rotating the captured scene.

14. The method of claim 13, further comprising capturing a second image in response to actuation of the second mechanism, wherein capturing the second image is based on the modified previous capture configuration.

15. The method of claim 13, wherein the automatically modifying the previous capture configuration comprises automatically adjusting the initial capture settings.

16. The method of claim 13, further comprising providing instructions to manually adjust the initial capture settings using at least one additional input received via a user interface.

17. The method of claim 16, wherein the instructions comprise at least one of instructions to move the image capture device closer or farther from the determined subject region, instructions to re-aim the image capture device, or instructions to rotate the image capture device.

18. The method of claim 13, wherein the automatically determining the subject region of the scene is based on a determination of eye positions within the captured first digital image.

19. The method of claim 13, wherein the altering the exposure parameter comprise altering at least one of a shutter speed parameter, a diaphragm opening parameter, or a lighting parameter.

* * * * *